(12) United States Patent
Christensen et al.

(10) Patent No.: US 8,791,053 B2
(45) Date of Patent: Jul. 29, 2014

(54) SPATIALLY ENCODED POLYMER MATRIX

(75) Inventors: Soren Flygenring Christensen, Frederiksberg (DK); Jens Hog Truelsen, Elsinore (DK); Morten Meldal, Copenhagen (DK); Roice Michael, Frederiksberg (DK); Ib Johannsen, Vaerlose (DK)

(73) Assignee: MPM-Holding APS, Copenhagen (DK)

( * ) Notice: Subject to any disclaimer, the term of this patent is extended or adjusted under 35 U.S.C. 154(b) by 2255 days.

(21) Appl. No.: 10/529,397

(22) PCT Filed: Sep. 26, 2003

(86) PCT No.: PCT/DK03/00635
§ 371 (c)(1),
(2), (4) Date: Mar. 28, 2005

(87) PCT Pub. No.: WO2004/028682
PCT Pub. Date: Apr. 8, 2004

(65) Prior Publication Data
US 2006/0127369 A1 Jun. 15, 2006

Related U.S. Application Data

(60) Provisional application No. 60/413,771, filed on Sep. 27, 2002, provisional application No. 60/482,453, filed on Jun. 26, 2003.

(30) Foreign Application Priority Data

Sep. 27, 2002 (DK) .................................. 2002 01444
Jun. 26, 2003 (DK) .................................. 2003 00969

(51) Int. Cl.
C40B 40/00 (2006.01)
C40B 40/04 (2006.01)
C40B 40/18 (2006.01)
C40B 30/10 (2006.01)
C40B 20/04 (2006.01)
C40B 20/08 (2006.01)
B01J 19/00 (2006.01)

(52) U.S. Cl.
CPC ...... B01J 19/0046 (2013.01); *B01J 2219/0074* (2013.01); *B01J 2219/00551* (2013.01); *B01J 2219/00698* (2013.01); *B01J 2219/00702* (2013.01); *B01J 2219/005* (2013.01); *B01J 2219/0054* (2013.01); *B01J 2219/00576* (2013.01); *B01J 2219/00722* (2013.01); *B01J 2219/00725* (2013.01); *B01J 2219/00731* (2013.01); *B01J 2219/00585* (2013.01); *B01J 2219/00695* (2013.01)
USPC .......... 506/13; 506/4; 506/6; 506/12; 506/15; 506/22

(58) Field of Classification Search
USPC .................. 506/4, 6, 12, 13, 15, 22
See application file for complete search history.

(56) References Cited

U.S. PATENT DOCUMENTS

| | | | |
|---|---|---|---|
| 4,994,312 A * | 2/1991 | Maier et al. .................. | 428/36.5 |
| 5,015,576 A * | 5/1991 | Nilsson et al. ............. | 435/70.21 |
| 5,047,519 A | 9/1991 | Hobbs, Jr. et al. | |
| 5,227,487 A | 7/1993 | Haugland et al. | |
| 5,274,113 A | 12/1993 | Kang et al. | |
| 5,288,514 A | 2/1994 | Ellman | |
| 5,326,692 A | 7/1994 | Brinkley et al. | |
| 5,405,975 A | 4/1995 | Kuhn et al. | |
| 5,432,272 A | 7/1995 | Benner et al. | |
| 5,433,896 A | 7/1995 | Kang et al. | |
| 5,434,878 A | 7/1995 | Lawandy | |
| 5,439,624 A | 8/1995 | Anderson et al. | |
| 5,442,045 A | 8/1995 | Haugland et al. | |
| 5,449,613 A | 9/1995 | Dordick et al. | |
| 5,451,503 A | 9/1995 | Hogan et al. | |
| 5,451,663 A | 9/1995 | Kang et al. | |
| 5,453,517 A | 9/1995 | Kuhn et al. | |
| 5,459,276 A | 10/1995 | Kuhn et al. | |
| 5,474,796 A | 12/1995 | Brennan | |
| 5,516,864 A | 5/1996 | Kuhn et al. | |
| 5,549,974 A | 8/1996 | Holmes | |
| 5,573,909 A | 11/1996 | Singer et al. | |

(Continued)

FOREIGN PATENT DOCUMENTS

DE 196 46 372 C1 9/1996
EP 0917494 A0 10/1998

(Continued)

OTHER PUBLICATIONS

Strathmann et al., 2000, Artificial biofilm model—a useful tool for biofilm research, Appl. Microbiol. Biotechnol., 54: 231-237.*

(Continued)

*Primary Examiner* — Amber D Steele
(74) *Attorney, Agent, or Firm* — Merchant & Gould P.C.

(57) ABSTRACT

The invention relates to a spatially encoded polymer matrix in the form of a bead or a granule for combinatorial solid phase synthesis, assaying, functional proteomics and diagnostic use. Compositions of such beads or granules are also provided. Each beaded polymer matrix of the composition comprises a plurality of spatially immobilized particles. The spatial immobilization of the particles confers on each beaded polymer matrix a "fingerprint" which enables identification of unique beads in a population of beads. The unique identification of individual beads makes it possible to perform combinatorial chemistry strategies while logging individual chemical transformation. Also provided are methods for detection of relative positions in space of particles, methods for generating matrices, methods for distance matrix determination, methods for identifying individual matrices and devices for recording and storing images of matrices.

80 Claims, 34 Drawing Sheets

(56) References Cited

U.S. PATENT DOCUMENTS

| | | |
|---|---|---|
| 5,604,097 A | 2/1997 | Brenner |
| 5,635,400 A | 6/1997 | Brenner |
| 5,648,270 A | 7/1997 | Kuhn et al. |
| 5,654,413 A | 8/1997 | Brenner |
| 5,656,739 A | 8/1997 | Cubicciotti |
| 5,684,169 A | 11/1997 | Hamada et al. |
| 5,721,099 A | 2/1998 | Still et al. |
| 5,723,218 A | 3/1998 | Haugland et al. |
| 5,723,320 A | 3/1998 | Dehlinger |
| 5,739,386 A | 4/1998 | Holmes |
| 5,763,175 A | 6/1998 | Brenner |
| 5,763,263 A | 6/1998 | Dehlinger |
| 5,786,219 A | 7/1998 | Zhang et al. |
| 5,789,172 A | 8/1998 | Still et al. |
| 5,795,976 A | 8/1998 | Oefner et al. |
| 5,804,563 A | 9/1998 | Still et al. |
| 5,824,471 A | 10/1998 | Mashal et al. |
| 5,840,485 A | 11/1998 | Lebl et al. |
| 5,846,719 A | 12/1998 | Brenner et al. |
| 5,874,214 A | 2/1999 | Nova et al. |
| 5,880,972 A | 3/1999 | Horlbeck |
| 5,942,609 A | 8/1999 | Hunkapiller et al. |
| 5,948,648 A | 9/1999 | Khan et al. |
| 6,001,579 A | 12/1999 | Still et al. |
| 6,022,500 A | 2/2000 | John et al. |
| 6,087,186 A | 7/2000 | Cargill et al. |
| 6,090,912 A | 7/2000 | Lebl et al. |
| 6,096,875 A | 8/2000 | Khan et al. |
| 6,139,626 A | 10/2000 | Norris et al. |
| 6,140,489 A | 10/2000 | Brenner |
| 6,150,516 A | 11/2000 | Brenner et al. |
| 6,172,214 B1 | 1/2001 | Brenner |
| 6,194,550 B1 | 2/2001 | Gold et al. |
| 6,197,555 B1 | 3/2001 | Khan et al. |
| 6,207,392 B1 | 3/2001 | Weiss et al. |
| 6,210,900 B1 | 4/2001 | Yamashita et al. |
| 6,232,066 B1 | 5/2001 | Felder et al. |
| 6,235,475 B1 | 5/2001 | Brenner et al. |
| 6,235,889 B1 | 5/2001 | Ulanovsky |
| 6,248,568 B1 | 6/2001 | Khan et al. |
| 6,252,236 B1 | 6/2001 | Trulson et al. |
| 6,265,219 B1 | 7/2001 | Giger et al. |
| 6,274,385 B1 | 8/2001 | Hocklowski et al. |
| 6,319,668 B1 | 11/2001 | Nova et al. |
| 6,352,828 B1 | 3/2002 | Brenner |
| 6,387,623 B1 | 5/2002 | Mandecki |
| 6,414,321 B1 | 7/2002 | Grosskopf |
| 6,479,264 B1 | 11/2002 | Louwrier |
| 6,503,759 B1 | 1/2003 | Still et al. |
| 6,506,342 B1 * | 1/2003 | Frankel ............ 506/31 |
| 6,514,736 B1 | 2/2003 | Erlich et al. |
| 6,544,732 B1 | 4/2003 | Chee et al. |
| 6,642,334 B2 * | 11/2003 | Grotli et al. .......... 526/279 |
| 6,759,235 B2 | 7/2004 | Empedocles et al. |
| 6,936,477 B2 | 8/2005 | Still et al. |
| 7,037,729 B2 | 5/2006 | Nie et al. |
| 7,070,928 B2 | 7/2006 | Liu et al. |
| 7,156,315 B2 * | 1/2007 | Seul et al. .......... 235/494 |
| 7,413,854 B2 | 8/2008 | Pedersen et al. |
| 7,479,472 B1 | 1/2009 | Harbury et al. |
| 7,704,925 B2 | 4/2010 | Gouliaev et al. |
| 7,727,713 B2 | 6/2010 | Pedersen et al. |
| 7,915,201 B2 | 3/2011 | Franch et al. |
| 2002/0048760 A1 | 4/2002 | Drmanac et al. |
| 2002/0055125 A1 | 5/2002 | Charych et al. |
| 2002/0071121 A1 | 6/2002 | Ortyen et al. |
| 2002/0094116 A1 | 7/2002 | Frost et al. |
| 2003/0113738 A1 | 6/2003 | Liu et al. |
| 2004/0049008 A1 | 3/2004 | Pedersen et al. |
| 2004/0161741 A1 | 8/2004 | Rabani et al. |
| 2004/0209282 A1 | 10/2004 | Ault-Riche et al. |
| 2005/0130173 A1 | 6/2005 | Leamon et al. |
| 2005/0142583 A1 | 6/2005 | Liu et al. |
| 2005/0158765 A1 | 7/2005 | Liu et al. |
| 2006/0099592 A1 | 5/2006 | Freskgard et al. |
| 2006/0121470 A1 | 6/2006 | Pedersen |
| 2006/0234231 A1 | 10/2006 | Freskgard et al. |
| 2006/0246450 A1 | 11/2006 | Pederson |
| 2006/0269920 A1 | 11/2006 | Freskgard et al. |
| 2006/0292603 A1 | 12/2006 | Gouliaev et al. |
| 2007/0026397 A1 | 2/2007 | Freskard et al. |
| 2007/0042401 A1 | 2/2007 | Morgan et al. |
| 2007/0224607 A1 | 9/2007 | Morgan et al. |
| 2008/0193983 A1 | 8/2008 | Gouliaev et al. |
| 2008/0305957 A1 | 12/2008 | Thisted et al. |
| 2009/0143232 A1 | 6/2009 | Pedersen et al. |
| 2009/0239211 A1 | 9/2009 | Freskgard et al. |
| 2009/0264300 A1 | 10/2009 | Franch et al. |
| 2010/0016177 A1 | 1/2010 | Pedersen et al. |

FOREIGN PATENT DOCUMENTS

| | | | |
|---|---|---|---|
| EP | 1533385 A1 | 5/2005 | |
| GB | 2 306 484 | 5/1997 | |
| WO | 9105058 A1 | 4/1991 | |
| WO | WO 9306121 | 4/1993 | |
| WO | WO 9525737 | 9/1995 | |
| WO | WO 9532425 | 11/1995 | |
| WO | WO 96/03424 | 2/1996 | |
| WO | 9609316 A1 | 3/1996 | |
| WO | 9603418 A1 | 8/1996 | |
| WO | WO 97/15390 | 5/1997 | |
| WO | WO 9722594 | 6/1997 | |
| WO | WO 97/35199 | 9/1997 | |
| WO | WO 97/40034 | 10/1997 | |
| WO | WO 98/46548 | 10/1998 | |
| WO | WO 98/47838 | 10/1998 | |
| WO | WO 99/24458 | * 5/1999 | .............. C07K 1/10 |
| WO | WO 9924450 | 5/1999 | |
| WO | 9942605 A1 | 8/1999 | |
| WO | WO 99/59011 | 11/1999 | |
| WO | 9964378 A2 | 12/1999 | |
| WO | 0021909 A2 | 4/2000 | |
| WO | WO 00/21658 | 4/2000 | |
| WO | WO 00/32542 | 6/2000 | |
| WO | 0040695 A2 | 7/2000 | |
| WO | WO 00/63419 | 10/2000 | |
| WO | WO 00/63695 | 10/2000 | |
| WO | WO 01/38268 | 5/2001 | |
| WO | 0156955 A1 | 8/2001 | |
| WO | WO 02/33419 | 4/2002 | |
| WO | WO 02/061423 | 8/2002 | |
| WO | 02074929 A2 | 9/2002 | |
| WO | WO 03/031489 | 4/2003 | |
| WO | 03082901 A2 | 10/2003 | |
| WO | 2004009814 A1 | 1/2004 | |
| WO | 2004016767 A2 | 2/2004 | |
| WO | WO 2004/028682 | 4/2004 | |
| WO | 2004039962 A2 | 5/2004 | |
| WO | 2004042019 A2 | 5/2004 | |
| WO | 2004099441 A2 | 11/2004 | |
| WO | WO 2004/099288 | 11/2004 | |
| WO | 2005026387 A1 | 3/2005 | |
| WO | 2005078122 A2 | 8/2005 | |

OTHER PUBLICATIONS

Miranda et al., published Aug. 10, 2002, SPOCC-194, a New High Functional Group Density PEG-Based Resin for Solid-Phase Organic Synthesis, J. Comb. Chem., 4: 523-529.*

Battersby, et al., "Novel miniaturized systems in high-throughput screening", *Trends in Biotechnology*, vol. 20, No. 4, pp. 167-173, Apr. 2002.

Battersby, et al., "Optical encoding of microbeads for gene screening: alternatives to microarrays", *DDT*, vol. 6, No. 12 (suppl), pp. S19-S26, 2001.

Cox, et al., "A Survey of Point Pattern Matching Techniques and a New Approach to Point Pattern Recognition", *Communications and Signal Processing*, pp. 243-248, 1992.

Farrer, et al., "Production, Analysis, and Application of Spatially Resolved Shells in Solid-Phase Polymer Spheres", *J. Am. Chm. Soc.*, vol. 124, No. 9, pp. 1994-2003, 2002.

(56) References Cited

OTHER PUBLICATIONS

Freemantle, "Nano Bar Coding for Bioanalysis", *Science*, p. 13, Oct. 8, 2001.
Meza, "Bead-based HTS applications in drug discovery", *Drug Discovery Today:HTS Supplement*, vol. 1, No. 1, pp. 38-41, Jun. 2000.
Trau, et al., "Novel Colloidal Materials for High-Throughput Screening Applications in Drug Discovery and Genomics", *Adv. Mater*, vol. 13, No. 12-13, pp. 975-979, Jul. 4, 2001.
Adams et al., "A reinvestigation of the preparation, properties and applications of aminomethyl and 4-methylbenzhydrylamine polystyrene resins", J. Org. Chem. 1998, vol. 63, pp. 3706-3716.
Buchardt et al., "A chemically inert hydrophilic resin for solid phase organic synthesis", Tetrahedron Letters, 1998, vol. 39, pp. 8695-8698.
Gante, Joachim, "Peptidomimetics—tailored enzyme inhibitors", Angew. Chem. Int. Ed., Engl., 1994, vol. 33, pp. 1699-1720.
Groth et al., "HYDRA: a novel hydroxy and amine functionalised resin synthesised by reductive amination of PEG aldehyde and a polyamine", The royal society of chemistry, 2000, vol. 1, pp. 4258-4264.
Grotti et al., "Physical properties of poly(ethylene glycol) (PEG)-based resins for combinatorial solid phase organic chemistry: a comparison of PEG-cross-linked and PEG-grafted resins", 2000, vol. 2, pp. 108-119.
Krebs et al., "The geometry and structural properties of the 4, 8, 12-trioxa-4, 8, 12, 12c-tetrahydrodibenzo(cd,-mn) pyrene system in the cationic state. Structure of a planar organic cation with various monovalent and divalent anions", Acta Cryst., vol. B55, pp. 410-423, 1999.
Laursen et al., "2, 6, 10-Tris (dialkylamino) trioxatriangulenium ions, Synthesis, structure and properties of exceptionally stable carbenium ions", J. Am. Chem. Soc., vol. 120, pp. 12255-12263, 1998.
Laursen et al., "Synthesis of a triazatriangulenium salt", Angew. Chem. Int. Ed., vol. 39, No. 19, pp. 3432-3434, 2000.
Laursen et al., "Synthesis, structure and properties of azatriangulenium salts", Chem. Eur. J., vol. 7, No. 8, pp. 1773-1783, 2001.
Merrifield, R. B., "Solid phase peptide synthesis. I. The synthesis of a tetrapeptide", J. Amer. Chem. Soc., 1963, vol. 85, pp. 2149-2156.
Needels et al., "Generation and screening of an oligonucleotide-encoded synthetic peptide library", Proc. Natl. Acad. Sci. USA, 1993, vol. 90, pp. 10700-10704.
Patel et al., "Applications of small-molecule combinatorial chemistry to drug discovery", Elsevier Science, 1996, vol. 1, No. 4, pp. 143-144.
Rademann et al., "SPOCC: a resin for solid-phase organic chemistry and enzymatic reactions on solid phase", J. Am. Chem., 1999, vol. 121, pp. 5459-5466.
Renil et al., "PEGA supports for combinatorial peptide synthesis and solid-phase enzymatic library assays", Journal of peptide science, 1998, pp. 195-210, vol. 4.
Renil et al., "POEPOP and POEPS: inert polyethylene glycol crosslinked polymeric supports for solid synthesis", Tetrahedron Letters, 1996, vol. 37, No. 34, pp. 6185-6188.
Rohr, Jurgen, "Combinatorial biosynthesis—an approach in the near future?", Angew. Chem. Int. Ed., 1995, vol. 34, pp. 881-884.
Rosse et al., "Rapid identification of substrates for novel proteases using a combinatorial peptide library", J. Comb. Chem., 2000, vol. 2, pp. 461-466.
Smith et al., "Comparison of resin and solution screening methodologies in combinatorial chemistry and the identification of a 100 nM inhibitor of trypanothione reductase", J. Comb. Chem., 1999, vol. 1, pp. 326-332.
St. Hilaire et al., "Fluorescence-quenched solid phase combinatorial libraries in the characterization of cysteine protease substrate specificity", J. Com. Chem., 1999, vol. 1, pp. 509-523.
Balkenkohl et al., "Combinatorial synthesis of small organic molecules", Angew. Chem, Int. ed., vol. 35, pp. 2288-2337, 1996.
Campian et al., "Colored and fluorescent solid supports", in 'Innovation and Perspectives on solid phase synthesis', pp. 469-472, 1994.
Cuche et al., "Digital holography for quantitative phase-contrast imaging", Optics Letters, vol. 24, pp. 291-293, 1999.
Daneshvar et al., "Detection of biomolecules in the near-infrared spectral region via a fiber-optic immunosensor", J. of Immunological Meth., vol. 226, pp. 119-128, 1999.
Dowski and Cathey, "Extended depth of field through wave-front coding", Applied Optics, vol. 34, pp. 1859-1866, 1995.
Durig et al., "Fourier transform raman spectroscopy of brightly colored commercially available dyestuffs and pigments", J. of Raman Spectroscopy, vol. 24, pp. 281-285, 1993.
Egner et al., "Tagging in combinatorial chemistry: the use of coloured and fluorescent beads", Chem. Commun., pp. 735-736, 1997.
Eichler et al., "Peptide, peptidomimetic, and organic synthetic combinatorial libraries", Med. Res. Rev., vol. 15, pp. 481-496, 1995.
Eriksson and Lindblom, "Lipid and water diffusion in bicontinuous cubic phases measured by NMR", Biophys. J., vol. 64, pp. 129-136, 1993.
Früchtel and Jung, "Organic chemistry on solid supports", Angew. Chem. int. ed., vol. 35, pp. 17-42, 1996.
Furka et al., "General method for rapid synthesis of multicomponent peptide mixtures", Int. J. of Peptide Res., vol. 37, pp. 487-493, 1991.
Geysen et al., "Isotope or mass encoding of combinatorial libraries", Chemistry & Biology, pp. 679-688, 1996.
Janda, Kim D., "Tagged versus untagged libraries: methods for the generation and screening of combinatorial chemical libraries", Proc. Natl. Acad. Sci., vol. 91, pp. 10779-10785, 1994.
Kaim and Rail, "Copper—a 'modern' bioelement", Angew. Chem. int. ed., vol. 35, pp. 43-60, 1996.
Lakowicz et al., "Time-resolved fluorescence spectroscopy of DNA labeled with DAPI and Hoechst 33342 using three-photon excitation", Biophysical Journal, vol. 72, pp. 567-578, 1997.
Lam et al., "A new type of synthetic peptide library for identifying ligand-binding activity", Nature, vol. 354, pp. 82-84, 1991.
Lewis and Wang, "Erratum to: The use of fourier transform infrared (FT-IR) spectroscopy to study the state of heterobifunctional reactive dyes (Dyes and Pigments, vol. 39, 1998)", Dyes and Pigments, vol. 42, Erratum, 1999.
Nicewarner-Peña et al., " Submicrometer metallic barcodes", Science, vol. 294, pp. 137-141, 2001.
Rahman et al., "Infrared and raman spectra of a single resin bead for analysis of solid-phase reactions and use in encoding combinatorial libraries", J. Org. Chem., vol. 63, pp. 6196-6199, 1998.
Sebestyén et al., "Efficiency and limitations of the 'portioning-mixing' peptide synthesis", Peptides 1992, pp. 1-2.
Tentorio et al., "Preparation and optical properties of spherical collodial aluminum hydroxide particles containing a dye", J. of Colloid and Interface Sci., vol. 77, pp. 418-426, 1980.
Van Heiden and Vrij, "Contrast variation in light scattering: silica spheres dispersed in apolar solvent mixtures", J. of Colloid and Interface Sci., vol. 76, pp. 418-433, 1980.
Xu et al., "Multiplexed SNP genotyping using the Qbead system: a quantum dot-encoded microsphere-based assay", Nucleic Acids Res., vol. 31, pp. 1-10, 2003.
Yamaguchi et al., "Image formation in phase-shifting digital holography and applications to microscopy", Applied Optics, vol. 40, pp. 6177-6185, 2001.
R. P. Haugland et al. J. of Histochem. & Cytochem. (1999) 47(9): 1179-1188.
Australian Entitlement Dispute—Ren Advice (Oct. 22, 2008).
Australian Entitlement Dispute—Sec 36 Req and Notice to Produce (Nov. 25, 2008).
Australian Entitlement Dispute—Delegates Response (Dec. 2, 2008).
Australian Entitlement Dispute—Advice Applicant Defending Entitlement (Dec. 18, 2008).
Australian Entitlement Dispute—Req Notice to Produce Requestor (Dec. 23, 2008).
Australian Entitlement Dispute—Application Letter (Aug. 11, 2009).
Australian Entitlement Dispute—Req Withdraw (Aug. 12, 2009).
Australian Entitlement Dispute—Ack s32 s36 Withdraw (Aug. 14, 2009).

(56) References Cited

OTHER PUBLICATIONS

"Finding reactions in a haystack: Try'em all, see what works", Meeting American Chemical Society, Sep. 10, 2004, vol. 305, Science. p. 1558.

Doyon, J.B et al. "Highly sensitive in vitro selections for DNA-linked synthetic small molecules with protein binding affinity and specificity", J. Am. Chem. Soc., 125, 12372-12373 (2003).

Fujimoto, et al., "Template-directed photochemical synthesis of branched oligodeoxynucleotides via 5-carboxyvinyldeoxyuridine", Tetrahedron Letters, vol. 41:49, pp. 9437-9440, 2000.

Gryaznov, et al., "Chemical Ligation of oligonucleotides in the presence and absence of a template", J. Amer. Chem. Soc. , vol. 115, pp. 3808-3809, 1993.

Jones, J. Bryan, et al. "Enzymes in organic synthesis 22. Effects of organic solvents on horse liver alcohol dehydrogenase-catalyzed reduction"; Can. J. Chem. 60 1982; pp. 335-338.

Kinoshita et al., "Enzymatic synthesis of code regions for encoded combinatiorial chemistry /ECC)", Nucleic Acids Symposium, Series No. 34, 201-202.

Kurz, M., et al. "An efficient synthetic strategy for the preparation of nucleic acid-encoded peptide and protein libraries for in vitro evolution protocols". Fourth International Electron Conference on Synthetic Organic Chemistry (ECSOC-4), www.mdpi.org/ecsoc-4.htm, Sep. 1-30, 2000.

Liu, DR., et al., "DNA-templated synthesis as a basis for the evolution of synthetic molecules.", Abstracts of Papers of the American Chemical Society 225:612-ORGN, Part 2, Mar. 2003.

Smith, Bruce, et al., "DNA-guided assembly of proteins as a pathway to an assembler", (http://www.wadsworth.org/albcon97/abstract/krummena.htm) The 1997 Albany Conference: Biomolecular Motors and Nanomachines.

Tanaka, K., et al. "Synthesis of a novel nucleoside for alternative DNA base pairing through metal complexation", J. Org. Chem. 1999, 64, 5002-5003.

Office Actions from US Patent Application No. 10,525,817 mailed Nov. 28, 2007.

Office Actions from US Patent Application No. 10,525,817 mailed Jul. 7, 2009.

Office Actions from US Patent Application No. 10,525,817 mailed May 9, 2007.

Office Actions from US Patent Application No. 10,525,817 mailed Jun. 5, 2008.

Office Actions from US Patent Application No. 10,525,817 mailed Apr. 1, 2010.

Office Actions from US Patent Application No. 10,525,817 mailed Apr. 5, 2010.

Weisst, et al. "Enzymatic Breakage and Joining of Deoxyribonucleic Acid, I. Repair of Single-Strand Breaks in DNA by an Enzyme System From *Escherichia coli* Infected With T4 Bacteriophage" PNAS 1967, 57, (4): 1021-1028.

\* cited by examiner

Recording of coordinates of particles in a bead using focal or confocal microscopy Recording of coordinates of particles in a moving bead by two alternating scanning lasers Recording of coordinates of particles in a moving bead by rotational scan

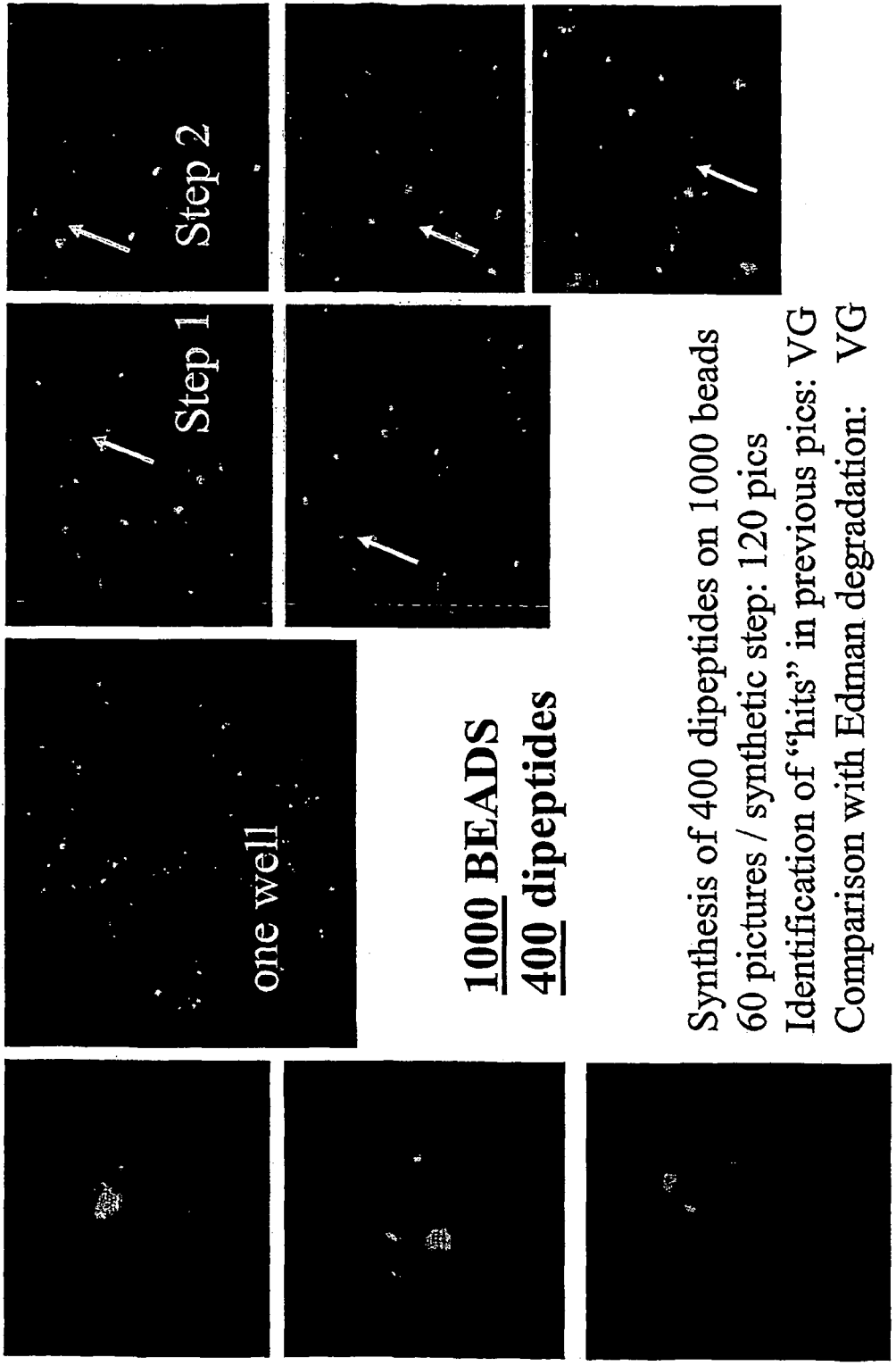

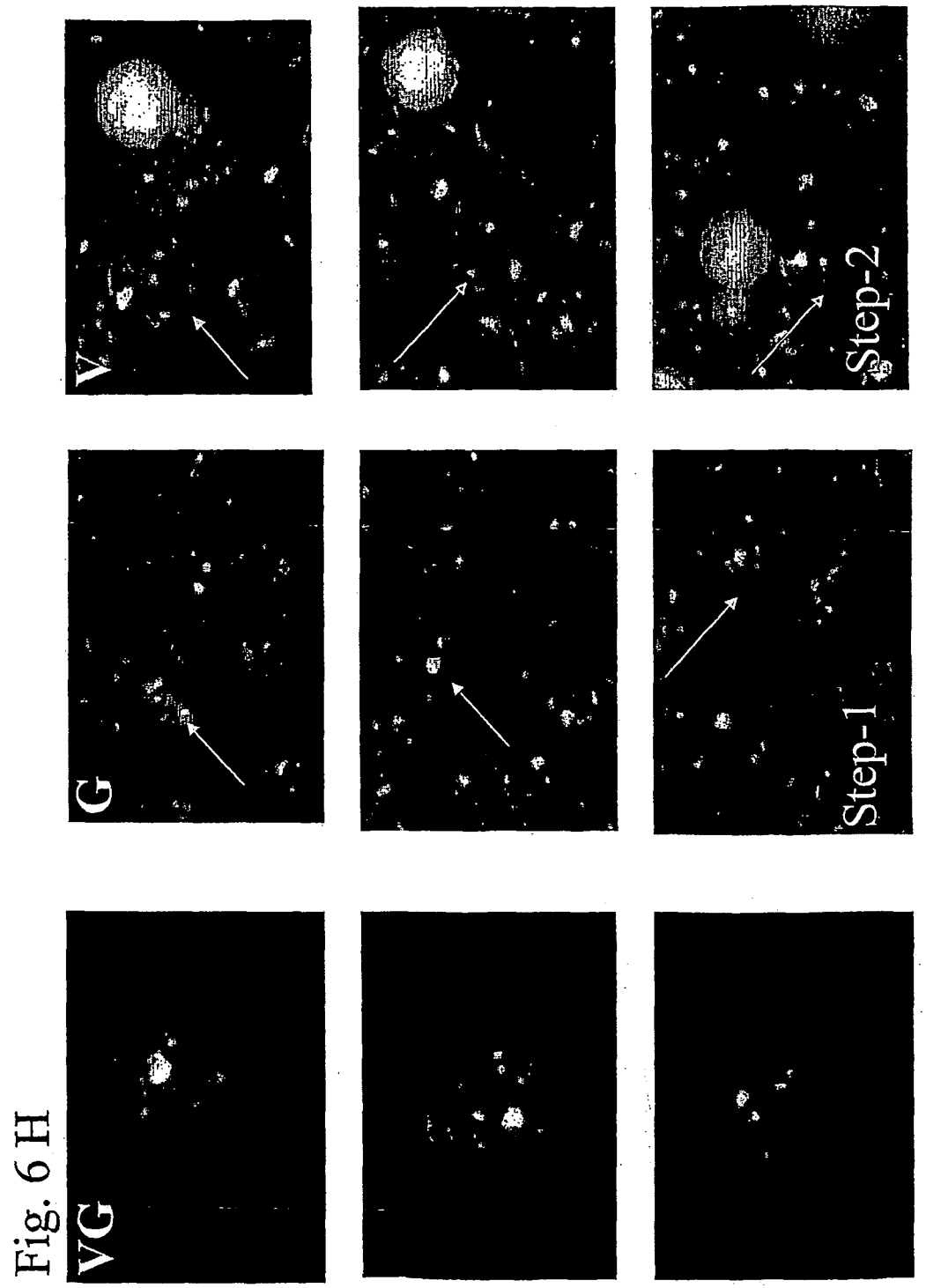

Fig. 7 A
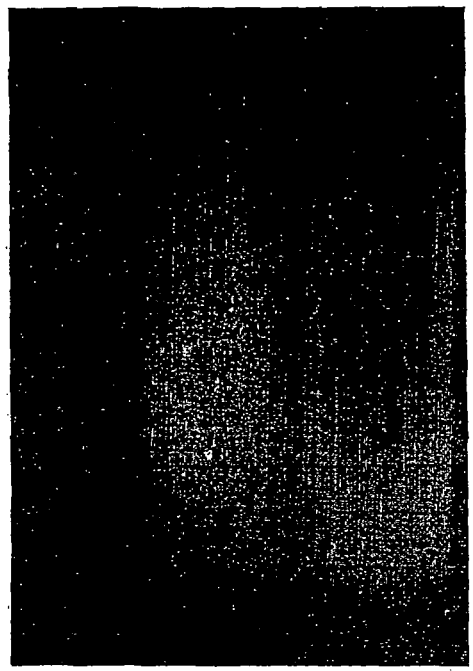
3 Orthogonal pictures
| 0,0 | 0,0 | 0.0 |
|---|---|---|
| X1, X2 | X1, X2 | Y1, Y2 |
| Y1, Y2 | Z1, Z2 | Z1, Z2 |
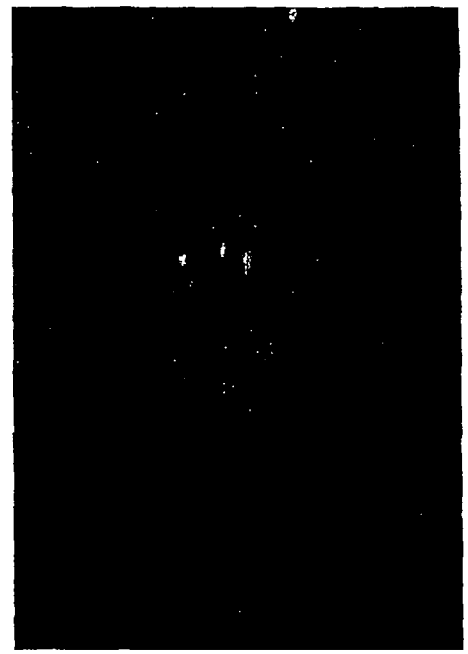

Fig. 7 B
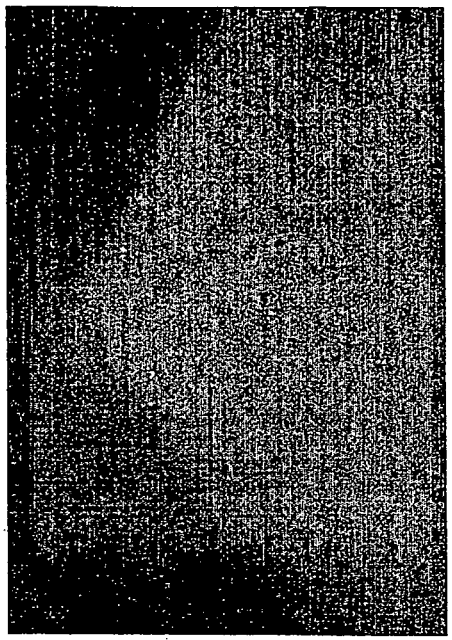
3 Orthogonal pictures
| 0,0 | 0,0 | 0.0 |
|---|---|---|
| X1, X2 | X1, X2 | Y1, Y2 |
| Y1, Y2 | Z1, Z2 | Z1, Z2 |
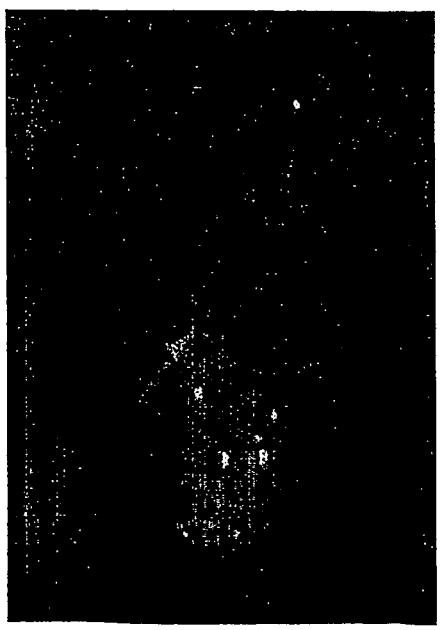
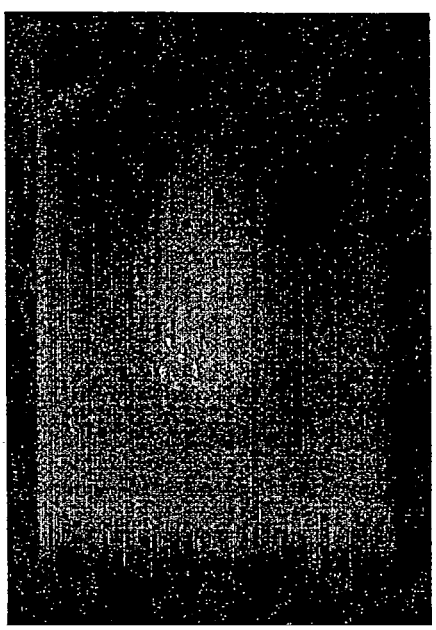

Fig. 11
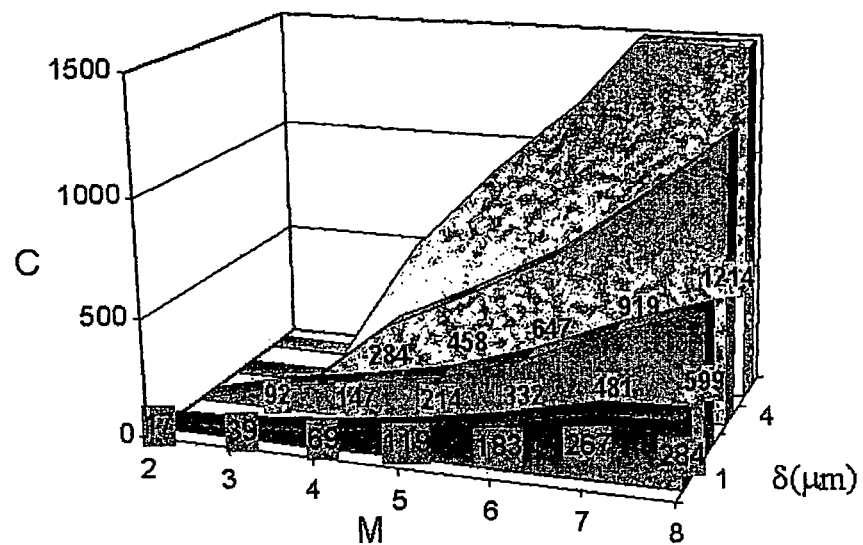
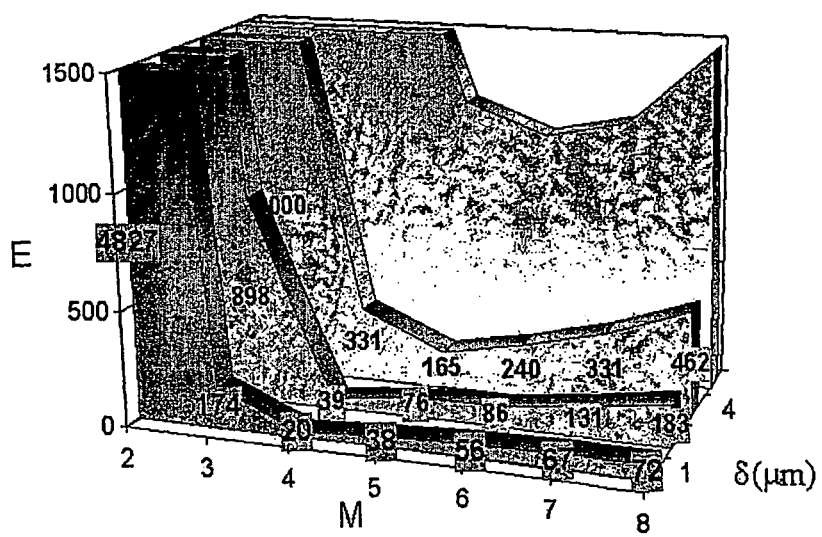

Fig. 19
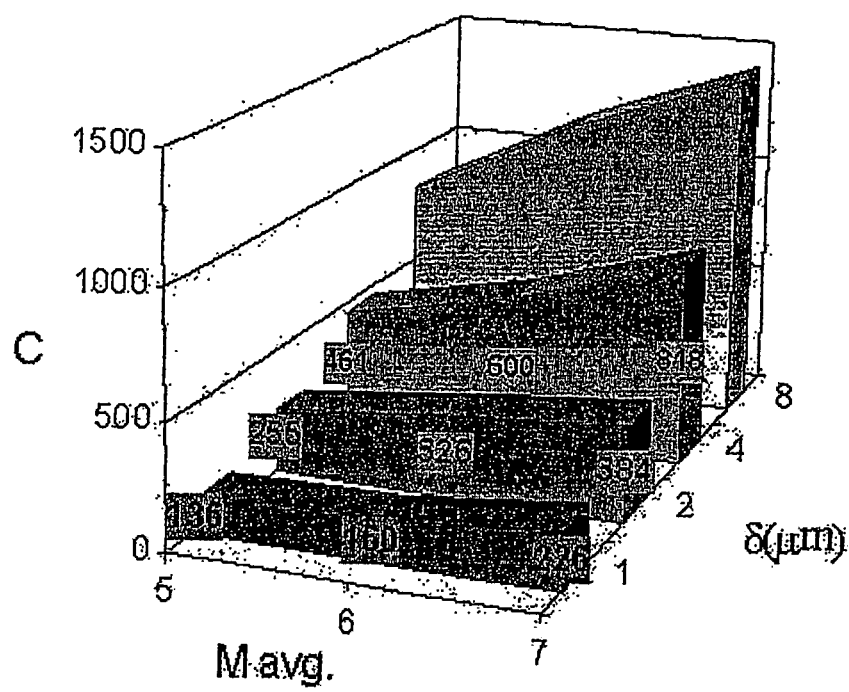
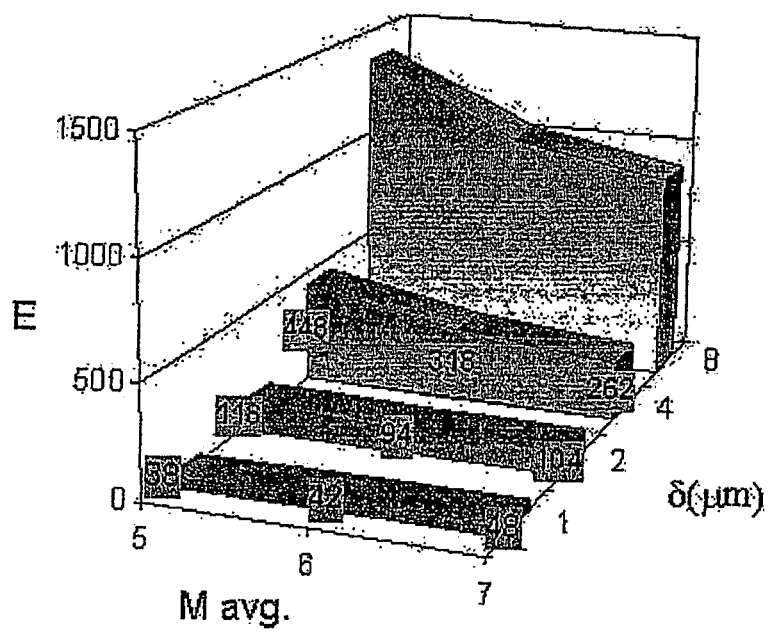

Table 1

Visual decoding of 20 beads from a library containing 400 dipeptides

| | Seq | Pic | Other possible | | Seq | Pic | Other possible |
|---|---|---|---|---|---|---|---|
| 1 | CF | CF | | 11 | HF | HL | |
| 2 | AT | AY | | 12 | NT | NT | |
| 3 | DV | DV | | 13 | AN | AN | |
| 4 | EV | EF | | 14 | PH | PF | |
| 5 | FR | FD | | 15 | PK | PK | |
| 6 | GM | GM | GF | 16 | FR | FR | FH |
| 7 | IV | IV | IP | 17 | VG | VG | |
| 8 | LP | LP | | 18 | RQ | RQ | VQ |
| 9 | WG | WW | | 19 | VG | VG | VL |
| 10 | YW | YW | | 20 | AL | AL | AI |

FIG. 21

SPATIALLY ENCODED POLYMER MATRIX

This application is a non-provisional of U.S. provisional application Ser. No. 60/413,771 filed 27 Sep. 2002 and 60/482,453 filed 26 Jun. 2003, which applications are hereby incorporated by reference in their entirety.

All patent and non-patent references cited in the present patent application are hereby Incorporated in their entirety.

FIELD OF INVENTION

The present invention relates to a spatially encoded polymer matrix in the form of a bead or a granule for combinatorial solid phase synthesis, assaying, functional proteomics, and diagnostic use. There is also provided a composition of such beads or granules. Each beaded polymer matrix of the composition comprises a plurality of spatially immobilised particles. The spatial immobilisation of the particles confers on each beaded polymer matrix a "fingerprint" which enables identification of unique beads in a population of beads. The unique identification of individual beads makes it possible to perform combinatorial chemistry strategies while logging individual chemical transformation.

BACKGROUND OF THE INVENTION

The synthesis of organic molecules on solid-phase synthesis beads has experienced an explosion of interest since Merrifield's pioneering work in the peptide area several decades ago. In large part, this renaissance has been driven by the advent of combinatorial chemistry, which takes advantage of the ability to synthesize large and diverse libraries of compounds efficiently on solid support.

One inherent difficulty of producing large libraries by combinatorial chemistry is the problem of how to determine the reaction history in the form of the individual synthesis steps resulting in the synthesis of any given combinatorial library member. Without such information it is not possible to deconvolute the structure of the combinatorial library member.

When employing a large number of solid supports and a large number of synthesis steps and/or processing methods, the procedure of "deconvolution" is particularly difficult. In many practical cases, where high throughput screening and fast analysis is required, this problem is inherently associated with conventional methods for solid-phase synthesis.

Despite the tremendous practical advantages afforded by solid-phase synthesis, few reports have appeared in which a direct determination of the on-resin chemistry has been made possible in a practical way. Examples of techniques that have been used include radiography, nanoprobe nuclear magnetic resonance, single-bead fluorescence microscopy, IR spetroscopy, and optical analysis.

Combinatorial libraries may be assembled by a number of methods including the "split-and-recombine" methods described e.g. by Furka et al. (1988, 14th Int. Congr. Biochem., Prague, Czechoslovakia 5:47; 1991, Int. J. Pept. Protein Res. 37: 487-493) and by Lam et al. (1991, Nature 354: 82-84), and reviewed by Eichler et al. (1995, Medicinal Research Reviews 15 (6): 481-496) and by Balkenhohl et al. (1996, Angew. Chem. Int. Ed. Engl. 35: 2288-2337).

The split-and-recombine synthesis method involves dividing a plurality of solid supports such as polymer beads into n equal fractions representative of the number of available "building blocks" for each step of the synthesis (e.g., 20 L-amino acids, 4 different nucleotides etc.), coupling a single respective building block to each polymer bead of a corresponding fraction, and then thoroughly mixing the polymer beads of all the fractions together. This process is repeated for a total of x cycles to produce a stochastic collection of up to $N^x$ different compounds.

The conventional split synthesis technologies referred to above present difficulties when it is desired to detect and isolate a combinatorial library member of interest. In this regard, it is necessary to first cleave the member from its solid support before identifying the member by techniques such as mass spectroscopy or HPLC. This is time consuming and cumbersome and in some cases, cleavage is not possible.

Janda (1994, Proc. Natl. Acad. Sci. USA 91: 10779-10785) describes a method in which each synthesis step of a combinatorial library member is followed by an independent coupling of an identifier tag to a solid support. Through a series of sequential chemical steps, a sequence of identifier tags are built up in parallel with the compounds being synthesised on the solid support. When the combinatorial synthesis is complete, the sequence of operations any particular solid support has gone through may be retraced by separately analysing the tag sequence. Accordingly, use of identifier tags in this manner provides a means whereby one can identify the building blocks sequentially added to an individual solid support during the synthesis of a member of a combinatorial library.

WO 98147838 discloses a method for the preparation of a chemical library on a plurality of synthesis particles comprising random features.

WO 93/06121 discloses a general stochastic method for synthesising a combinatorial compound library on solid supports from which library members may be cleaved to provide a soluble library. The identifier tag may be attached directly to a member of the library or to the solid support on which the member is synthesised. Tags such as oligonucleotides can be identified by sequencing or hybridisation. Amplification of oligonucleotide tags by PCR can be employed when only trace amounts of oligonucleotides are available for analysis. However, such identification methods are time consuming and inefficient.

U.S. Pat. No. 5,721,099 discloses a process for constructing complex combinatorial chemical libraries of compounds wherein each compound is produced by a single reaction series and is bound to an individual solid support on which is bound a combination of four distinguishable identifiers which differ from one another. The combination provides a specific formula comprising a tag component capable of analysis and a linking component capable of being selectively cleaved to release the tag component. Prior to analysis of a combinatorial library, each tag component must be cleaved from the support thus creating at least one additional step which is time consuming and inefficient.

Also, the above methods all rely on parallel, orthogonal synthesis of identifier tags which adds substantially to the time taken for completion of a combinatorial synthesis and has the potential of interfering with the synthesis.

Spectrometric encoding methods have also been described in which decoding of a library member is permitted by placing a solid support directly into a spectrometer for analysis. This eliminates the need for a chemical cleavage step. For example, Geysen et al. (1996, Chem. Biol. 3: 679-688) describe a method in which isotopically varied tags are used to encode a reaction history. A mass spectrometer is used to decode the reaction history by measuring the ratiometric signal afforded by the multiply isotopically labelled tags. A disadvantage of this method is the relatively small number of multiply isotopically labeled reagents that are commercially available.

Optical encoding techniques have also been described in which the absorption or fluorescence emission spectrum of a solid support is measured. Sebestyen et al. (1993, Pept. 1992 Proc. 22nd Eur. Pept. Symp. 63-64), Campian et al. (1994, In Innovation and Perspectives on Solid Phase Synthesis; Epton, R., Birmingham: Mayflower, 469-472), and Egner et al. (1997, Chem. Commun. 735-736) have described the use of both chromophoric and/or fluorescent tags for bead labeling in peptide combinatorial synthesis. Although this use provides an advantage for deconvoluting the structure of a library member by determining the absorption or fluorescence emission spectrum of a bead, the encoding of a large library would require the use of many chromophores or fluorophores where spectral superimposition would be a likely drawback.

WO 95/32425 discloses the coupling on beads of (i) fluorescently labelled tags having intensities that differ by a factor of at least 2, and/or (ii) multiple different fluorescent tags that can be used in varying ratios, to encode a combinatorial library. Such beads may be used in concert with flow cytometry to construct a series of combinatorial libraries by split synthesis procedure. Although this method has advantages in relation to providing a lead structure, it is necessary to construct and analyse multiple libraries commensurate with the number of stages used for the combinatorial synthesis, which is cumbersome and time consuming.

WO 97/15390 describes a physical encoding system in which chemically inert solid particles are each labelled with a unique machine readable code. The code may be a binary code although higher codes and alphanumerics are contemplated. The code may consist of surface deformations including pits, holes, hollows, grooves or notches or any combination of these. Such deformations are applied by micromachining. Alternatively, the code may reside in the shape of the particle itself. Solid particles comprising a first phase for combinatorial synthesis and a second phase containing a machine readable code are exemplified wherein the second phase may be superimposed on, or encapsulated within, the first phase. The microscopic code on the particles may be interrogated and read using a microscope-based image capture and processing system. The machine readable code may be read "on-line" between different process steps of a combinatorial synthesis thus allowing the process sequence, or audit trail, for each bead to be recorded.

Nano bar coding for bioanalysis has also been described by Keating, Natan and co-workers (Science, 2001, vol. 294, 137).

Xu et al. (2003) Nucleic Acid Research 31(8):e43 describes the use of combinations of fluorescent semiconductor nanocrystals to encode microspheres. The nanocrystals are too small to allow visualisation of their spatial location in the bead. Furthermore, as overlap of emission spectra needs to be avoided, the number of different nanocrystals that can be used in one bead will be limited.

WO 00/32542 discloses high throughput screening based on carriers having distinctive codes such as electronmagnetic radiation-related compounds. Similar methods have been described by Battersby et al. (2001, Drug Discovery Today, vol. 6, no. 12 (Suppl.), S19-26); Battersby and Trau (2002, Trends in Biotechnology, vol. 20, no. 4, 167-173; Meza (2000, Drug Discovery Today, vo. 1, no. 1, 38-41), and by Farrer et al. (2002, J. Am. Chem. Soc., vol. 124, no. 9, p. 1994-2003).

Many of the disadvantages of the known methods described above, as well as many of the needs not met by these methods, are overcome by the present invention, which, as described herein below, provides several advantages over the above-described prior art methods.

SUMMARY OF THE INVENTION

It is a first object of the present invention to prepare libraries of specific active compounds with respect to biochemical interactions, such as substrate catalysis, purification or isolation of desirable targets, as well as studying host-guest interactions, and preferable materials properties.

This is exemplified by compounds such as e.g. polypeptides (alpha-peptides, beta-peptides, and the like), polynucleotides (DNA, RNA, LNA and PNA, including non-natural and modified nucleotides comprising non-natural or modified nucleobases and/or backbones and/or carbohydrate moieties), as well as carbohydrates, scaffolded small molecules, and mimetics of these compound classes. The libraries are preferably bead based and offer as such several advantages over prior art libraries based on chips and similar solid supports.

The active compounds of the invention can be screened for the identification of novel ligands that interact with e.g. a receptor target of interest. As such, the active compounds can be used e.g. for identifying or further develop potential drug candidates, new catalysts and materials with novel functionalities. One important application of the libraries is in the diagnostic and functional proteomics area. In the following the use is exemplified by the screening of biological targets.

For any given receptor target, the probability of successfully identifying a potent ligand through a process of randomly screening molecular repertoires will increase as the size and structural diversity of the library is also increased. The present invention makes it possible to i) rapidly identify an individual bead in a composition of beads based on individual bead "fingerprints", and ii) immediately "deconvoluting" the sequential steps employed in the solid-phase synthesis of the biologically active compound on the individual bead in question.

In order to solve this problem the invention provides in a first aspect a beaded polymer matrix in which particles, also termed "microbeads" herein, have been immobilized in a random spatial arrangement such that each bead can preferably be uniquely identified by the 3-dimensional pattern formed by the particles. The particles can be labelled particles made from the same polymer material as the base synthesis polymer or they can be composed of a different material. The pattern can be detected by a property of the particle that differs from the surrounding polymer matrix. This difference can be achieved by fluorescence labels, colour labels or by different diffractive or reflective properties of the immobilized material.

The uniquely labelled particles can be divided into portions with recording of their identity and location and subjected to different reaction conditions accordingly. Using combinatorial methods such as "Split and recombine" synthesis it is thus possible to record the precise history of reactions for each particle and thereby the structure of the product formed for each unique bead.

It is furthermore possible after screening and Isolation of active hits to identify the structure of the active beads by recording the encoding pattern of the bead and correlate the pattern with all patterns recorded during the synthesis.

It is also possible to use the tool to perform diagnostic tests with mixtures of active ligands on encoded beads and after measuring the clinical values from the beads decode the results by reading the pattern of the beads.

Additionally, the invention makes it possible to purify and/or isolate targets from a mixture potentially comprising a target having an affinity for a ligand attached to a beaded polymer matrix. The isolation of the target can involve a chromatographic separation step resulting in the separation of the target from the additional components of the mixture. Affinity chromatography as well as any other chromatographic separation step can be employed for the separation and/or isolation of target compounds from a mixture of compounds.

In one aspect the invention provides an encoded beaded or granulated polymer matrix, preferably a matrix suitable for solid phase synthesis or chromatographical applications, said matrix comprising a plurality of spatially immobilised particles or vacuoles, wherein each particle or vacuole is individually detectable.

In another aspect the invention provides a composition comprising a plurality of different, spatially encoded, wherein essentially each bead is individually identifiable.

In order to detect individual beads there is provided in another aspect a method for the detection of relative positions in space of centers (x,y,z) of immobilized particles of the composition according to the invention described herein above, said method comprising the step of recording of at least two 2D-projections of the particles, said method optionally comprising the further step of determining, on the basis of the relative positions in space of centers (x,y,z) of immobilized particles, the distance matrix for individual beads, or a set of geometrical figures, preferably selected from triangles and quadrangels, wherein said geometrical figures are derivable from the above-mentioned distance matrix or the relative positions in space of centers (x,y,z) of the immobilized particles.

For determination of the distance matrix of a beaded or granulated polymer matrix according to the invention there is provided in accordance with the present invention a method for distance matrix determination of at least one spatially encoded beaded or granulated matrix comprising a plurality of spatially immobilised particles comprising an optically detectable label, said method comprising the steps of
   i) providing at least one beaded or granulated polymer matrix according to the invention,
   ii) providing at least one device for recording and storing at least one image of the at least one bead, said device comprising
     a) at least one source of illumination,
     b) at least one flow system comprising a flow cell comprising an imaging section
     c) at least one pulse generator,
     d) at least one image intensifier,
     e) at least one CCD camera,
   iii) activating at least one source of illumination,
   iv) introducing the at least one encoded bead comprising a plurality of particles into the flow cell comprising an imaging section,
   v) recording at least one image of the at least one bead by sending substantially simultaneously a pulse generated by a pulse generator to both a) the at least one image intensifier, and b) the at least one CCD camera capable of recording said at least one image, and
determining for Individual beads a distance matrix based on the at least one image obtained for each bead in step v).

In another aspect there is provided a method for identifying individual beaded polymer matrices in a composition according to the invention, said method comprising the steps of
   i) determining the distance matrix for individual beads according to the method of the Invention,
   ii) deriving from each of the distance matrices generated in step i) all of the possible geometrical figures, such as triangles, which can be generated by connecting particle coordinates with straight lines, and
   iii) recording and storing the set of geometrical figures for each bead of the composition to be identified,
   iv) selecting a subset of beads, and
   v) identifying one or more of the selected beads on the basis of a comparison of the set of possible geometrical figures of said bead(s) with all sets of possible geometrical figures recorded for the composition recorded in step iii).

There is also provided in an alternative aspect a method for identifying at least one individually identifiable, spatially encoded, bead in a composition according to the invention, said method comprising the steps of
   i) determining the unique, spatial position of three or more particles in the at least one bead to be identified,
   ii) deriving from the positions, a matrix of the distances between the three or more particles,
   iii) deriving from the matrix, a set of all possible triangles defined by the coordinates of three or more particles,
   iv) identifying said at least one individually identifiable, spatially encoded bead based on comparison of the set of possible triangles with all sets of possible triangles capable of being stored for the composition of the invention.

In a further aspect of the invention there is provided a method for recording individual reaction steps involved in the step-wise synthesis of a chemical compound on a beaded polymer matrix according to the invention, said method comprising the steps of
   a) spatially immobilizing a plurality of particles in polymer beads or granulates,
   b) isolating, preferably by automated selection, at least a subset of the spatially encoded beads or granulates provided in step a), and
   c) recording and storing a distance matrix or a geometrical figure derivable from the distance matrix for each bead or granule, said distance matrix or geometrical figurde being preferably generated by the methods of the invention disclosed herein,
   d) stepwise synthesising chemical compounds on functional groups of the encoded beads or granules, wherein the identy of each bead or granule is recorded and stored for each reaction step, and
   e) obtaining for each bead a record of individual reaction steps.

In conjunction with the above method for recording individual reaction steps involved in the step-wise synthesis of a chemical compound on a beaded polymer matrix according to the invention there is provided a method for identifying a chemical compound being synthesised on a beaded polymer matrix according to the invention, said method comprising the steps of
   a) performing the recording method cited herein immediately above,
   b) selecting beaded polymer matrices or granules of interest by using an assay or a diagnostic screen selective for the chemical compound having been synthesised on the beaded polymer matrix,
   c) recording the distance matrix for each of the beaded polymer matrices selected in step b),
   e) comparing the distance matrix recorded in step c) with all of the distance matrices recorded and stored in step c) of the above method, thereby obtaining information about the identity of the selected bead,
   f) identifying for each selected bead the sequence of individual steps having lead to the synthesis of the chemical compound, and
   g) identifying, based the sequence of individual steps the chemical structure of the compound.

For performing the above methods there is provided a device for recording and storing at least one image of at least one spatially encoded bead comprising a plurality of particles, said device comprising i) at least one source of illumination, ii) a flow cell comprising an imaging section, iii) at least one pulse generator, iv) at least one image intensifier, and v) at least one CCD camera.

There is also provided a method for generating a beaded or granulated polymer matrix comprising a plurality of spatially immobilised particles according to the invention, said method comprising the steps of a) synthesizing a monomer or macromonomer and a crosslinker for polymerization, and b) mixing these with the encoding particles to give an even dispersion of particles in the mixture, and polymerizing the monomer or macromonomer by either i) suspension polymerisation and/or; ii) inverse suspension polymerisation and/or iii) bulk polymerisation followed by granulation, and/or iv) droplet polymerisation.

BRIEF DESCRIPTION OF THE DRAWINGS

FIGS. 7A and B. Two sets of 3 orthogonal pictures with 3 fluorescent particles immobilised in a bead.

pair-wise distances between the encoding vectors, while the inset uses all 50 millions. Note that only in 2 out of 10,000 cases ∩v P 12 units, and that in none of the 50 million pairs ∩v P 3 units.

Figure 9:
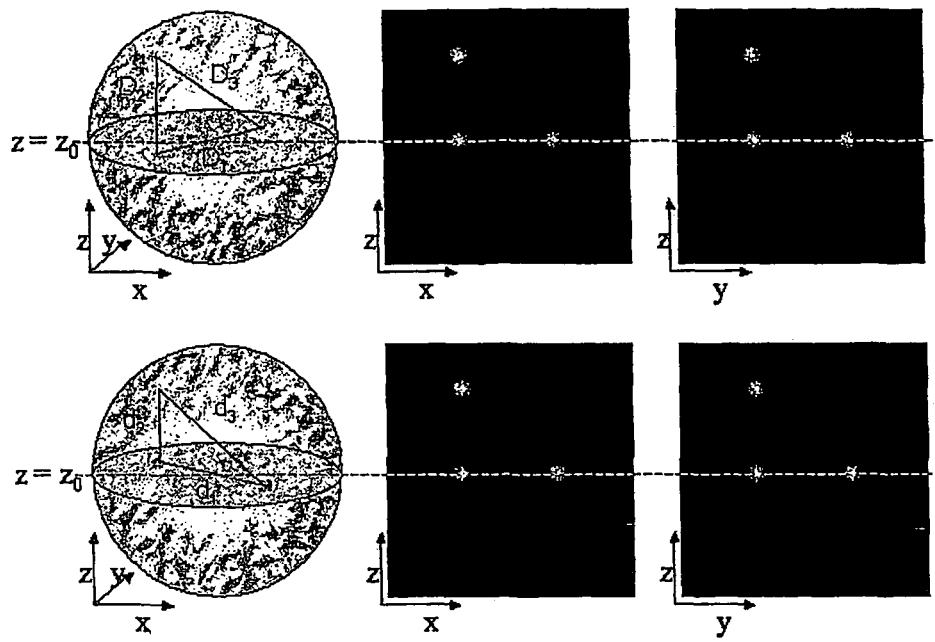

FIG. 9. Illustration of the correspondence problem in the case where a pair of orthogonal fluorescence images (right) give rise to two spatial interpretations (left).

Figure 10:
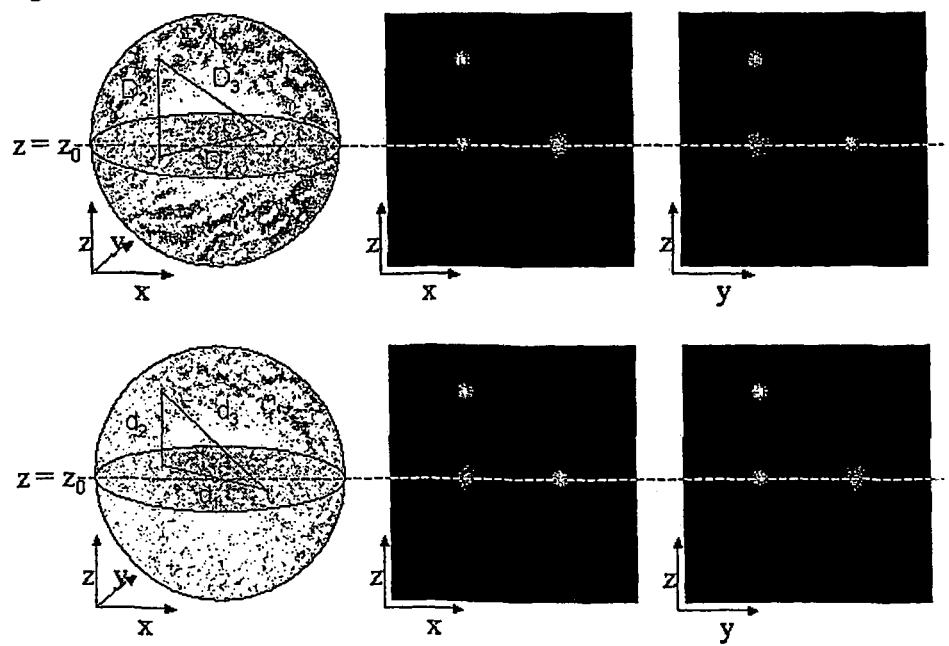

FIG. 10. Illustration of the correspondence problem in the case where a pair of orthogonal fluorescence images (right) give rise to each one 3D-interpretation (left) due to the difference in sharpness and intensity of individual spatially immobilised particles.

FIG. 11. C versus M and δ (upper), E versus M and δ (lower). δ is given in micrometers.

Figure 12:
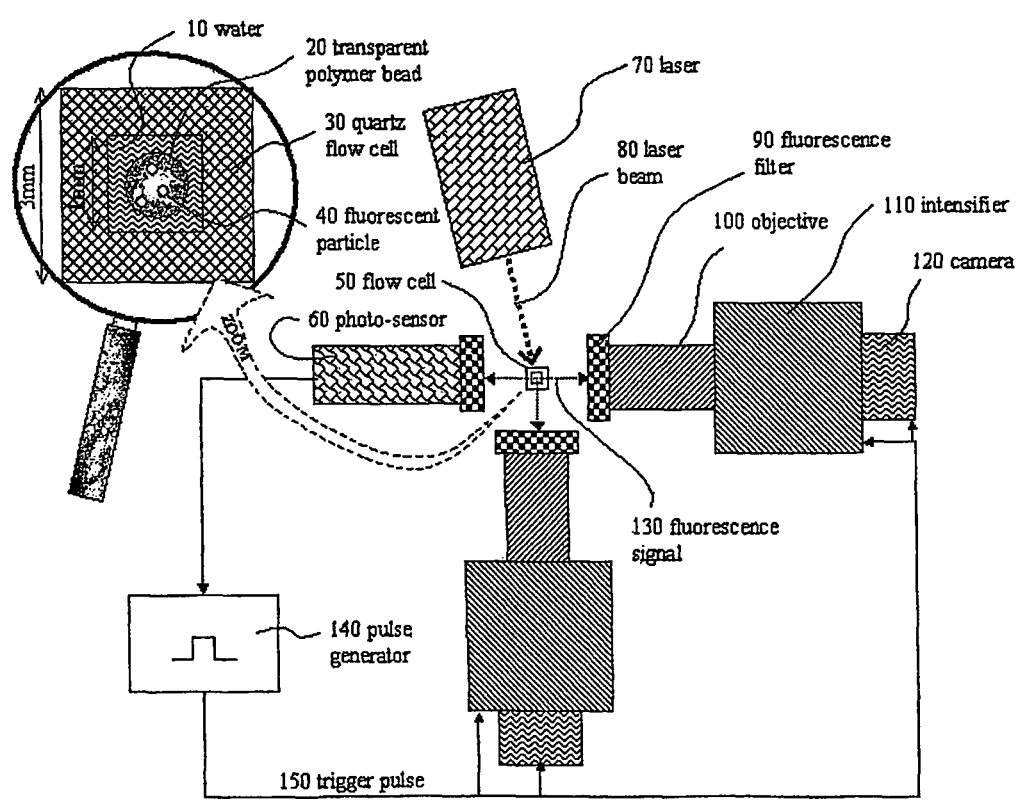

FIG. 12. One embodiment of the encoded bead reader.

Figure 13:
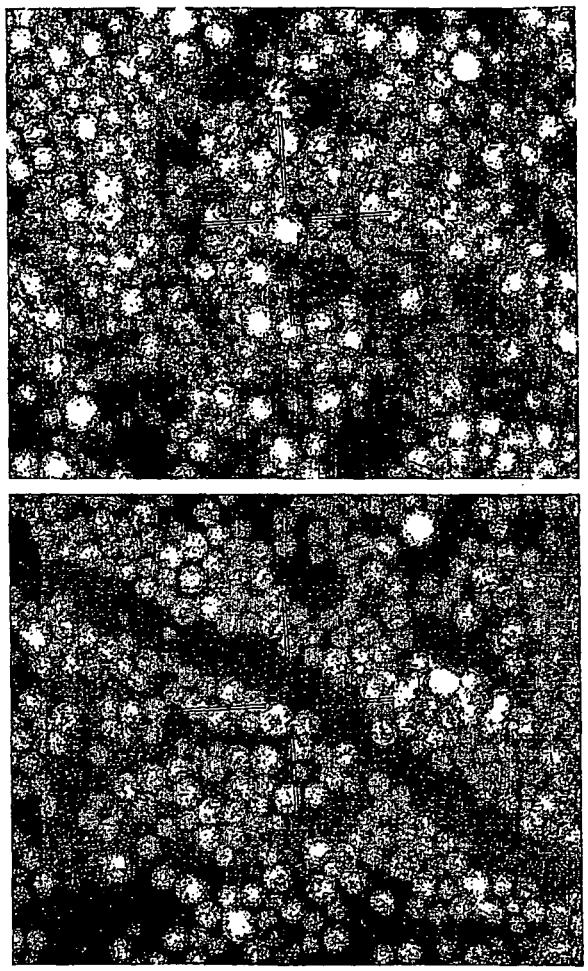

FIG. 13. Micrographs of micro beads before (upper) and after (lower) centrifugation. 20×-lens was used. The black lines in the image are 50 micrometers long.

Figure 14:
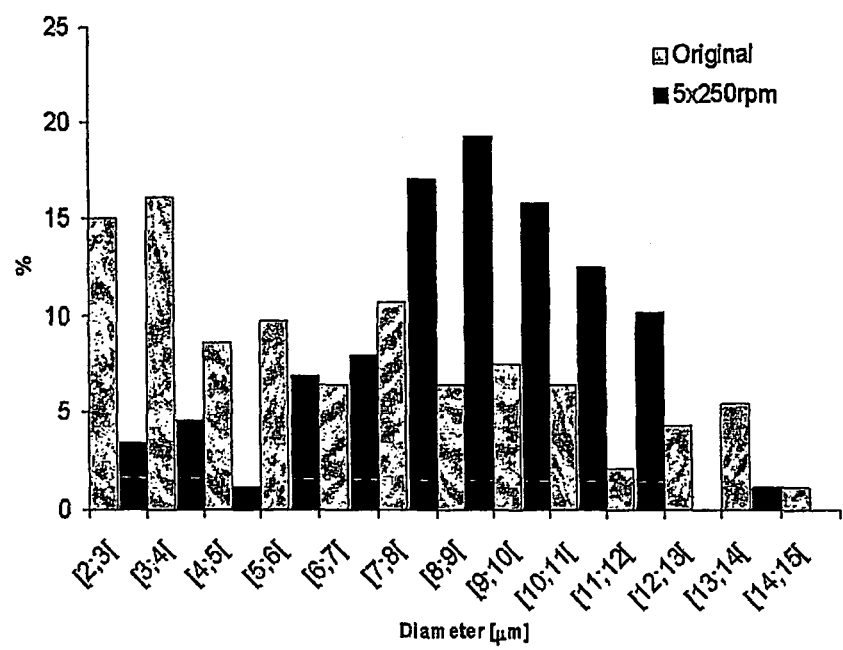

FIG. 14. Size distribution before and after centrifugation. (Total number of micro beads measured was 93 before centrifugation and 88 after centrifugation.

Figure 15:
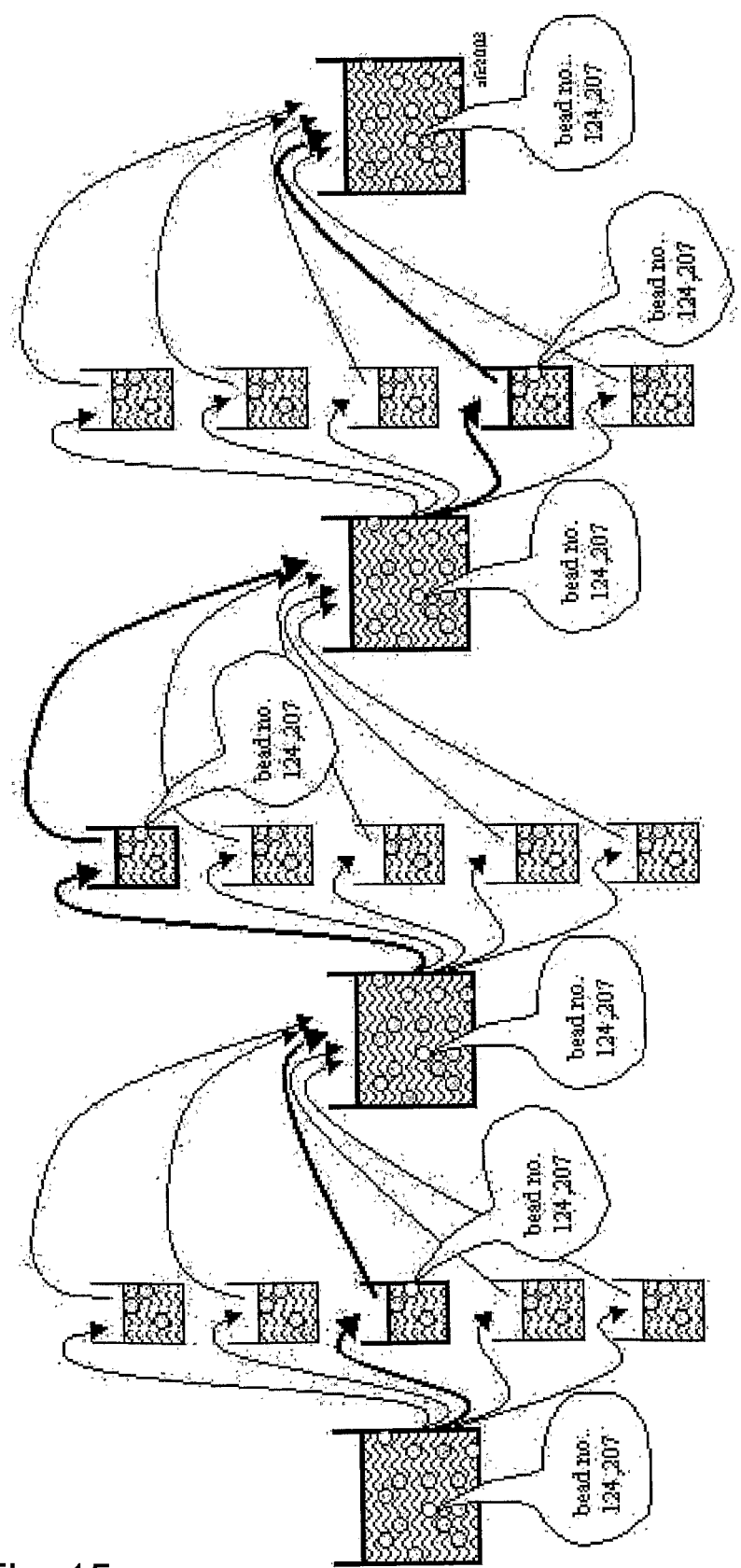

FIG. 15. Schematics of tracing hits backwards through a combinatorial chemistry route. This requires that all encoded beads are read by an encoded bead reader when fed to a reaction jar (small cups in the image) and/or when removed from a reaction jar during the combinatorial chemistry synthesis.

Figure 16:
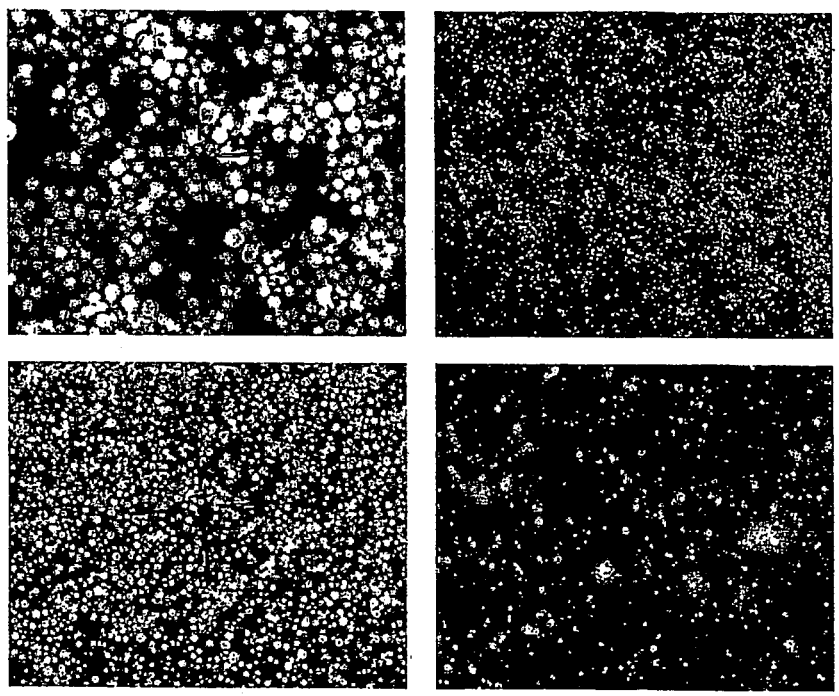

FIG. 16. Fluorescence images of stained microbeads JHT466 (upper left), JHT472 upper right, JHT471 (lower left), and JHT473 (lower right). The black bars in the images are 25 micrometers long.

Figure 17:
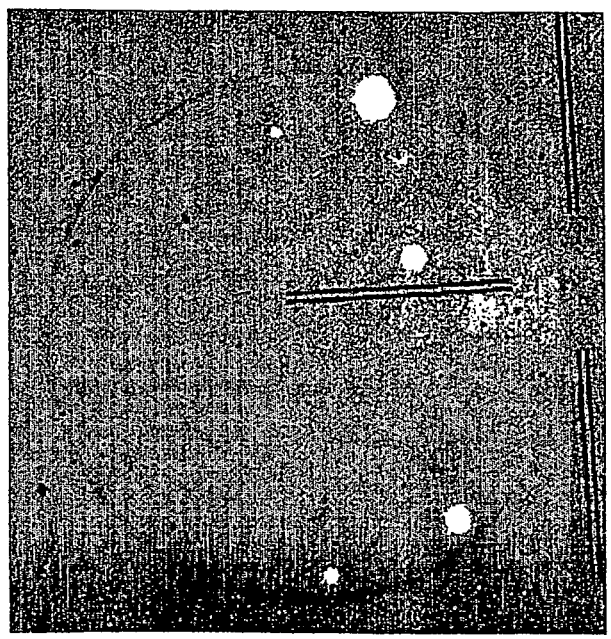

FIG. 17. Encoded bead from sample JHT476. The black lines in the image are 80 mm long.

Figure 18:
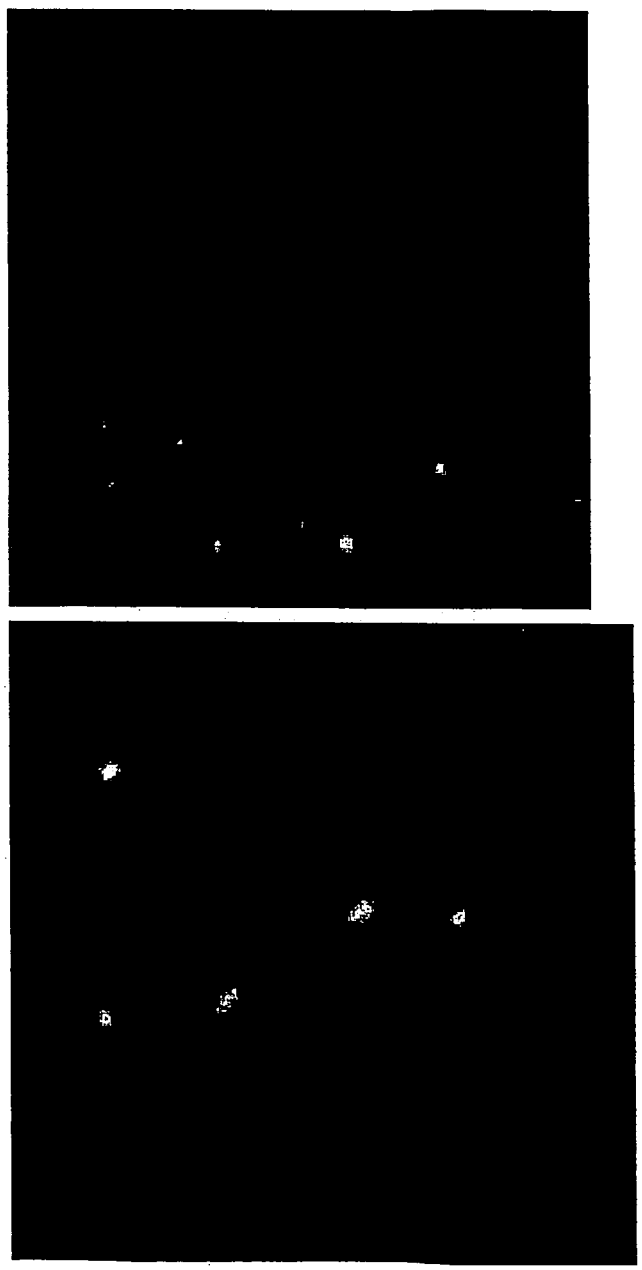

FIG. 18. A pair of orthogonal fluorescence images of an encoded bead from batch JHT483. The upper image is the x,z-projection, with the x-direction upwards and the z-direction to the right. The lower image is the y,z-projection, with the y-direction upwards and the z-direction to the right. The images measure 1 mm×1 mm.

FIG. 19. The number of encoded beads with correspondence problem, C, versus the average number of immobilised particles per encoded bead, M and the uncertainty involved in the determination of the immobilised particle positions, δ (upper), and the number of not identified encoded beads, E, versus M and δ (lower). δ is given in micrometers.

Figure 20:
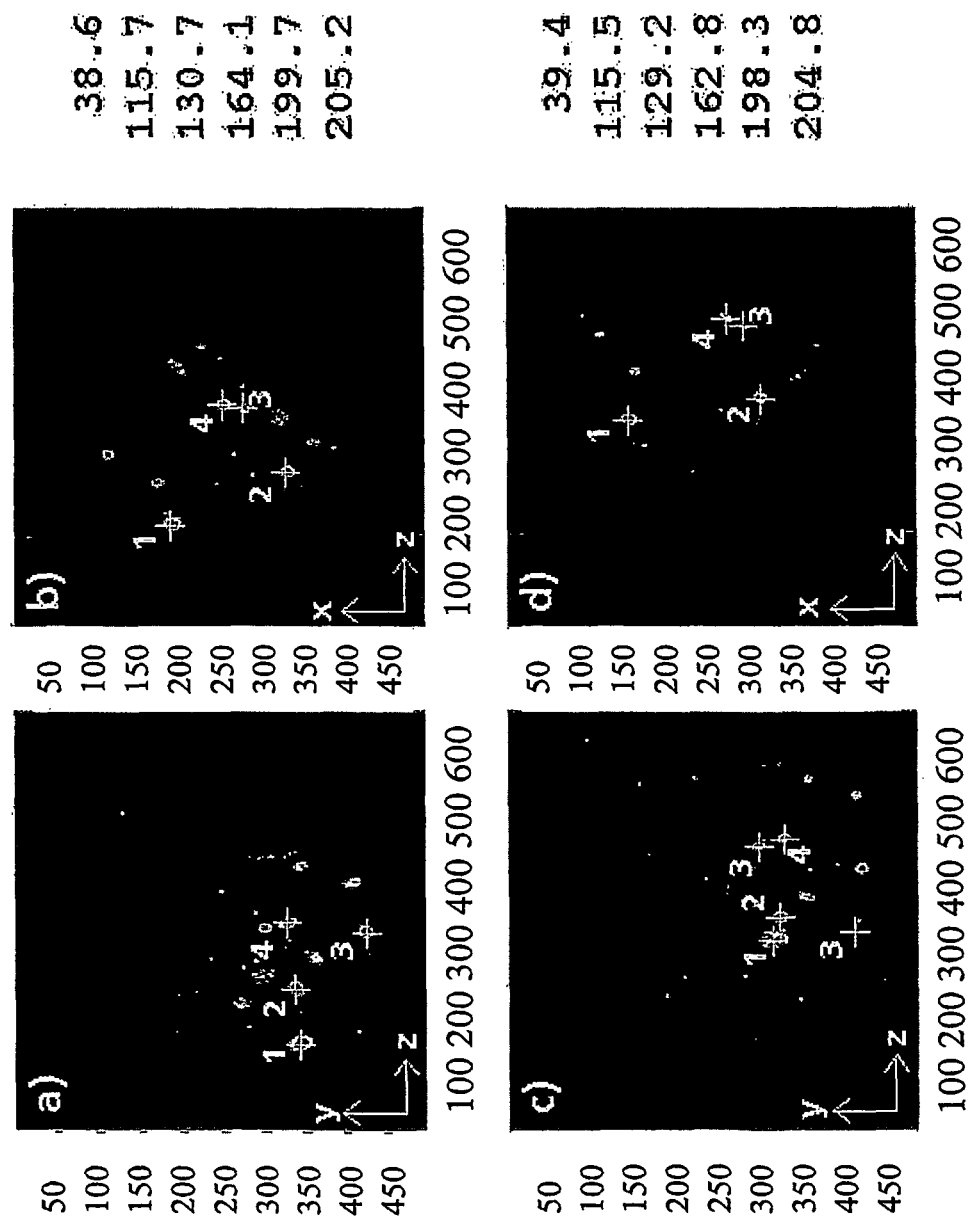

FIG. 20. Two pairs of orthogonal images from one image sequence of an encoded bead are shown in this figure.

FIG. 21. Table 1 visually identified beads in each reaction step indicating amino acid sequence and verification of the result by Edman degradation sequencing.

Figure 21A:
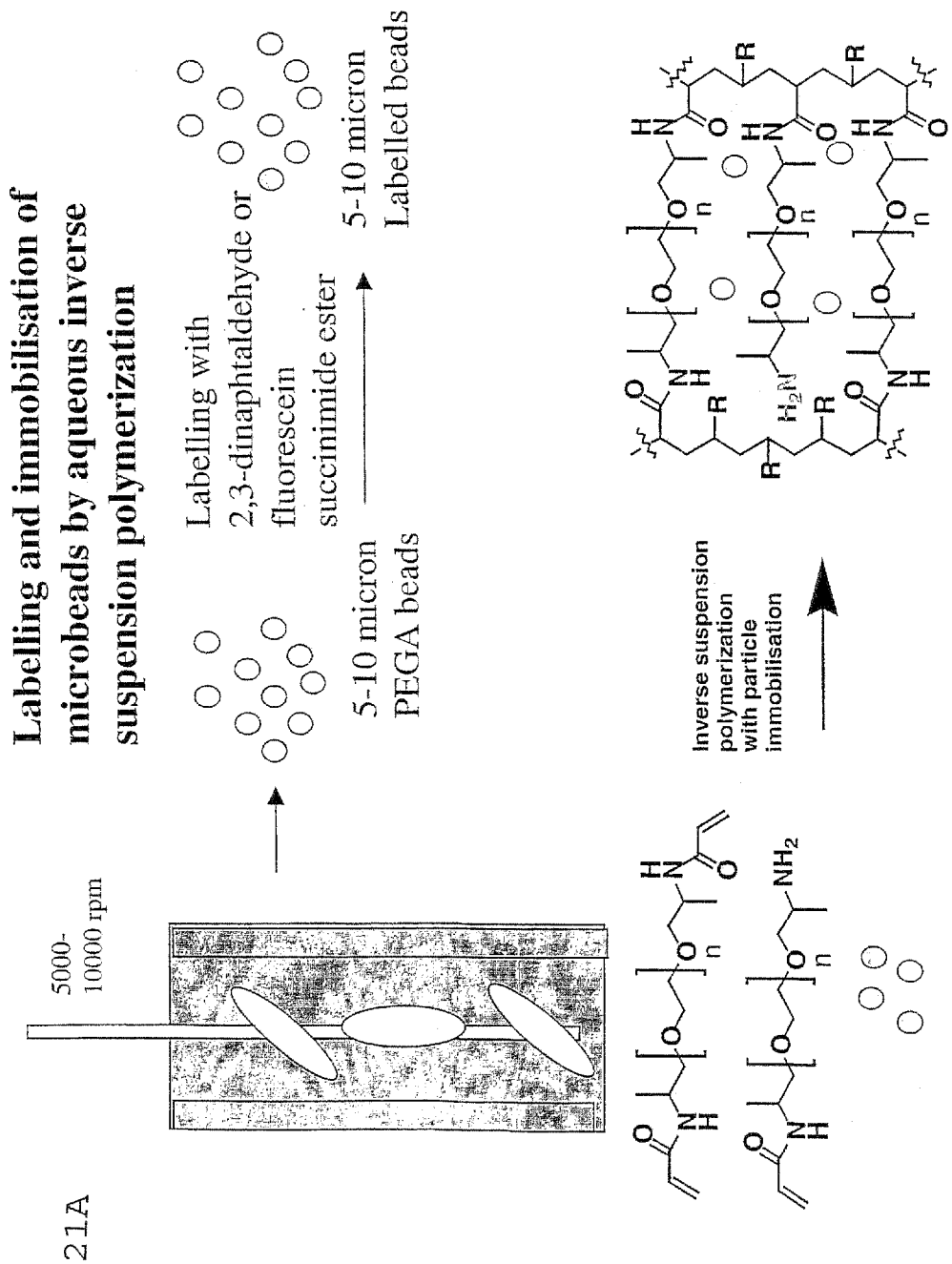
Figure 21B:
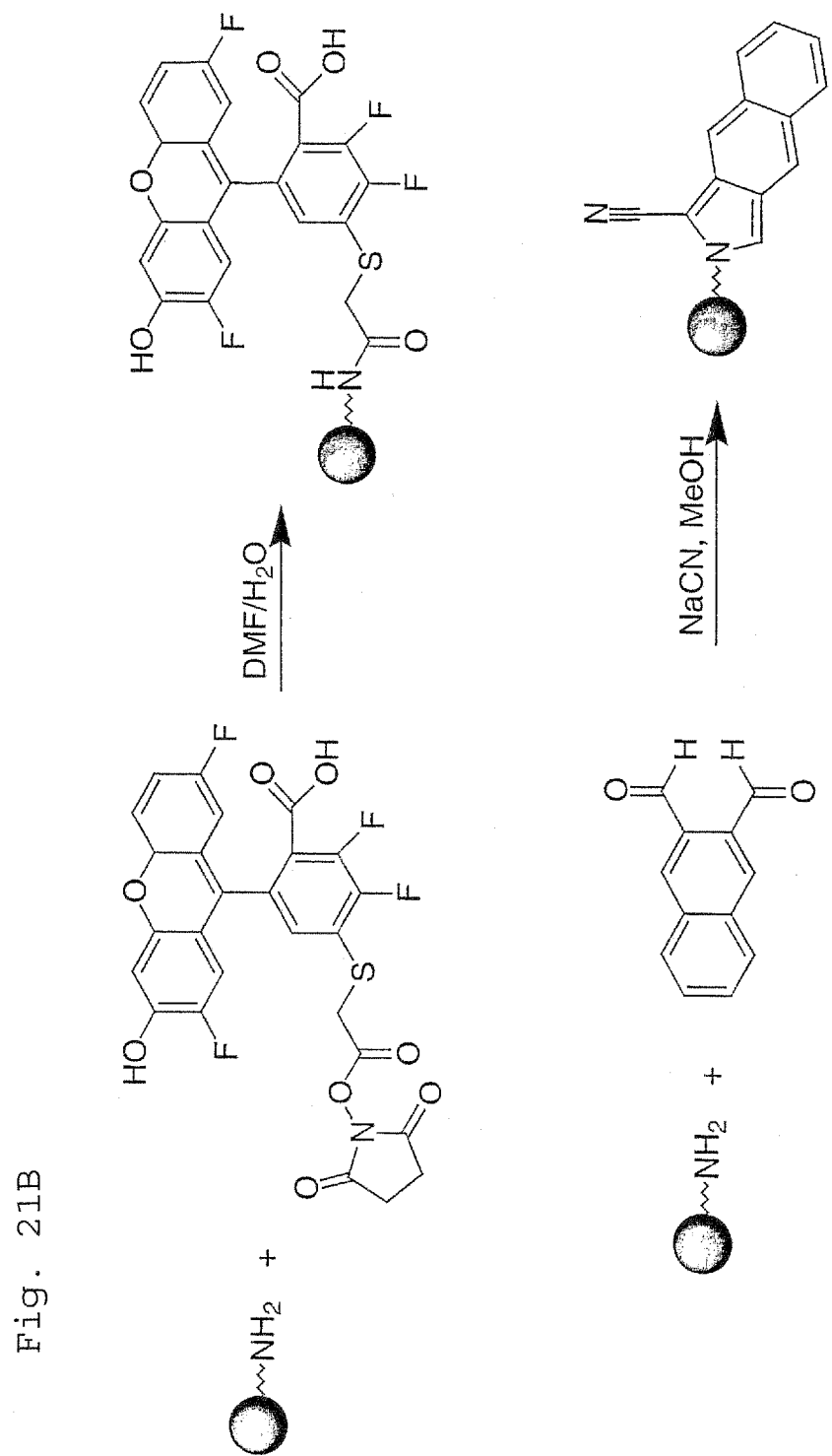

FIG. 21 (Scheme 1): FIG. 21A shows the immobilization of fluorescently labeled small PEGA-particles in a PEGA-polymer by inverse suspension polymerization of a mixture of small labeled particles with partially acryloylated bis-amino PEG. FIG. 21B shows labeling of the beads illustrated in FIG. 21 with 2,3-dinaphtaldehyde in the presence of DMF/H2O (bottom), or fluorescein succinimide ester in the presence of NaCN, MeOH (top).

Figure 22A:
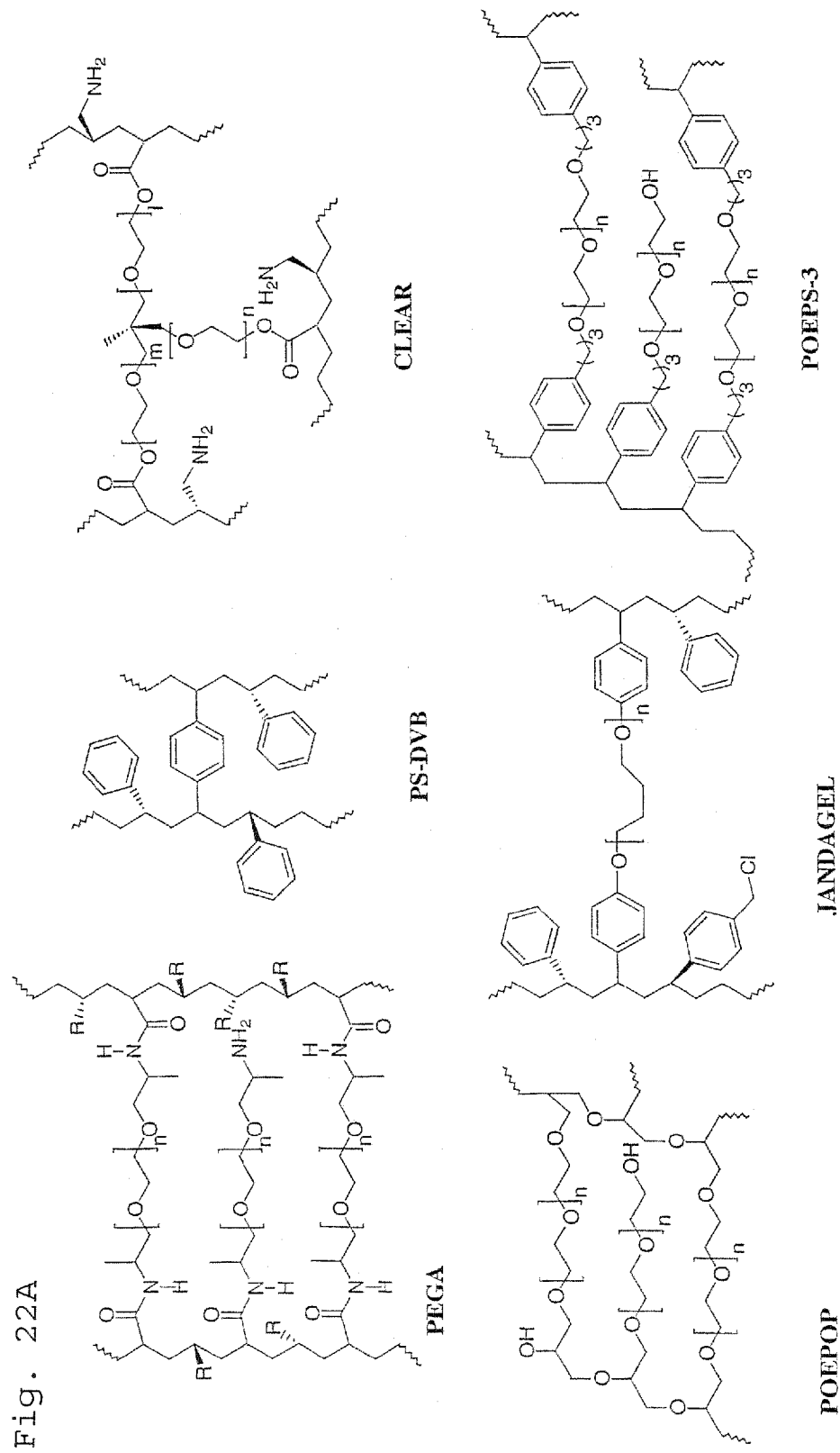
Figure 22B:
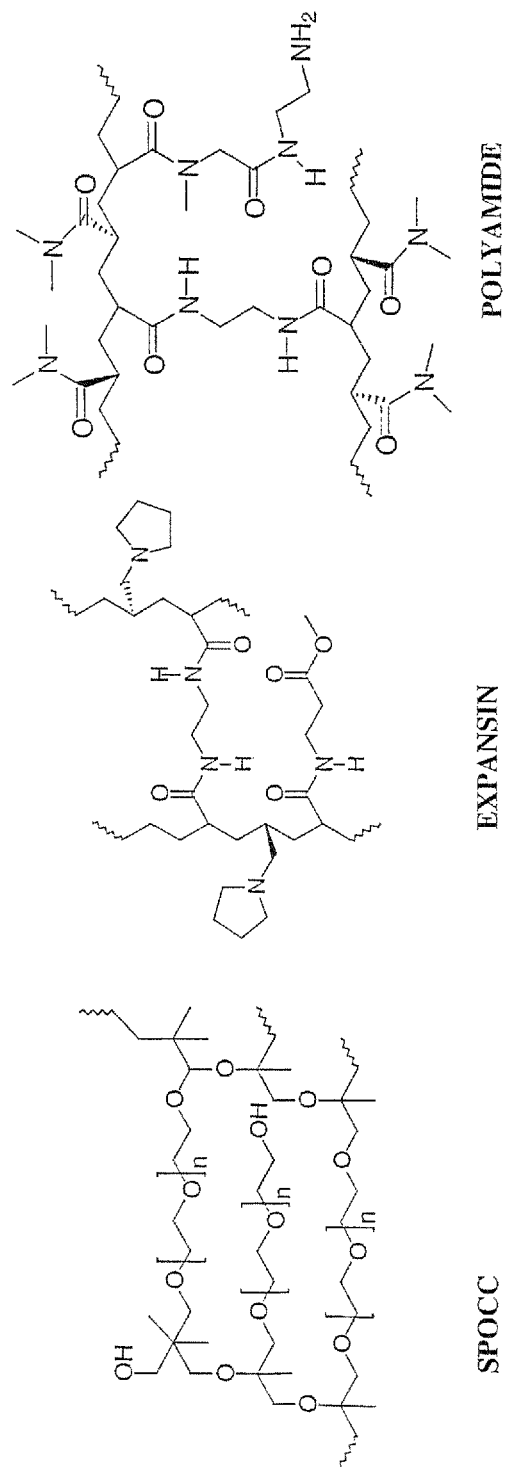

FIG. 22 (Scheme 2): FIG. 22A shows polymers particularly useful for immobilization of encoding particles are: PS, POEPS, POEPOP, PEGA, CLEAR, Jandagel or derivatives of any of these. Alginates, gelatines, aluminas, pore glasses and silicas are other types of useful supports. FIG. 22B shows further polymers particularly useful for immobilization of encoding particles are: SPOCC, Expansin, Polyamide or derivatives of any of these. Alginates, gelatines, aluminas, pore glasses and silicas are other types of useful supports.

Figure 23:
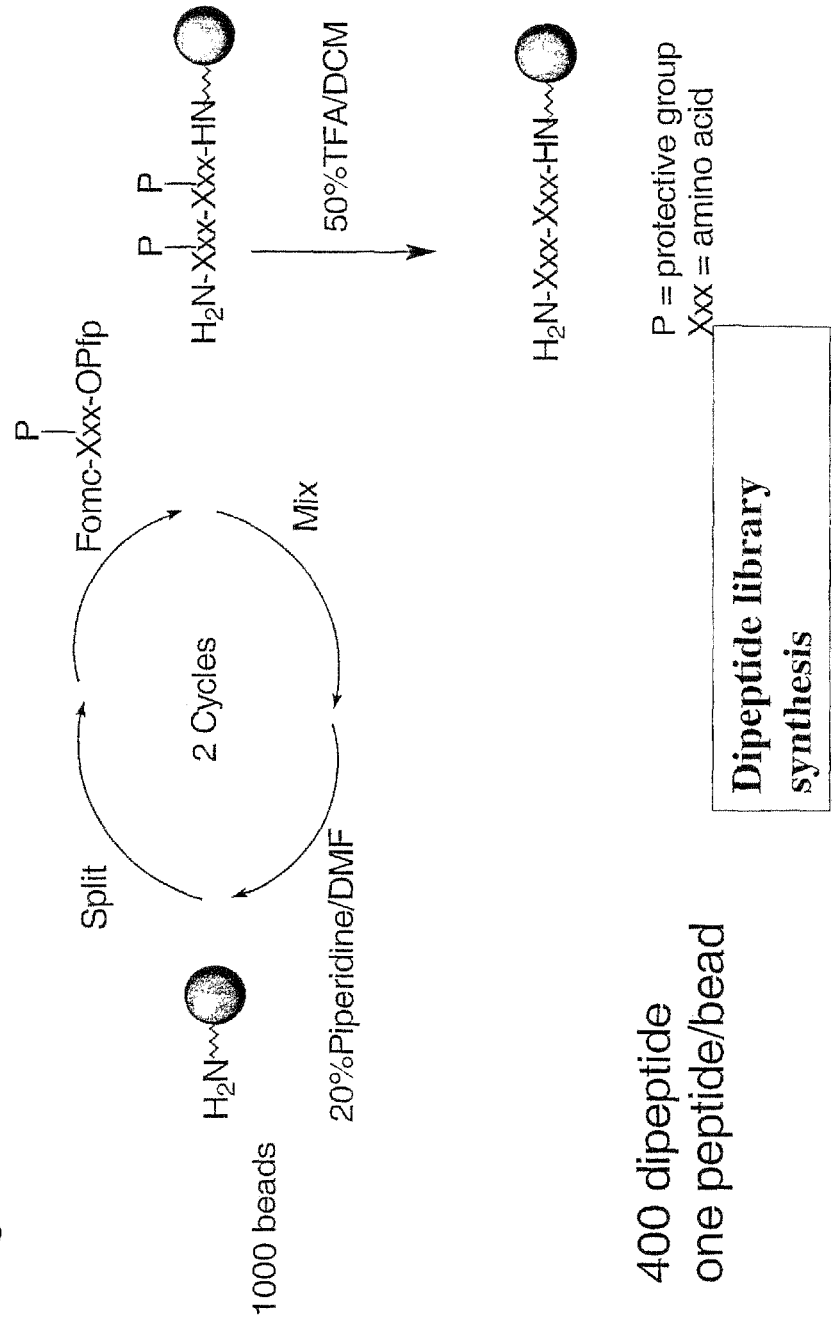

FIG. 23 (Scheme 3): shows split and combine synthesis of a library of 400-dipeptides on 1000 beads with reading of encoding at each reaction step.

DEFINITIONS

Beaded polymer matrix: A beaded polymer matrix is a crosslinked polymer formed by beading according to principles of suspension or inverse suspension polymerization, by spray polymerization, or by droplet polymerisation.

Bioactive compound: Molecules comprising a sequence of building blocks, which includes e.g. L-amino acids, D-amino acids, or synthetic amino acids, such a beta-amino acids, as well as natural and non-natural nucleotides and polynucleotides, and carbohydrates. It will also be understood that different basis sets of building blocks may be used at successive steps in the synthesis of a compound of the invention.

Carrier: Used interchangably with a beaded polymer matrix or a granulated polymer matrix.

Code: Used interchangably with the unique nature of individually identifiable beads or granules the identification of which resides in the unique spatial distribution of a plurality of particles or vacuoles. The code for each bead or granule is unique.

Coordinates: The coordinates are relative spatial coordinates assigned to particles in the bead 2 D-coordinates: these are coordinates of particles in a 2-D projection of the particle along one of three orthogonal axes.

Encoded beaded polymer matrix: This is a beaded polymer matrix formed by polymerization of a monomer mixture comprising a dispersion of particles.

Essentially: This term signifies that a physical process often yields a result that deviates from the theoretical result expected due to inheterogeniety and incomplete control of the process.

Essentially monodisperse: This indicate that a slight tendency towards inhomogenous location of particles can be expected due to differences in density and aggregation phenomena.

Essentially spherical: Any spherical object for which the distance from the gravitational centre to any point on the surface of the object is in the range of from a quarter of the average distance from the gravitational centre to the surface to preferably less than four times the average distance from the gravitational centre to the surface.

Essentially the same diameter: The diameters are never identical since a gaussian distribution of bead sizes is obtained during polymerization Fluorescently detectable: An unsaturated organic molecule, a complex, an alloy or a transition metal that is excited at one wavelength and due to electronic structure and heat emmision return to ground state with emmision of a photon at a different wavelength, which can be detected.

Granule: An essentially spherical object having an irregular form.

HYDRA: PEG-triaminoethylamine star copolymer.

Individually detectable: This refer to the separation of beads in a fluidic stream of beads that allow recording of the encoding pattern of each individual bead.

PEGA: PEG-acrylamide copolymer (may be alkylated on amide)

Photon fluorescence spectroscopy: One photon fluorescence spectroscopy, which is the same as standard fluorescence spectroscopy, is based on the facts that a molecule can be excited by a single photon, and that the excited molecule after a internal process emits a photon with a lower energy than the excitation photon. The energy (the spectrum) as well as the rate of emission is specific for the molecule in its specific environment. Two-photon excitation of fluorescence is based on the principle that two photons of longer wavelength light are simultaneously absorbed by a fluorochrome which would normally be excited by a single photon, with a shorter wavelength. The non-linear optical absorption property of two-photon excitation limits the fluorochrome excitation to the point of focus.

POEPOP: Polyethyleneglycol-polyoxypropylene copolymer

Resolution: This term refers to the resolution of a detection method, in a cod framegrap this is defined by the number of pixels and the optics used to produce the picture, in a scanning laser detection this relates to the cross-section of a laser beam at the point of excitation.

Solid phase synthesis: Synthesis where one of several of the reactants forming the target molecule is attached to a solid support e.g. a beaded polymer matrix.

Spatial position: Position of a bead or particle in space defined by Cartesian coordinates Spatially immobilised particles: Particles which are immobilized in a surrounding polymer matrix in such a way that the individual distances between the immobilized particles are constant in a particular solvent.

SPOCC: Polymer obtained by ring opening polymerisation of partially or fully 3-methyloxetan-3-ylmethyl alkylated PEG.

Swelling: When beads or granules or particles or vacuoles are capable of swelling, any physical measurement of the afore-mentioned, including size determinations and volume determinations, refer to measurements conducted for the swelled bead or granule or particle or vacuole. Swelling of the beads are for practical reasons measured as the volume of a packed bed of beads swollen in a specific solvent and divided by the dry weight of the beads. The unit is given as ml/g. Typical solvents are water, methanol and dichloromethane, but any suitable solvent may be chosen. When the refractive index of the swollen bead or granule is different from the refractive index of the surrounding solvent the swollen bead or granule will function as an optical lens. When the relative positions of immobilised particles inside the swollen beads or granules are determined by optical means this lens effect may give rise to inaccurate determination of the relative positions of the immobilised particles. Preferred solvents give rise to as little difference in refractive index between the solvent and the swollen bead or granule as possible. For instance when the polymer matrix comprises cross-linked polyethyleneglycol a one-to-one mixture of ethanol and glycerol gives rise to nearly no refractive index difference.

Unique distance matrix: Each bead is uniquely identified by an orientation independent distance matrix describing the relative positions of particles within the encoded bead.

Uniquely identifiable: Used herein interchangeably with "individually identifiable", i.e. that a single bead can be identified on the basis of the spatial configuration of the particles immobilised in the bead. The encoded beads are "individually identifiable" within the limits of statistical probability of occurrence of identical beads and resolution of identification method. In one embodiment, with a practical resolution of 1:100 and only 4 encoding particles the probability of e.g. selecting two identical beads is $10^{-5}$ according to Monte- Carlo simulation. A total of ~$10^{15}$ different beads may be encoded. More preferably, more than 95%, such as more than 97%, for example about or more than 98%, such as about or more than 99% of all beads will be "individually identifiable" under practical circumstances.

Vacuole: Space comprising gaseous or liquid composition of matter, wherein said matter is identifiable by having at least one spectroscopically or optically detectable parameter which distinguishes the vacuole from the beaded polymer matrix.

DETAILED DESCRIPTION OF THE INVENTION

Distance Matrix Determination

In one embodiment, the spatial immobilisation of the plurality of particles in each beaded polymer matrix is essentially unique for each bead. The spatial positions of particles in each bead can be defined by sets of coordinates, (x,y,z) of particle centers of said particles, relative to one reference point of the detection. Furthermore, the relative positions in space of centers (x,y,z) of immobilized particles can be detected based on recording of 2D-projections of the particles.

In one embodiment, 3 2D-projections are recorded along 3 orthogonal axis x, y and z to generate 3 sets of 2D-coordinates (y,z), (x,z) and (x,y), respectively, from which the 3D-coordinates (x,y,z) of particle centers can be derived. A stack of 2D projections can be generated by confocal or focal microscopy to recreate the 3D image matrix of the bead from which the relative particle position (x,y,z) in space can be determined.

One method for determination of relative particle positions within a bead can be based on focussed scanning lasers and laminar fluidics, preferably methods in which the coordinates x and y of a particle position is determined by fast scanning two orthogonally aligned lasers over two cross sections of the moving bead while the z coordinate is determined by the time of flight of the bead at known flow rates. Accordingly, it is possible to determine the coordinates x and y of a particle position by using a single laser and a rotating mirror that via 2 or three geometrically arranged static mirrors reflects the laser beam along 2 or 3 orthogonal axis A further method for determination of relative particle positions within a bead can be based on phase shifting digital holography, which determines the 3D structure of the interface between the particles and the surrounding polymer of the bead based on the reflections of light of said interface [Ichirou Yamaguchi, Jun-ichi Kato, Sohgo Ohta, and Jun. Mizuno, 1 Dec. 2001, Vol. 40, No. 34, APPLIED OPTICS], [Etienne Cuche, Fr'ed'eric Bevilacqua, and Christian Depeursinge Mar. 1, 19991/Vol. 24, No. 5/OPTICS LETTERS 291].

Accordingly, one method for recording the unique pattern of each encoded bead comprises the steps of recording the relative coordinates of the center of the spatially immobilised particles and calculating a distance matrix based on the recorded coordinates. Accordingly, it is possible to convert the relative coordinates into absolute and unique parameters for each bead by generating for each bead a distance matrix of inter particle distances.

The coordinates of the particles in a bead can be generated in a variety of different ways.
1. A laser or conventional light excitation of the entire bead can be combined with detection along 3 orthogonal axis with three CCD cameras and the three sets of coordinates measured in 2D X,Y; Y,Z and X,Z for each particle can be used to correlate the particles to give a unique set of parameters XYZ for each immobilized particle.
2. A principle of focal or confocal microscopy can be used to obtain a 3D representation of the bead in which the 3 coordinates are the x and y of the particle in the a particular picture while the z-coordinate is derived from the focal depth.
3. Using fluorescence labelled particles a set of two focussed alternating scanning lasers along two orthogonal axis can excite the fluorophores on a moving particle in a flowcell and the fluorescence recorded with a pmt. The coordinates are generated from the two excitation positions and the position of the bead in the fluidic stream. This bead position is measured by the time of flight of the bead as determined from extinction measurement on one of the lasers.

The methods and spatially encoded beads described above can be used to identify single beads out of a very large assembly of beads by rapid decoding at any point of process time. They can furthermore be used in connection with diagnostic kits where a large mixture of beads are used in a fashion similar to that of spatial arrays of e.g. DNA or protease substrates.

When polymer beads encoded with spatially immobilised particles are to be identified by the distance matrix between said spatially immobilised particles, the relative position of each particle must be determined unambiguously within some acceptable experimental error.

To a large extent this can be done by multiple imaging or laser scanning. However, erroneous distance matrices may result in cases where the optical data obtained gives rise to two or more three-dimensional (3D) interpretations. For instance, when encoded beads are viewed from two orthogonal angles corresponding to an x,z-projection and a y,z-projection, a "correspondence problem" arises when two or more spatially immobilised particles have the same z-value within the optical accuracy of the equipment. One example of the "correspondance problem" arising from one set of images giving rise to two or more possible 3D-structures is illustrated in FIG. 9.

Below is provided three non-limiting examples of conceivable solutions to the "correspondence problem" illustrated in FIG. 9:

Solution 1: Focal Depth Evaluation

Spatially immobilised particles positioned at the focal plane of the imaging objective appear as sharp and intense bright spots, whereas particles positioned away from the focal plane of the objective appear as less sharp and less intense, the sharpness and intensity gradually decreasing as the distance from the particle to the focal plane increases.

In case that the dimensions of the imaging section exceeds the focal depth of the objectives, any 2D-projection will—apart from giving the 2D-positions of each particle—also provide information about the distance of each microbead from the focal plane. This information can be used to distinguish between spatially immobilised particles which are otherwise indistinguishable or result in the calculation of more than one distance matrix.

One example of the correspondence problem is given in FIG. 10.

Solution 2: Principal Component Projection

This solution is provided essentially by performing the method steps listed herein below:
1. Obtaining an orthogonal pair of images of each spatially encoded bead,
2. Determining the 2D-positions of each spatially, immobilised particle in each of said two orthogonal images, 3. Combining the resulting two orthogonal sets of 2D-positions whereby the set of possible sets of 3D-positions is obtained for each spatially encoded bead.
4. Calculating the principal component axis, x', y', z', of one of set of possible sets of 3D spatially immobilised particle positions.
5. Calculating the projected set of 3D spatially immobilised particle positions by projecting the 3D spatially immobilised particle positions onto said principal component axis.
6. Calculating the projected distance matrix based on the projected set of 3D spatially immobilised particle positions.
7. Identifying single spatially encoded beads by comparing the full set of projected distance matrices of single spatially encoded beads against the full set of projected distance matrices of all spatially encoded beads. The best fit of single projected distance matrices hereby obtained identifies single spatially encoded beads.

Encoded bead identification based on the principal component projected distance matrix is considerably more stable towards mismatching of spatially immobilised particles than encoded bead identification based on the conventional distance matrix.

Solution 3: Multiple Distance Matrix Calculation

A multiple distance matrix can be calculated by performing the steps of
1. Obtaining an orthogonal pair of images of each spatially encoded bead,
2. Determining the 2D-positions of each spatially immobilised particle in each of said two orthogonal images,
3. Combining the resulting two orthogonal sets of 2D-positions whereby the set of possible 3D-positions is obtained for each spatially encoded bead.
4. Computing the set of distance matrices corresponding to the set of 3D-positions thus determined.
8. Identifying single spatially encoded beads by comparing the full set of distance matrices of single spatially encoded beads against the full set of sets of distance matrices of all spatially encoded beads. The best fit of single distance matrices hereby obtained identifies single spatially encoded beads.

Theoretical Design Criteria for Identifying Spatially Encoded Beads

In order to demonstrate the versatility of the above methods, theoretical design criteria for spatially encoded beads with optimal features for identification can be obtained by
1. Forming a virtual set of spatially encoded beads in a computer on the basis of a set of spatially encoded bead properties, e.g., spatially encoded bead size distribution, spatially immobilised particle size distribution, and number of spatially immobilised particles per macrobead. Also, optical parameters should be included in the analysis, especially the uncertainty involved in the determination of the spatially immobilised particle positions,
2. Simulating random rotation of all spatially encoded beads,
3. Computing one pair of orthogonal projections of each of the spatially immobilised particles of each spatially encoded bead,
4. Combining the two orthogonal sets of 2D-positions whereby the set of possible 3D-positions is obtained for each spatially encoded bead,
5. Computing the set of distance matrices corresponding to the set of 3D-positions thus determined,
6. Identifying single spatially encoded beads by comparing the full set of distance matrices of single spatially encoded beads against the full set of distance matrices of all spatially encoded beads. The best fit of single distance matrices hereby obtained identifies single spatially encoded beads.
7. Registering the number of not-identified spatially encoded beads,
8. Varying one or more spatially encoded bead parameters and repeating the sequence 1 to 7 a one or more times.

Finding Theoretical Encoded Beads (EB) Design Criteria

A virtual set of N=5000 spatially encoded beads was formed in a computer with the use of a MatLab code. The following input parameters were used:

| Input parameter | Symbol | Value | Unit |
| --- | --- | --- | --- |
| EB diameter | D | 800 | micrometers |
| Spatially immobilised particle diameter | d | 10 | micrometers |
| Number of spatially immobilised particles per EB | M | 5 | — |
| Standard deviation of the error of the spatially immobilised particle positions | δ | 4 | micrometers |

This virtual set of spatially encoded beads was fed to a MatLab code for multiple distance matrix identification, which gave rise to the following output parameters:

| Output parameter | Symbol | Value | Unit |
| --- | --- | --- | --- |
| Number of spatially encoded beads with correspondence problem | C | 458 | |
| Number of ill-identified spatially encoded beads | E | 165 | |

The number of spatially immobilised particles per spatially encoded bead, M, and the standard deviation of the error of the spatially immobilised particle positions, δ, were varied stepwise and fed to the multiple distance matrix ID code.

The result in terms of the number of spatially encoded beads with correspondence problem, C, and the number of ill-identified spatially encoded beads, E, is given in FIG. 11 where C and E are plotted against M and δ.

It can be seen from the upper plot of FIG. 11 that the number of correspondence problems increases with increasing number of spatially immobilised particles and with the error associated with the determination of the relative spatially immobilised particle positions as one would expect.

The lower plot in FIG. 11 shows that in order to minimize the number of ill-identified spatially encoded bead, each spatially encoded bead should preferably comprise from 4 to 6 spatially immobilized particles. However, other numbers are also possible, such as from 3 to 8 spatially immobilised particles, for example 3 or 4 spatially immobilised particles, such as from 6 to 8 spatially immobilised particles for example 3, 4, 5, 6, 7, or 8 spatially immobilised particles.

At numbers of spatially immobilised particles below 4, the number of ill-identified spatially encoded beads increases abruptly, and at numbers higher than 4 spatially immobilised particles, the number of ill-identified spatially encoded beads increases gradually. The plot further shows that the number of ill-identified spatially encoded beads gradually increases with the positional error, and that the method breaks down when the positional error involved in the determination increases from 6 to 8 micrometers. These results can be used as design parameters for generating individually identifiable, spatially encoded beads.

For finding the 2D spatially immobilised particle-positions in images with the use of MatLab Imaging toolbox, it is possible to use e.g. a number of Gauss models, such as from 6 to 8 Gauss models, with same shape and varying size are applied to the image. For each Gauss model applied, one goodness-of-fit images are generated with the use of linear filtering. A new image is generated on the basis of the goodness-of-fit images as pixelwise maximum of the goodness-of-fit images. The 2D spatially immobilised particle-positions can be found in this image as the positions of local maxima that have a goodness-of-fit value above a pre-set threshold value.

Encoded Bead Reader Device

In preferred embodiments of the present invention it is desirable to read distance-encoded synthesis beads at a high rate, i.e. reading at least 5000 spatially encoded beads per hour. The reading must result in data from which the distance matrix of individual spatially encoded beads can be extracted.

For this embodiment the present invention provides an encoded bead reader device which is described in more detail herein below.

In one preferred embodiment there is provided a device for recording and storing at least one image of at least one spatially encoded bead comprising a plurality of particles, said device comprising i) at least one source of illumination, preferably a continuous wave laser, ii) a flow cell comprising an imaging section, iii) at least one pulse generator, iv) at least one image intensifier, and v) at least one CCD camera, such as two or more CCD cameras. The device can further comprising a photo-sensor.

The encoded bead reader device comprise or be linked to a computer running a program for calculation of distance matrices for individual spatially encoded beads.

The photo-sensor for detecting entry of an encoded bead into the imaging section of the flow cell preferably comprises an optical objective for focussing said imaging section of said flow cell onto the photo-sensitive area of said photo-sensor. The optical objective of said photo-sensor preferably comprises a fluorescence filter for blocking the light of said laser, and the fluorescence filter is capable of transmitting the fluorescence emission from an individual encoded bead.

The CCD-camera(s) for recording at least one fluorescence image of an individual encoded bead preferably comprises a gated image intensifier for amplifying the fluorescence emission from the encoded bead. Each of the gated image intensifiers preferably comprises an optical objective for focussing said imaging section of said flow cell onto the photo-sensitive area of each image intensifier. Each optical objective preferably comprises a fluorescence filter for blocking the light of said laser, and the fluorescence filter is capable of transmitting the fluorescence emission from an individual encoded bead.

The pulse generator can be an electrical square wave pulse generator for triggering said two or more CCD-cameras and/or said two or more image intensifiers.

It is preferred that the device further comprises an image storage system comprising one or more of the following elements: A framegrabber for recording the images from said two or more CCD-cameras, an electronic memory-device for storing said images from said framegrabber, a program code for controlling said electronic memory-device, and a computer for integrating said framegrabber and said electronic memory device and for executing said program code.

The encoded bead reader device can be used in methods for recording and optionally also storing images of individual spatially encoded beads. This is achieved by performing e.g. a method comprising the steps of 1. Dispersing spatially encoded beads in a liquid,
2. Diverting the dispersion of spatially encoded beads through a transparent flow cell,
3. Optionally detecting the coming of each spatially encoded bead with a photo-sensor, and
4. Recording one pair of orthogonal fluorescence images of each spatially encoded bead, and
5. Optionally storing the images of each spatially encoded bead on a computer, For the above purpose, the encoded bead reader device preferably comprises a flow system comprising a flow cell, an imaging system, and optionally also an image storage system; wherein the flow system in detailed embodiments comprises 1. A flask for containing a set of EB in a liquid, said flask being equipped with a magnetic stirrer for dispersing the EB in said liquid
2. A syringe pump for pumping the EB, said syringe pump being equipped with magnetic stirrers for keeping the EB dispersed inside the syringes of said syringe pump, and said syringe pump being equipped with an automatic four-way valve for ensuring one-way flow.
3. A tube connecting said flask with said syringe pump
4. A transparent flow cell with a rectangular cross section, said flow cell having an imaging section for imaging of EB
5. A tube connecting said syringe pump with said flow cell
6. Two or more reservoirs
7. An exit tube connecting said flow cell to one of said two or more reservoirs, said exit tube having an exit tube outlet
8. A switch for controlling which one of said two ore more reservoirs is connected to said exit tube outlet;

wherein the imaging system comprises

1. A continuous wave laser for illuminating said imaging section of said flow cell
2. A photo-sensor, such as a photo-multiplier, for detecting when an EB enters said imaging section of said flow cell, said photo-sensor being equipped with an optical objective for focussing said imaging section of said flow cell onto the photo-sensitive area of said photo-sensor, and said optical objective of said photo-sensor being equipped with a fluorescence filter for blocking the light of said laser, and said fluorescence filter transmitting the fluorescence emission from the EB
3. Two or more video-cameras for obtaining fluorescence images of the EB, each one of said two or more video-cameras being equipped with one gated image intensifier for amplifying the fluorescence emission from the EB, and each one of said image intensifiers being equipped with one optical objective for focussing said imaging section of said flow cell onto the photo-sensitive area of each image intensifier, and each optical objective being equipped with one fluorescence filter for blocking the light of said laser, and said fluorescence filter transmitting the fluorescence emission from the EB
4. An electrical square wave pulse generator for triggering said two or more cameras and said two or more image intensifiers
5. An electrical cable connecting the output terminal of said photo-sensor to the trigger input of said pulse generator whereby it is obtained that a square wave pulse is generated when the output voltage of said photo-sensor is above the trigger-voltage of said pulse generator
6. Electrical cables for connecting the output terminal of said pulse generator to the input terminals of said two or more video-cameras and said two or more image intensifiers, whereby it is obtained that two simultaneous images are recorded with said two cameras; and wherein said optical objectives of said image intensifiers optionally comprises means for increasing the depth of field such as
1. phaseplates such as waveplates such as cubic phase modulation masks placed in the lens system [E. Ben-Eliezer, Z. Zalevsky, E. Marom, N. Konforti, J. Opt. A: Pure Appl. Opt. 5 (2003) S164-S169], [E. R. Dowski and W. T. Cathey, Applied Optics, vol. 34, no 11, pp. 1859-1866, April, 1995],
2. high depth of field endoscopes, such as 1 mm percived depth of field endoscopes, such as 1 mm perceived depth of field rigid endoscopes,
3. a duplicate set of two or more cameras equipped with image intensifiers, optical objectives, and fluorescence filters, each one of said cameras of said duplicate set of cameras being positioned opposite each one of said cameras of said two or more cameras, each of said cameras of said duplicate set of two or more cameras having a different focus plane than said opposite camera of said two or more cameras, whereby it is obtained that a duplicate set of images are obtained with different focal planes, and a microbead which are far from the focal plane of any one of said two or more cameras will be close to the focal plane of said opposit camera of said duplicate set of two or more cameras and vice versa, and therefore will appear sharply in one of the images obtained with two opposite cameras, or
4. means for varying the aperture placed in the lens system, whereby the depth of field can be increased by decreasing the aperture but whereby at the same time the light sensitivity is decreased, thus whereby the best compromise between depth of field and light sensitivity can be obtained, such as means for varying the aperture in the range from 10 mm to 2 mm, whereby the perceived depth of field in an image of field of view of 1.2 mm×1.5 mm can be varied in the range from about 0.1 mm to 0.8 mm when a CCD camera equipped with an image intensifier and a conventional 10× magnification microscope objective.

wherein the optional image storage system comprises:
1. A framegrabber for recording the images from said two or more cameras
2. An electronic memory-device for storing said images from said framegrabber
3. A program code for controlling said electronic memory-device
4. A computer for integrating said framegrabber and said electronic memory device and for executing said program code, and wherein the optional image storage system can further comprise means for digital decoding of images obtained with the use of
1. phaseplates, as described above, in order to generate sharper images,
2. a sufficiently high depth of field endoscopes, as described above, and
3. opposing cameras, whereby higher depth of field images can be reconstructed.

In one preferred embodiment, the imaging system of the encoded bead reader device comprises:
a) a quartz flow cell comprising cylindrical entrance and exit sections of length 25 mm, inner diameter 1 mm, and outer diameter 3 mm, a central section between said entrance and exit sections of length 10 mm, inner rectangular cross section 1 mm×1 mm and outer rectangular cross section 3 mm×3 mm, and an approximately cubic imaging section of said central section of inner dimensions ca. 1 mm×1 mm×1 mm, the exact position and geometry of said imaging section being determined by the source of illumination,
b) a silicone rubber tube connected to said entrance section of said flow cell for feeding an encoded beads suspension to said flow cell,
c) a silicone rubber tube connected to said exit section of said flow cell for removing an encoded beads suspension from said flow cell,
d) a continuous wave laser (e.g. the BluePoint series supplied by Rainbow Photonics, the Cobolt Blue series supplied by Cobolt AB, or the Blue CrystaLaser series supplied by Crysta Laser) of wavelength 473 nm for illuminating the imaging section of said central section of said flow cell and for controlling the position and geometry of said imaging section of said central section of said flow cell,
e) two CCD cameras (e.g. the CPL high speed series supplied by Canadian Photonics Labs Inc., the SR-CMOS series supplied by Vision Research, or the SVS series supplied by SVS-Vistek GmbH), a first and a second CCD camera, being positioned perpendicular to each other and aligned relative to said imaging section of said central section of said flow cell in such a way that the CCD chips of said CCD cameras run parallel to the flat surfaces of said central section of said flow cell and so that said imaging section of said central section of said flow cell can be projected onto said two CCD chips of said two CCD cameras by optical means described below,
f) two image intensifiers (such as supplied by Hamamatsu or the Proxifier series supplied by Proxitronic, or the GPM series supplied by Photonicstech) connected to said two CCD cameras for amplifying the optical signal emitted from the illuminated section of said imaging section of said flow cell,
g) a photo-multiplier for detecting the coming of an encoded bead, said photomultiplier being positioned opposite to first of said two CCD cameras and perpendicular to second of said two CCD cameras and aligned relative to said imaging section of said central section of said flow cell in such a way that the photosensitive area of said photo-multiplier runs parallel to the CCD chip of said first of said two CCD cameras and perpendicular to the CCD chip of said second of said two CCD cameras,
h) three objectives (such as the MS-50 supplied by MEIJI TECHNO or the QM-100 supplied by Questar), a first, a second, and a third objective, said first and second objectives of said three objectives being connected to said first and second CCD cameras, whereby the optical signal from said imaging section of said central section of said flow cell is focussed onto said two CCD chips of said two CCD cameras, and said third objective of said three objectives being connected to said photo-multiplier, whereby it is obtained that the optical signal from said imaging section of said central section of said flow cell is focussed onto said photosensitive area of said photo-multiplier,
i) three optical filters (emmision band pass filters, e.g. type 528-50 supplied by Ferroperm or Chroma) connected to said three objectives for blocking the laser light and transferring the fluorescence emmission from the fluorescent spatially immobilised particles of the encoded beads described elsewhere,
j) an electronic amplifier connected to the electric output terminals of said photomultiplier for amplifying the electrical output from said photo-multiplier,
k) an electronic pulse generator (type TGP110 supplied by Thurlby Thanders instruments, TTi) for generating a pulse for simultaneous triggering of said two cameras and said two image intensifiers, whereby it is obtained that simultaneous pairs of images can be recorded with said two CCD cameras, the input terminals of said pulse generator being connected to the output terminals of said electronic amplifier, whereby it is obtained that images are recorded only when one or more spatially immobilised particles of an encoded bead passes through said imaging section of said central section of said flow cell, l) a framegrabber (type GrabLink Expert supplied by Eurecard) connected to the output terminals of said two CCD cameras for transferring the electronic signals from said two CCD cameras to a computer, and m) a personal computer (PC type Pentium 4 supplied by UnitOne electronics) connected to the output terminals of said framegrabber for electronically storing the images from said two CCD cameras.

As an alternative to the use of CCD cameras any suitable digital camera can be used, e.g., CMOS cameras.

As an alternative to the use of image Intensifiers connected to CCD cameras, on-chip multiplication gain cameras can be used.

In a further embodiment of the encoded bead reader device the image processing of each pair of orthogonal images, the calculation of the set of possible 3D particle positions, and the corresponding set of possible distance matrices is preferably carried out on-line by a fast computer, i.e. a computer capable of performing the above operations in less than 0.5 sec.

In yet another embodiment of the encoded bead reader device the image processing of each pair of orthogonal images is carried out on-line by a fast computer and the number of particles of each encoded bead is determined. Furthermore, the encoded bead reader device can comprise a fast switching valve positioned downstream from the flow cell and means for controlling said valve on the basis of the number of particles per encoded bead, whereby encoded bead sorting according to number of particles per encoded bead is enabled. Preferably encoded beads with 4-8 particles are separated. Hereby a set of encoded beads with 4-8 particles per encoded bead is obtained.

One embodiment of the encoded bead reader includes an illumination flow cell positioned up-stream from the imaging flow cell. When phosphorescent particles leave the illumination flow cell they emit light and can be imaged in the imaging flow-cell. In this embodiment emission filters are not required.

Beaded Polymer Matrix

It is one object of the present invention to provide an encoded, beaded or granulated polymer matrix for solid phase synthesis in the form of a bead or a granule comprising a plurality of spatially immobilised particles or vacuoles, wherein each particle or vacuole is individually detectable. The beaded matrix has different optical or spectroscopic properties from those of the immobilised particles or vacuoles. The immobilised particles or vacuoles can be monodisperse or heterodisperse, and the immobilised particles can be regular spherical beads or vacuoles, or they can be irregular particles. The beaded polymer matrix can be spherical, i.e. having a regular, rounded shape, or it can have an irregular shape in the form of a granule.

Each beaded or granulated polymer matrix preferably comprises at least 2 particles, such as at least 3 particles, for example at least 4 particles, and preferably 10 or less particles, such as less than 5 particles. The particles can be essentially spherical, and preferably at least 2 such as 3, for example 5 of said particles have essentially the same diameter. The particles are preferably essentially monodisperse and/or less than 10 micrometer in diameter, such as less than 5 micrometer in diameter, for example less than 1 micrometer in diameter, such as less than 0.1 micrometer in diameter.

The present invention resides in one embodiment in a bead on which a compound can be synthesised, wherein the bead has at least two markers integrally associated therewith, which markers are detectable and/or quantifiable during synthesis of the compound. The markers define a code identifying the bead before, during and after synthesis of a compound. Through the use of its plurality of detectable and/or quantifiable markers, preferably optically detectable and/or quantifiable markers, the bead of the present invention provides more "pre-encoded" information compared to other beads of the prior art and thus provides larger combinational library sizes that can be encoded.

This "pre-encoded" information may be read by specialized apparatus such as e.g. flow cytometers and the information can be used to track the synthetic history of an individual bead in a combinatorial process as described hereinafter. An example of a specialised apparatus for recording the "pre-encoded" information contained in an encoded bead is the specialised encoded bead reader apparatus disclosed herein below.

The larger the diversity of detectable and/or quantifiable markers of a bead, the greater the degree of decipherability or resolution of the bead in a large population of beads. In this regard, each detectable and/or quantifiable marker of a bead provides at least a part of the information required to distinctively identify the bead. The larger the number of such markers, the more detailed the identifying information that is compilable for a given bead, which may be used to distinguish that bead from other beads. On the other hand the complication of detection is increased markedly with the number of markers.

Markers

The particles can comprise a marker, which is detectable by any form of electromagnetic radiation including fluorescent emmision. However, the marker can also be detected by fast spectroscopic techniques other than fluorescence spectroscopy. The particles of said beaded or granulated polymer matrix in one embodiment comprise a spectroscopically detectable marker and/or a fluorescently detectable marker.

Fluorescently detectable markers are preferably selected from the fluorescent group of compounds and materials consisting of fluorencent organic polycyclic compounds, conjugated vinylic compounds, heterocyclic transition metal complexes, rare earth metal compounds, inorganic oxides and glasses.

Fluorescently detectable markers can be detected by two photon fluorescence spectroscopy and/or by one photon fluorescence spectroscopy. Fluorescently detectable markers can additionally be detected by time-correlated photon fluorescence spectroscopy.

Examples of detection by fast spectroscopic techniques other than fluorescence spectroscopy include, but is not limited to fast spectroscopic techniques such as infrared spectroscopy, raman spectroscopy, visble light spectroscopy, UV spectroscopy, electron spin resonance, and nuclear magnetic resonance.

The fluorescently detectable marker is preferably selected from the group consisting of dyes based on the structure of fluorescein, oregon green, rhodamine, aminobenzoic acid, Alexa™ probes (a sulfonated aminocoumarin, a sulfonated rhodamine), BODIPY-dyes, cascade blue dye, coumarine, naphthalenes, dansyl, indoles, pyrenes pyridyloxazole, cascade yellow dye, Dapoxyl Dye, Fluorescamine, aromatic ortho dialdehydes, OPA and NDA, ATTO-Tag's, 7-Nitrobenz-2-Oxa-1,3-Diazole or derivatives thereof. The fluorescently detectable marker in one embodiment is preferably a UV or visible light-excitable microsphere.

Fluorescent dyes may be incorporated into beads by any suitable method known in the art, such as copolymerisation of a polymerisable monomer and a dyecontaining co-monomer or addition of a suitable dye derivative in a suitable organic solvent to an aqueous suspension as for example disclosed in Singer et al., (supra including references cited therein), Campian et al. (1994, in "Innovation and Perspectives on Solid Phase Synthesis" Epton, R., Birmingham: Mayflower, 469-472, incorporated herein by reference) and Egner et al. (1997, Chem. Commun. 73 5-73 6, incorporated herein by reference). Alternatively, fluorescent beads may be produced having at least one fluorescent spherical zone. Such particles may be prepared as for example described in U.S. Pat. No. 5,786,219 (Zhang et al.), which is incorporated herein by reference. In a preferred embodiment, one or more fluorescent dyes are incorporated within a microparticle. Compared to surface attachment of fluorescent dyes, incorporation of dyes within beads reduces the physical exposure of the fluorescent dye (s) to various solvents used in combinatorial synthesis and thus increases the stability of the beadfluorescent dye complexes.

Also included in the present invention are markers which are detectable by fast detection techniques other than spectroscopy, such as light scattering, reflection, diffraction or light rotation.

Electromagnetic radiation-related markers are preferably selected from the group consisting of fluorescence emission, luminescence, phosphorescence, infrared radiation, electromagnetic scattering including light and X-ray scattering, light transmittance, light absorbance and electrical impedance.

Preferably, the electromagnetic radiation-related marker is a light emitting, light transmitting or light absorbing marker detectable by illuminating the particle with incident light of one or more selected wavelengths or of one or more selected vectors.

It is preferred that at least one of the markers of a bead is an electromagnetic radiation-related marker suitably selected from the group consisting of atomic or molecular fluorescence emission, luminescence, phosphorescence, infrared radiation, electromagnetic scattering including light and X-ray scattering, light transmittance, light absorbance and electrical impedance.

The fluorescence emission can result from e.g. excitation of one or more fluorescent markers attached to, or contained within, the bead. In the case of two or more fluorescent markers being utilised, the markers can be the same and the markers can comprise the same or varying amounts of a fluorophore. In the latter case the markers are intensity-differentiated.

Alternatively, the markers may be different wherein they are present in a ratio of 1:1 or varying ratios. Reference may be made in this regard to WO 95/32425 which is incorporated herein by reference.

Exemplary fluorophores which may be used in accordance with the present invention include those listed in WO 93/06121, which is incorporated by reference herein.

Any suitable fluorescent dye may be used for incorporation into the bead of the invention. For example, reference may be made to U.S. Pat. No. 5,573,909 (Singer et al., which is incorporated herein by reference) and U.S. Pat. No. 5,326,692 (Brinkley et al., which is incorporated by reference) which describe a plethora of fluorescent dyes. Reference may also be made to fluorescent dyes described in U.S. Pat. Nos. 5,227,487, 5,274,113, 5,405,975, 5,433,896, 5,442, 045, 5,451,663, 5,453,517, 5,459,276, 5,516,864, 5,648,270 and 5,723,218, which are all incorporated herein by reference.

In one embodiment, one or more of the fluorescent markers can preferably be incorporated into a microparticle, such as a polymeric microparticle, or a ceramic microparticle. Such microparticles can preferably be attached to a bead by use of e.g. colloidal Interactions as for example disclosed by Trau and Bryant in PCT/AU98/00944, incorporated herein by reference.

When the marker is spectroscopically detectable, there is in one embodiment provided a marker capable of being probed by a range of frequencies differing by less than about 20%, such as less than about 10%, based on the numerical highest frequency value. The marker can also be probed by one or more predetermined frequencies.

Any suitable method of analysing fluorescence emission is encompassed by the present invention. In this regard, the invention contemplates techniques including, but not restricted to, 2-photon and 3-photon time resolved fluorescence spectroscopy as for example disclosed by Lakowicz et al. (1997, Biophys. J., 72: 567, incorporated herein by reference), fluorescence lifetime imaging as for example disclosed by Eriksson et al. (1993, Biophys. J., 2: 64, incorporated herein by reference), and fluorescence resonance energy transfer as for example disclosed by Youvan et al. (1997, Biotechnology et alia 3: 1-18).

Luminescence and phosphorescence may result respectively from a suitable luminescent or phosphorescent label as is known in the art. Any optical means of identifying such label may be used in this regard.

Infrared radiation may result from a suitable infrared dye. Exemplary infrared dyes that may be employed in the invention include, but are not restricted to, those disclosed in Lewis et al. (1999, Dyes Pigm. 42 (2): 197), Tawa et al. (1998, Mater. Res. Soc. Symp. Proc. 488 (Electrical, Optical, and Magnetic Properties of Organic Solid-State Materials IV), 885-890), Daneshvar, et al. (1999, J. Immunol. Methods 226 (1-2): 119-128), Rapaport et al. (1999, Appl. Phys. Lett. 74 (3): 329-331) and Durig et al. (1993, J. Raman Spectrosc. 24 (5): 281-5), which are incorporated herein by reference. Any suitable infrared spectroscopic method may be employed to interrogate the infrared dye. For instance, fourier transform infrared spectroscopy as for example described by Rahman et al. (1998, J. Org. Chem., 63: 6196, incorporated herein by reference) may be used in this regard.

Suitably, electromagnetic scattering may result from diffraction, reflection, polarisation or refraction of the incident electromagnetic radiation including light and Xrays. In this regard, the beads may be formed of different materials to provide a set of beads with varying scattering properties such as different refractive indexes as for example described supra. Any suitable art recognised method of detecting and/or quantifying electromagnetic scatter may be employed. In this regard, the invention also contemplates methods employing contrast variation in light scattering as, for example, described in van Helden and Vrij (1980, Journal of Colloidal and Interface Science 76: 419-433), which is incorporated herein by reference.

Markers other than electromagnetic radiation-related markers can be utilised, optionally in combination with electromagnetic radiation-related markers. Such markers include e.g. size and/or shape of the bead. For example, beads may be shaped in the form of spheres, cubes, rectangular prisms, pyramids, cones, ovoids, sheets or cylinders, including intermediate forms as well as irregular shapes. Electrical impedance across a bead may be measured to provide an estimate of the bead volume (Coulter).

The marker in one embodiment comprises a chromophoric label. Suitable beads comprising such chromophores are described e.g. by Tentorio et al. (1980, Journal of Colloidal and Interface Science 77: 419-426), which Is incorporated herein by reference.

A suitable method for non-destructive analysis of organic pigments and dyes, using a Raman microprobe, microfluorometer or absorption microspectrophotometer, is decribed for example in Guineau, B. (1989, Cent. Rech. Conserv. Documents Graph., CNRS, Paris, Fr. Stud. Conserv 34 (1): 38-44), which is incorporated herein by reference.

Alternatively, the marker may comprise a magnetic material inclusive of iron and magnetite, or an marker that is detectable by acoustic backscatter as is known in the art.

It will be understood from the foregoing that the number of beads having different detectable codes will be dependent on the number of different detectable and/or quantifiable markers integrally associated with the beads.

Polymers

Polymers according to the present invention are preferably optically transparent in the optical exitation range of the fluorescent marker and/or the emission wavelength range of the fluorescent marker comprised by the particles and/or vacuoles of the polymer matrix.

Polymer beads according to the invention can be prepared from a variety of polymerisable monomers, including styrenes, acrylates and unsaturated chlorides, esters, acetates, amides and alcohols, including, but not limited to, polystyrene (including high density polystyrene latexes such as brominated polystyrene), polymethylmethacrylate and other polyacrylic acids, polyacrylonitrile, polyacrylamide, polyacrolein, polydimethylsiloxane, polybutadiene, polyisoprene, polyurethane, polyvinylacetate, polyvinylchloride, polyvinylpyridine, polyvinylbenzylchloride, polyvinyltoluene, polyvinylidenechloride and polydivinylbenzene, as well as PEGA, SPOCC and POEPOP. The beads may be prepared from styrene monomers or PEG based marcromonomers.

The polymer is in preferred embodiments selected from the group consisting of polyethers, polyvinyls, polyacrylates, polymethacrylates, polyacylamides, polyurethanes, polyacrylamides, polystyrenes, polycarbonates, polyesters, polyamides, and combinations threreof.

In more preferred embodiments, the polymer is selected from the group consisting of SPOCC, PEGA, HYDRA, POEPOP, PEG-polyacrylate copolymers, polyetherpolyamine copolymers, crosslinked polyethylene diamines, and combinations thereof.

However, the invention is not limited to the above polymers as the beads can in principle comprise any solid, at least partly transparent material capable of providing a base for combinatorial synthesis. As illustrative examples, the beads can be polymeric supports such as polymeric beads, which are preferably formed from polystyrene cross-linked with 1-5% divinylbenzene. Polymeric beads can also be formed from hexamethylenediaminepolyacryl resins and related polymers, poly N-{2-(4-hydroxylphenyl)ethyl}acrylamide (i.e., (one Q)), silica, cellulose beads, polystyrene beads poly(halomethylstyrene) beads, poly(halostyrene) beads, poly(acetoxystyrene) beads, latex beads, grafted copolymer beads such as polyethylene glycol/polystyrene, porous silicates for example controlled pore-glass beads, polyacrylamide beads for example poly (acryloylsarcosine methyl ester) beads, dimethylacrylamide beads optionally cross-linked with N,N'-bis-acrylolyl-ethylene diamine, glass particles coated with a hydrophobic polymer inclusive of cross-linked polystyrene or a fluorinated ethylene polymer which provides a material having a rigid or semi-rigid surface, poly(N-acryloylpyrrolidine) resins, Wang resins, Pam resins, Merrifield resins, PAP and SPARE polyamide resins, polyethylene functionalised with acrylic acid, kieselguhr/polyamide (Pepsyn K), poly-Hipe™, PS/polydimethylacrylamide copolymers, CPG, PS macrobeads and Tentagel™, PEG-PS/DVB copolymers.

Ceramic beads may be comprised of silica, alumina, titania or any other suitable transparent material. A suitable method of making silica beads is described, for example in "The Colloid Chemistry of Silica and Silicates" (Cornell University Press) by Ralph K Iler 1955 and U.S. Pat. No. 5,439,624, the disclosures of which are incorporated herein by reference. Reference may also be made to WO95/25737 and WO97/15390, incorporated herein by reference, which disclose examples of such beads.

The beaded polymer matrix according to the invention preferably has a ratio R=a/b between a) the volume of the beaded or granulated polymer matrix and b) the average volume of the particles which is in the range of from 10000000:1 to 10:1, such as in the range of from 1000000:1 to 30:1, for example in the range of from 1000000:1 to 100:1, for example in the range of from 1000000:1 to 200:1, such as in the range of from 1000000:1 to 1000:1, for example in the range of from 100000:1 to 1000:1, such as in the range of from 100000:1 to 2000:1.

Independently of the above ratios, the beaded or granulated polymer matrix according to the invention preferably comprises an average volume of the swelled bead or granule of from 0.000001 μL-50 μL, such as an average volume of the swelled bead or granule of from 0.00001 μL-5 μL, for example an average volume of the swelled bead or granule of from 0.001 μL-1 μL, such as an average volume of the swelled bead or granule of from 0.01 μL-0.1 μL.

Any combination of the above falls within the Invention and accordingly, for a ratio R=a/b between a) the volume of the beaded or granulated polymer matrix and b) the average volume of the particles which is in the range of from 10000000:1 to 10:1, such as in the range of from 1000000:1 to 30:1, for example in the range of from 1000000:1 to 100:1, for example in the range of from 1000000:1 to 200:1, such as in the range of from 1000000:1 to 1000:1, for example in the range of from 100000:1 to 1000:1, such as in the range of from 100000:1 to 2000:1, the average volume of the swelled bead or granule can be from 0.000001 μL-50 μL, such as an average volume of the swelled bead or granule of from 0.00001 μL-5 μL, for example an average volume of the swelled bead or granule of from 0.001 μL-1 μL, such as an average volume of the swelled bead or granule of from 0.01 μL-0.1 μL.

Composition comprising a plurality of encoded, beaded polymer matrices

The invention is in one embodiment directed to a plurality of beads comprising a population that is pre-encoded. Accordingly, each bead of that population has a code, which distinctively identifies a respective bead before, during and after said synthesis from other beads. The diversity of the said population of beads, therefore, resides in beads of said population having relative to each other different spatial locations of detectable markers, which are used to provide distinctive codes for detection of each of those beads.

The composition of beads of the invention may be used in many applications, such as affinity chromatography for purification and/or isolation of desirable target compounds, and combinatorial chemistry procedures that do or do not involve a split-and-combine procedure. Preferably, however, such assemblies are used in combinatorial chemistries, which involve a split-process-recombine procedure.

A plurality of beads according to the invention may be prepared by any suitable method. Preferably, when colloidal particles including polymeric and ceramic particles are used as beads, the colloid dispersion of such beads is stabilised. Exemplary methods imparting colloidal stabilisation are described for example in Hunter, R. J. (1986, "Foundation of Colloid Science", Oxford University Press, Melbourne) and Napper, D. H. (1983, "Polymeric stabilisation of Colloidal Dispersions" Academic Press, London), the disclosures of which are incorporated herein by reference. In this regard, the most widely exploited effect of nonionic polymers on colloid stability is steric stabilisation, in which stability is imparted by polymer molecules that are absorbed onto, or attached to, the surface of the colloid particles. Persons of skill in the art will recognise that it is possible to impart stability by combinations of different stabilisation mechanisms: e.g., surface charge on the particles can impact colloidal stability via electrostatic stabilisation, and an attached polyelectrolyte can impart stability by a combination of electrostatic and steric mechanisms (electrosteric stabilisation). Polymer that is in free solution can also influence colloid stability. Stabilisation by free polymer is well-documented (Napper 1983, supra) and is called depletion stabilisation.

Preferably, steric stabilisation of colloid dispersions is employed. In this regard, steric stabilisation is widely exploited because it offers several distinct advantages over electrostatic stabilisation. For example, one advantage is that aqueous sterically stabilised dispersions are comparatively insensitive to the presence of electrolytes because the dimensions of non-ionic chains vary relatively little with the electrolyte concentration.

Any suitable stabilising moiety may be used for stabilising colloidal dispersions. Exemplary stabilising moieties that impact on colloidal stability are given herein below: Poly (oxyethylene), Poly(vinyl alcohol), Poly(acrylic acid), Poly (acrylamide), and sorbitol monolaurate as well as commonly used emulsion stabilizers.

The composition of encoded, beads preferably comprises at least $10^2$ individually identifiable beads, such as at least $10^3$ individually identifiable beads, for example at least $10^5$ individually identifiable beads, such as at least $10^7$ individually identifiable beads, for example at least $10^9$ individually identifiable beads, such as at least $10^{11}$ individually identifiable beads, for example at least $10^{13}$ individually identifiable beads, such as at least $10^{15}$ individually identifiable beads, for example at least $10^{17}$ individually identifiable beads, such as at least $10^{19}$ individually identifiable beads, for example at least $10^{21}$ individually identifiable beads, such as at least $10^{23}$ individually identifiable beads.

Methods for Generating a Composition Comprising Encoded Beads

It is a further object of the invention to provide a method for generating a composition comprising a plurality of encoded, beaded polymer matrices, said method comprising the steps of i) synthesizing a monomer and/or macromonomer and a crosslinker for polymerization, and, ii) mixing the monomer and/or macromonomer with particles to give an even dispersion of particles in the mixture, and iii) polymerizing the monomer and/or macromonomer by either i) suspension polymerisation and/or; ii) inverse suspension polymerisation and/or iii) bulk polymerisation followed by granulation and/or iv) droplet polymerisation.

In a further aspect there is provided a method for generating a composition comprising a plurality of encoded, beaded polymer matrices, and detecting and/or identifying individually identifiable beads, said method comprising the steps of:

(a) preparing a plurality of beads comprising spatially immobilised particles comprising at least one marker;

(b) detecting and/or quantifying the said markers of each bead and assigning a code, such as the result of a determination of the location of spatially encoded particles or vacuoles, for each bead;

(c) identifying beads having distinctive codes; and optionally (d) identifying beads having similar codes; and further optionally (e) sorting the beads having distinctive codes from the beads having non distinctive codes to thereby provide an encoded, beaded polymer matrix.

There is also provided the use of such a composition comprising a plurality of encoded, beaded polymer matrices linked to a bioactive compound for identifying bioactive compound binding partners, and a use of the composition of beads linked to different bioactive compounds for diagnostic purposes, wherein the binding and determination of a predetermined binding partner to a substrate or bioactive compound on the carrier Is at least indicative of a positive diagnosis.

Bioactive compounds of particular interest are e.g. those which may be so screened Include agonists and antagonists for cell membrane receptors, toxins, venoms, viral epitopes, hormones, sugars, co-factors, peptides, enzyme substrates, drugs inclusive of opiates and steroids, proteins including antibodies, monoclonal antibodies, antisera reactive with specific antigenic determinants, nucleic acids, lectins, polysaccharides, cellular membranes and organelles.

The present invention also encompasses as bioactive compounds a plurality of unique polynucleotide or oligonucleotde sequences for sequence by hybridisation (SBH) or gene expression analyses. Persons of skill in the art will recognise that SBH uses a set of short oligonucleotide probes of defined sequence to search for complementary sequences on a longer target strand of DNA. The hybridisation pattern is used to reconstruct the target DNA sequence. Accordingly, in the context of the present invention, an aqueous solution of fluorescently labelled single stranded DNA (ssDNA) of unknown sequence may be passed over the library of polynucleotide or oligonucleotide compounds and adsorption (hybridisation) of the ssDNA will occur only on beads which contain polynucleotide or oligonucleotide sequences complementary to those on the ssDNA. These beads may be identified, for example, by flow cytometry, fluorescence optical microscopy or any other suitable technique.

Once a compound having the desired activity is obtained, the sequence of reaction steps experienced by the bead on which the compound was synthesised may be deconvoluted simply by analysing the tracking data for that bead as described, for example, hereinafter. The sequence of building blocks defining the compound of interest may thus be ascertained and a molecule comprising this sequence can by synthesised by conventional means (e.g., amino acid synthesis or oligonucleotide synthesis) as is known in the art.

Encoded beads can be sorted according to at least one optical parameter, i.e., a physical property that influences the optical signal arising from the encoded bead, such as size and shape and number of particles per encoded bead, whereby it is obtained that the resulting encoded beads are individually identifiable by optical means. Preferred means for sorting encoded beads include sedimentation, centrifugation, sieving; cyclone separation, total fluorescence separation, and separation according to number of particles per encoded bead. Total fluorescence separation can be carried out on a so-called bead sorter, such as the COPAS™ system supplied by Union Biometrica. Separation according to number of particles per encoded bead can be carried out with an encoded bead reader, such as disclosed above, equipped with a fast image processing system for counting the number of particles per encoded bead on the basis of the images and further equipped with a switchable valve positioned downstream from the flow cell for sorting the encoded beads.

It is essential that that the optical properties of said particles differ from the optical properties of said beaded polymer matrix, whereby it is obtained that the relative positions of said particles of said encoded beaded polymer matrix can be determined.

The polymerisation reaction can preferably be a radical initiated chain polymerisation reaction, or an anion initiated ring opening polymerisation reaction, or a cation initiated ring opening polymerisation reaction.

Functional groups on the beads can subsequently be reacted with different bioactive compound building blocks as described herein elsewhere. Each reaction step can be monitored as essentially each bead of the encoded, beaded polymer matrix is individually detectable. The below methods describe in more detail the identification of spatially immobilised particles or beads in the beads or granules.

Sorting Spatially Immobilised Particles According to Size and Controlling the Size Distribution of Spatially Immobilised Particles.

Particles may be sorted according to at least one optical parameter, i.e., a physical property that influences the optical signal arising from the particle, such as size, shape, colour, or fluorescence, whereby it is obtained that the relative positions of said particles can be determined by optical means. Preferred means for sorting particles include sedimentation, centrifugation, sieving, and cyclone separation.

Using spatially immobilised particles as particles in encoded beads places some limitations on the size of the spatially immobilised particles. Too large spatially immobilised particles tens to shadow each other and too small spatially immobilised particles may pass through the optical set-up unnoticed. Generally the size distribution of spatially immobilised particles synthesized by suspension polymerisation or emulsion polymerization is very broad. Hence, a method for obtaining a fraction of spatially immobilised particles with controlled size distribution is required.

It has been found that the micro beads in di-methylformamide (DMF) solution after centrifugation at 250 rpm for 22 min are considerably smaller than the micro beads in the sediment. This indicates that it is possible to remove small beads by repeated centrifugation at 250 rpm and removing the liquid phase after each run, i.e. the concentration of small beads in the sediment should decrease after each run. FIG. 13 shows micrographs of suspension polymerised micro beads before centrifugation and after 5 times centrifugation at 250 rpm for 22 min. A change in the size distribution towards a more narrow distribution and a higher average micro bead diameter appears from the micrographs. The size distribution was measured within a rectangular section of each image with the use of imaging software. FIG. 14 shows the measured size distributions. It is clear from the figure that a more narrow size distribution and a larger average diameter are obtained by the method.

Method for Identifying Individual Spatially Encoded, Beads in a Composition Comprising such Spatially Encoded Beads In yet another embodiment, the present invention provides a method for identifying at least one individually identifiable, spatially encoded beaded polymer matrix, said method comprising the steps of i) determining the unique, spatial immobilisation of a plurality of particles in the at least one bead to be identified, and ii) identifying said at least one individually identifiable, spatially encoded beaded polymer matrix based on said unique determination of said spatially immobilised plurality of particles.

Post Identification of Spatially Encoded Beads

The sequence comprising 1) determination of the spatially immobilised particle positions in the images, 2) calculation of the corresponding set of possible 3D-positions of the spatially immobilised particles and the corresponding distance matrices, and 3) the distance matrix based identification, may be too time consuming to allow for on-line identification of encoded beads. Instead post identification of "hits", i.e., spatially encoded beads carrying compounds which are of interest in a given assay, as illustrated in FIG. 15.

As the hits are not identified until after the full combinatorial chemistry synthesis, the hit ID will have to be carried out after the combinatorial synthesis process has been finished. Following a procedure comprising the following steps can do this:

1. A plurality of spatially encoded polymer beads is synthesized

2. Images or laser scans of each encoded bead is recorded and stored as the beads are being split into a number of jars, $J_1$, $J_2 \ldots J_j$ in which jars one combinatorial synthesis step is carried out.

3. All beads are pooled

4. The sequence comprising steps 2 and 3 is repeated a number of times.

5. All spatially encoded beads are screened in a given assay and the hits are separated 6. The jar sequence of each hit is determined on the basis of the recordings obtained under step 2 and the use of an ID method.

Method for Generating an Encoded Beaded Polymer Matrix Comprising Different Bioactive Compounds It is a yet further object of the invention to provide a method for generating an encoded, beaded polymer matrix comprising a bioactive compound, wherein essentially each bead of the polymer matrix is individually identifiable, said method comprising the steps of i) spatially immobilizing particles in polymer beads or granulates, and ii) isolating encoded beads or granules by automated sorting, and iii) recording and storing the distance matrix for essentially each bead or granule, and iv) performing a stepwise synthesis of bioactive compounds by reacting functional groups of the encoded beads or granules with at least one building block, and v) recording the identity of each bead or granule that enter each reaction step iv), and vi) isolating beads or granules of interest, preferably by performing an assay or a diagnostic screen, and vii) identifying the bioactive compound attached to at least one individual bead by recording the identity of at least one isolated bead or granule, and optionally comparing said recording with the recording, preferably a distance matrix, recorded for at least a plurality of the remaining beads or granules.

A binding assay for characterising or isolating bioactive compounds bound to the beads or granules can be performed by measuring e.g. the binding of a protein to a ligand bound to the polymer matrix. Also, an assay can be performed by measuring e.g. an enzyme activity on a substrate bound to the polymer matrix. It is also possible to perform an assay by measuring e.g. enzyme inhibition of a molecule bound to the polymer matrix, or to perform an assay by measuring e.g. receptor interaction with a bioactive compound bound to the polymer matrix.

For the above methods, the plurality of particles preferably comprise a fluorescently detectable marker, such as a fluorescently detectable marker detectable by two photon fluorescence microscopy, or a fluorescently detectable marker detectable by one photon fluorescence microscopy.

Method for Deconvoluting a Conventional Library

In a further aspect, the invention provides a method for synthesising and deconvoluting a combinatorial library comprising the steps of:

(a) apportioning in a stochastic manner among a plurality of reaction vessels a plurality of beads on which a plurality of different compounds can be synthesised, wherein said plurality of beads comprises a population of detectably distinct beads each having a code, such as spatially immobilised particles or vacuoles, which distinctively identifies a respective bead before, during and after said synthesis from other beads, (b) determining and recording the codes, preferably in the form of the spatial position of the immobilised particles or vacuoles, of said plurality of beads in order to track the movement of individual detectably distinct beads into particular reaction vessels of said plurality of reaction vessels, wherein said codes are determined prior to step (d);

(c) reacting the beads in each reaction vessel with a building block;

(d) pooling the beads from each reaction vessel;

(e) apportioning the beads in a stochastic manner among the plurality of reaction vessels;

(f) reacting the beads in each reaction vessel with another building block;

(g) recording the codes of said plurality of beads in order to track the movement of individual detectably distinct beads into particular reaction vessels of said plurality of reaction vessels, wherein said codes are recorded after step (e) and/or step (f);

(h) pooling the beads from each reaction vessel;

(i) iterating steps (e) through (h) as required in order to create a combinatorial compound library wherein member compounds of the library are associated with the detectably distinct beads and wherein codes of the detectably distinct beads are deconvolutable using tracking data provided by said recordal steps to identify the sequence of reactions experienced by the said detectably distinct beads.

The identification steps (step (c) and (d)) may be effected by use of any suitable method or apparatus for analysing the spatially immobilised markers of a bead.

Preferably, these steps are effected by flow cytometry, which typically detects optical parameters. For example, a flow cytometer may be used to determine forward scatter (which is a measure of size of a bead), side scatter (which is sensitive to refractive index and size of a particle (seen Shapiro 1995, "Practicalflow cytometry", 3d ed. Brisbane, Wiley-Liss)), and fluorescent emission.

Any suitable algorithm may be employed to track and/or sort individual detectably unique beads. Preferably, a real-time algorithm is employed.

Suitably, the step of sorting (step (e)) is characterised in that the population of detectably distinct beads constitutes at least about 50%, preferably at least about 70%, more preferably at least about 90%, and more preferably at least about 95% of the plurality of beads resulting from step (e).

From the foregoing, a population of detectably unique beads can be generated from a raw population of beads using e.g. specialised flow cytometric techniques. The population of detectably unique beads is thereby "pre-encoded" and can be used for combinatorial synthesis.

Building Block Reactions

The beads of the invention are applicable to any type of chemical reaction that can be carried out on a solid support. Such chemical reaction includes, for example:

1. 2+2 cycloadditions including trapping of butadiene;
2. [2+3] cycloadditions including synthesis of isoxazolines, furans and modified peptides;
3. acetal formation including immobilization of diols, aldehydes and ketones;
4. aldol condensation including derivatization of aldehydes, synthesis of propanediols;
5. benzoin condensation including derivatization of aldehydes;
6. cyclocondensations including benzodiazepines and hydantoins, thiazolidines, -turn mimetics, porphyrins, phthalocyanines;
7. Dieckmann cyclization including cyclization of diesters;
8. Diels-Alder reaction including derivitisation of acrylic acid;
9. Electrophilic addition including addition of alcohols to alkenes;
10. Grignard reaction including derivatisation of aldehydes;
11. Heck reaction including synthesis of disubstituted alkenes;
12. Henry reaction including synthesis of nitrile oxides in situ (see 2+3 cycloaddition);
13. catalytic hydrogenation including synthesis of pheromones and peptides (hydrogenation of alkenes);
14. Michael reaction including synthesis of sulfanyl ketones, bicyclo]2.2.2]octanes;
15. Mitsunobu reaction including synthesis of aryl ethers, peptidyl phosphonates andthioethers;
16. nucleophilic aromatic substitutions including synthesis of quinolones;
17. oxidation including synthesis of aldehydes and ketones;
18. Pausen-Khand cycloaddition including cyclization of norbornadiene with pentynol;
19. photochemical cyclisation including synthesis of helicenes;
20. reactions with organo-metallic compounds including derivitisation of aldehydes and acyl chlorides;
21. reduction with complex hydrides and Sn compounds including reduction of carbonyl, carboxylic acids, esters and nitro groups;
22. Soai reaction including reduction of carboxyl groups;
23. Stille reactions including synthesis of biphenyl derivatives;
24. Stork reaction including synthesis of substituted cyclohexanones;
25. reductive amination including synthesis of quinolones;
26. Suzuki reaction including synthesis of phenylacetic acid derivatives; and
27. Wittig, Wittig-Horner reaction including reactions of aldehydes; pheromones and sulfanyl ketones.

Reference may also be made to Patel et al., (April 1996, DDT 1 (4): 134-144) who describe the manufacture or synthesis of N-substituted glycines, polygarbarnates, mercaptoacylprolines, diketopiperazines, HIV protease inhibitors, 1-3 diols, hydroxystilbenes, B-lactams, 1,4-benzodiazepine-2-5-diones, dihydropyridines and dihydropyrimidines.

Reference may also be made to synthesis of polyketides as discussed, for example, in Rohr (1995, Angew. Int. Ed. Engl. 34: 881-884).

Chemical or enzymatic synthesis of the compound libraries of the present invention takes place on beads. Thus, those of skill in the art will appreciate that the materials used to construct the beads are limited primarily by their capacity for derivitisation to attach any of a number of chemically reactive groups and compatibility with the chemistry of compound synthesis. Except as otherwise noted, the chemically reactive groups with which such beads may be derivatised are those commonly used for solid state synthesis of the respective compound and thus will be well known to those skilled in the art. For example, these bead materials may be derivatised to contain functionalities or linkers including-NH2, —NHNH2, —ONH2, —COOH, —SH, —SeH, —SO3H, —GeH, or —SiR2H groups.

Linkers for use with the beads may be selected from base stable anchor groups as described in Table 2 of Fruchtel et al. (1996, supra, the entire disclosure of which is incorporated herein by reference) or acid stable anchor groups as described in Table 3 of Fruchtel et al. (1996, supra). Suitable linkers are also described in WO93/06121, which is incorporated herein by reference.

In the area of peptide synthesis, anchors developed for peptide chemistry are stable to either bases or weak acids, but for the most part, they are suitable only for the immobilisation of carboxylic acids. However, for the reversible attachment of special functional groups, known anchors have to be derivatised and optimised or, when necessary, completely new anchors must be developed. For example, an anchor group for immobilisation of alcohols is (6 hydroxymethyl)-3,4 dihydro-2H-pyran, whereby the sodium salt is covalently bonded to chloromethylated Merrifieldz resin by a nucleophilic substitution reaction. The alcohol is coupled to the support by electrophilic addition in the presence of pyridinium toluene-4 sulphonate (PPTS) in dichloromethane. The resulting tetrahydropyranyl ether is stable to base but can be cleaved by transetherification with 95% trifluoroacetic acid. Benzyl halides may be coupled to a photolabile sulfanyl-substituted phenyl ketone anchor.

It will also be appreciated that compounds prepared with the beads and/or process of the present invention may be screened for an activity of interest by methods well known in the art. For example, such screening can be effected by specialised flow cytometry invented from standard techniques such as described e.g. by Needels et al. (1993, Proc. Natl. Acad. Sci. USA 90: 1070010704, incorporated herein by reference), Dower et al. (supra), and Kaye and Tracey (WO 97/15390, incorporated herein by reference).

Synthesis of a Combinatorial Compound Library

A combinatorial library in accordance with the present invention is a collection of multiple species of chemical compounds comprised of smaller subunits or monomers. Combinatorial libraries come in a variety of sizes, ranging from a few hundred to many hundreds of thousand different species of chemical compounds. There are also a variety of library types, including oligomeric and polymeric libraries comprised of compounds such as peptides, carbohydrates, oligonucleotides, and small organic molecules, etc. Such libraries have a variety of uses, such as immobilization and chromatographic separation of chemical compounds, as well as uses for identifying and characterizing ligands capable of binding an acceptor molecule or mediating a biological activity of interest.

The library compounds may comprise any type of molecule of any type of subunits or monomers, including small molecules and polymers wherein the monomers are chemically connected by any sort of chemical bond such as covalent, ionic, coordination, chelation bonding, etc., which those skilled in the art will recognize can be synthesized on a solid-phase support The term polymer as used herein includes those compounds conventionally called heteropolymers, i.e., arbitrarily large molecules composed of varying monomers, wherein the monomers are linked by means of a repeating chemical bond or structure. The polymers of the invention of this types are composed of at least two subunits or monomers that can include any bi-functional organic or herteronuclear molecule including, but not limited to amino acids, amino hydroxyls, amino isocyanates, diamines, hydroxycarboxylic acids, oxycarbonylcarboxylic acids, aminoaldehydes, nitroamines, thioalkyls, and haloalkyls.

In the disclosure of the present invention, the terms "monomer," "subunits" and "building blocks" will be used interchangeably to mean any type of chemical building block of molecule that may be formed upon a solid-phase support. The libraries are not limited to libraries of polymers, but is also directed to libraries of scaffolded small molecules.

Various techniques for synthesizing libraries of compounds on solid-phase supports are known in the art. Solid-phase supports are typically polymeric objects with surfaces that are functionalized to bind with subunits or monomers to form the compounds of the library. Synthesis of one library typically involves a large number of solid-phase supports.

To make a combinatorial library, solid-phase supports are reacted with a one or more subunits of the compounds and with one or more numbers of reagents in a carefully controlled, predetermined sequence of chemical reactions. In other words, the library subunits are "grown" on the solid-phase supports. The larger the library, the greater the number of reactions required, complicating the task of keeping track of the chemical composition of the multiple species of compounds that make up the library. Thus, it is important to have methods and apparatuses which facilitate the efficient production of large numbers of chemical compounds, yet allow convenient tracking of the compounds over a number of reaction steps necessary to make the compounds.

Combinatorial libraries represent an important tool for the identification of e.g. small organic molecules that affect specific biological functions. Due to the interaction of the small molecules with particular biological targets and their ability to affect specific biological functions, they may also serve as candidates for the development of therapeutics. Accordingly, small molecules can be useful as drug leads eventually resulting in the development of therapeutic agents.

Because it is difficult to predict which small molecules will interact with a biological target intense efforts have been directed towards the generation of large numbers, or "libraries", of small organic compounds. These libraries can then be linked to sensitive screens to identify the active molecules.

A number of libraries have been designed to mimic one or more features of natural peptides. Such peptidomimetic libraries include phthalimido libraries (WO 97/22594), thiophene libraries (WO 97/40034), benzodiazopene libranres (U.S. Pat. No. 5,288,514), libraries formed by the sequential reaction of dienes (WO 96/03424), thiazolidinone libraries, libraries of metathiazanones and their derivatives (U.S. Pat. No. 5,549,974), and azatide libraries (WO 97/35199) (for review of peptidomimetic technologies, see Gante, J., Angew. Chem. Int. Ed. Engl. 1994, 33, 1699-1720 and references cited therein).

The present invention also resides in a method of synthesising and deconvoluting a combinatorial library as described herein above. The codes of the plurality of beads are determined preferably before the first reaction step, although codes may be determined at any time before the first pooling step (step (d), cf. method steps cited above).

Preferably, every time the plurality of beads is apportioned into reaction vessels, each one of the vessels is analysed to determine which of the detectably distinct beads are in each reaction vessel. A database of all the beads (or corresponding gridspaces, supra) can thus be updated to show the synthetic history of the compound synthesised on each bead.

During a reaction step, the beads in each reaction vessel are reacted with a building block required to assemble a particular compound. Assembly of compounds from many types of building blocks requires use of the appropriate coupling chemistry for a given set of building blocks. Any set of building blocks that can be attached to one another in a step-by-step fashion can serve as the building block set. The attachment may be mediated by chemical, enzymatic, or other means, or by a combination of these. The resulting compounds can be linear, cyclic, branched, or assume various other conformations as will be apparent to those skilled in the art. For example, techniques for solid state synthesis of polypeptides are described, for example, in Merrifield (1963, J. Amer. Chem. Soc. 35: 2149-2156). Peptide coupling chemistry is also described in "The Peptides", Vol. 1, (eds. Gross, E., and J. Meienhofer), Academic Press, Orlando (1979), which is incorporated herein by reference.

To synthesise the compounds, a large number of the beads are apportioned among a number of reaction vessels. In each reaction, a different building block is coupled to the growing oligomer chain. The building blocks may be of any type that can be appropriately activated for chemical coupling, or any type that will be accepted for enzymatic coupling.

Because the reactions may be contained in separate reaction vessels, even building blocks with different coupling chemistries can be used to assemble the oligomeric compounds (see, The Peptides, op. cit). The coupling time for some of the building block sets may be long. For this reason the preferred arrangement is one in which the building block reactions are carried out in parallel. After each coupling step, the beads on which are synthesised the oligomers or compounds of the library are pooled and mixed prior to re-allocation to the individual vessels for the next coupling step. This shuffling process produces beads with many oligomer sequence combinations. If each synthesis step has high coupling efficiency, substantially all the oligomers on a single bead will have the same sequence. That sequence is determined by the synthesis pathway (building blockreactions and the order of reactions experienced by the beads) for any given bead. The maximum length of the oligomers may be about 50, preferably from 3 to 8 building blocks in length, and in some cases a length of 10 to 20 residues is preferred. Protective groups known to those skilled in the art may be used to prevent spurious coupling (see, The Peptides, Vol. 3, (eds. Gross, E., and J. Meienhofer), Academic Press, Orlando (1981), which is incorporated herein by reference).

With enough beads and efficient coupling it is possible to generate complete sets of certain oligomers, if desired. The appropriate size of the beads depends on (1) the number of oligomer synthesis sites desired; (2) the number of different compounds to be synthesised (and the number of beads bearing each oligomer that are needed for screening); (3) the effect of the size of the beads on the specific screening strategies e.g. fluorescence-activated cell sorters (FACS) to be used; and (4) the resolution of the encoding/detection methods employed.

Kit of Parts

The Invention in a still further aspect resides in a kit comprising:
i) a combinatorial compound library including a plurality of different compounds wherein each compound is attached to at least one of a plurality of beads, which includes a population of detectably distinct beads each having a distinctive code, which distinctively identifies a respective bead before, during and after synthesis of a corresponding compound from other beads; and
ii) tracking data on each distinctive code to identify the sequence of reactions experienced by a respective detectably distinct bead.

The invention in a yet further aspect resides in a kit comprising:
i) a composition of spatially encoded polymer matrices according to the present invention comprising a plurality of spatially immobilised particles; and
ii) an encoded bead reader device according to the invention for identifying and recording individual encoded beaded polymer matrices, wherein the device is optionally linked to a computer running a program for calculating distance matrices for individual, spatially encoded, beaded polymer matrices.

EXAMPLES

General Methods

Reagents were obtained from Fluka and used without any purification. All solvents used were of HPLC grade kept over molecular sieves. Oregon green was obtained from Molecular Probes. The 28-53 µm beads were prepared in a specially designed high-speed stirred polymerisation steel reactor and 5-28 µm beads were prepared by using a high-speed dispersion reactor. The encoded macro beads were prepared in a 250 ml baffled glass reactor equipped with a dispersion stirrer. The fluorescence images were obtained with a microscope and a digital camera. Broad band excitation in the near UV range was provided by a mercury lamp., The images of the encoded beads were recorded in water.

Example 1

Preparation of Encoded $(NH_2)PEG_{1900}$-Acrylamide Copolymer Beads

Labelled microbeads encoded $(Acr)_{1.4}$ $(NH_2)_2PEG_{1900}$-acrylamide were prepared by inverse suspension polymerisation method. In order to prepare the beads having a size 500 µm, a lower wt % (1.4%) of sorbitan monolaurate with the macromonomer was used as the suspension stabiliser. The n-heptane was used as the suspension medium and was degassed with argon for 1 h before the addition of monomers. In a, typical synthesis procedure, a solution of $(Acr)_{1.4}$ $(NH_2)_2PEG_{1900}$ (7.3 g, 3.54 mmol) in water (21 mL) was degassed with argon for 30 min. Acrylamide (0.36 g, 5 mmol) and the labelled micro beads (20 mg) in water (0.5 mL) were added to the degassed solution and the purging of argon was continued for 5 min. A solution of sorbitan monolaurate (0.1 mL) in DMF (1 mL) and the free radical initiator ammonium persulfate (300 mg) in water (2 mL) were added to the monomer mixture. The reaction mixture was then rapidly added to the suspension medium and stirred at 600 rpm at 70° C. After one min, TEMED (1.5 mL) was added to the reactor. The reaction was allowed to continue for 3 h, the encoded beads formed were filtered through the sieves and the 500 µm fraction was collected. The beads were washed thoroughly with ethanol (10×), water (10×), ethanol (10×) and dried under high vacuum.

Example 2

Preparation of Microbeads for Encoding

Synthesis of partially acryloylated $(NH_2)_2PEG_{500}$ and $(NH_2)_2PEG_{1900}$ Acryloyl chloride (1.267 mL, 14 mmol) in DCM (12 mL) was added dropwise to a solution of $(NH_2)_2PEG_{500}$ (6.3 g, 10 mmol) in DCM (18 mL) at 0° C. with stirring. The reaction mixture was kept for 1 h at 20° C. The DCM was evaporated and drying in vacuo at 20° C. yielded the 70% acyloylated $(NH_2)_2PEG_{500}$ as colourless thick oil. The partially acryloylated $(NH_2)_2PEG_{1900}$ was prepared by following the same procedure with $(NH_2)_2PEG_{1900}$ (20 g, 10 mmol) in DCM (12 mL) and acryloyl chloride (1.267 mL, 14 mmol) in DCM (18 mL).

Synthesis of $(Acr)_{1.4}$ $(NH_2)_2PEG_{500}$-DMA micro beads (28-53 µm):

A: using high speed stirred reactor:

Beads of $(Acr)_{1.4}$ $(NH_2)_2PEG_{500}$-DMA (28-53 µm) were prepared by the inverse suspension polymerisation of aqueous solutions of monomers in n-heptane:$CCl_4$ mixture (6:4, v/v, 240 mL). Sorbitan monolaurate was used by 8 wt % of the macromonomer for the stabilisation of the suspension. Argon was bubbled to the n-hepane-$CCl_4$ mixture for 1 h before the addition of monomers. In a typical synthesis procedure, a solution of $(Acr)_{1.4}$ $(NH_2)_2PEG_{500}$ (6.6 g, 10 mmol) in water (21 mL) was degassed with argon for 30 min. DMA (343 µL, 3.32 mmol) was added to the degassed solution and the purging of argon was continued for 5 min. A solution of sorbitan monolaurate (0.5 mL) in DMF (2 mL) and the free radical initiator ammonium persulfate (200 mg) in distilled water (1 mL) were added to the monomer mixture. The reaction mixture was then rapidly added to the suspension medium in the polymerisation reactor stirred at 2500 rpm at 70° C. After one min, TEMED (1 mL) was added to the reactor. The reaction was allowed to continue for 3 h, the microbeads formed were filtered through the sieves and the 28-53 µm fractions were collected. The microbeads were washed thoroughly with ethanol (10×), water (10×), ethanol (10×) and dried under high vacuum.

B: using dispersing instrument

Microbeads of $(Acr)_{1.4}$ $(NH_2)_2PEG_{500}$ (5-28 µm) were prepared by the inverse suspension polymerisation of aqueous solutions of monomer in n-heptane (100 mL). Sorbitan monolaurate was used by 25 wt % of the macromonomer for the stabilisation of the suspension. Argon was bubbled to the n-hepane for 1 h before the addition of monomer. A solution of $(Acr)_{1.4}$ $(NH_2)_2PEG_{500}$ (2 g, 3.03 mmol) in water (6 mL) was degassed with argon for 30 min. A solution of sorbitan monolaurate (0.5 mL) in DMF (1 mL) and the free radical initiator ammonium persulfate (200 mg) in distilled water (1 mL) were added to the monomer solution. The reaction mixture was then rapidly added to the suspension medium in a reactor equipped with a high-speed dispersing instrument stirred at 9000 rpm at 70° C. After one min, TEMED (1 mL) was added to the reactor. The reaction was allowed to continue for 3 h, the microbeads formed were filtered through the sieves and the 528 µm fractions were collected. The microbeads were washed thoroughly with ethanol (10×), water (10×), ethanol (10×) and dried under high vacuum.

Example 3

Labelling of Encoding Particles

Labelling of $(Acr)_{1.4}$ $(NH_2)_2PEG_{500}$-DMA (2853 µm) micro beads with Oregon Green 514 dye: The microbeads (0.2 g, 0.8 mmol/g) were kept in DMF/water (5 mL) for 1 h. The Oregon Green™514 carboxylic acid, succinimidyl ester (0.147 g, 0.24 mmol) in DMF (200 µL) was added to the swollen microbeads and the reaction mixture was kept at room temperature. After 1 h, the beads were filtered through a 0.45 micron filter and washed with DMF (10×) and water (10×).

Labelling of $(Acr)_{1.4}$ $(NH_2)_2PEG_{500}$ (5-28 µm) micro beads with Oregon Green 514 dye: The microbeads (0.2 g, 1 mmol/g) were kept in DMF/water (5 mL) for 1 h. The Oregon Green™514 carboxylic acid, succinimidyl ester (0.184 g, 0.3 mmol) in DMF (200 µL) was added to the swollen microbeads and the reaction mixture was kept at room temperature. After 1 h, the beads were filtered through a 0.45 micron filter and washed with DMF (10×) and water (10×).

Labelling of $(Acr)_{1.4}$ $(NH_2)_2PEG_{500}$-DMA (28-53 µm) micro beads with 1-Cyano benz[f]isoindole: To a stirred suspension of 2,3-naphthalene dicarboxaldehyde (29.44 mg, 0.16 mmol) in MeOH (2 mL) was added NaCN (8 mg, 0.16 mmol) at room temperature. To the reaction mixture, the resin (0.2 g, 0.16 mmol) was added and kept at room temperature. After 30 min, the resin was filtered and washed with MeOH (10×), DMF (10×) and water (10×).

Example 4

Presorting Beads According to Integrated Fluorescence

A custom made Compas Beads (Union Biometrica) bead-sorter with laser exitation at 488 nm and detection of fluorescence at 514 nm was used to pool the beads synthesized according to the number of small particles. The integrated fluorescence of the small particles was recorded with the selection (sorting) window preset to collect those beads having 3-4 small particles at a sorting rate of 30 beads/s at a flowrate of 1000 mm/s of Compas sheat fluid corresponding to sorting of 900.000 beads in a working day. The collected beads were resorted to yield approximately ~20% containing 3-4 particles/bead. The quality of the collected pool was verified using a fluorescence microscope.

Example 5

Synthesis of 400 Dipeptides with Bead Portioning and Bead Identification

The peptide library was prepared in a 20-well multiple column peptide synthesiser. Approximately 50 beads were taken in a glass plate and the image of these beads were recorded in three shuffled states and then added to one of the wells in the synthesiser. The beads were taken in 20 wells of the synthesiser accordingly. The resin was washed with DMF and the $N_α$-Fmoc-protected OPfp ester of the amino acid (10 mg) was added to each well of the synthesis block. The reaction mixture was kept at room temperature for 3 h and washed with DMF (6×). The beads were removed from the block, combined together and the Fmoc-protection was removed by 20% piperidine in DMF (3 mL, 20 min). The resin was washed with DMF (10×), split in to 20 portions and added to each well of the block after recording its image in three shuffled states. After the incorporation of the second amino acid, the beads were transferred to a syringe. The Fmoc protection was removed by 20% piperidine in DMF (3 mL, 20 min) and the resin was washed with DMF (10×). The side chain protection of the peptide was removed by treating with 50% TFA in DCM (3 mL, 30 min), and the resin was washed with DCM (10×), DMF (10×) and water (10×).

Example 6

Selection and Structure Determination on a Fraction of an Encoded Library by Visual Decoding Twenty beads were randomly selected from the peptidyl resin and record the images separately in water. The sequence of the dipeptide on each bead was decoded by visual comparison of final image of the bead with pre-recorded images of the beads.

Example 7

Confirmation of Structure by Solid Phase Edman Sequencing

Single beads from the dipeptide library were placed on a filter and subjected to Edman sequencing on a 477 A Protein Sequencer (Applied Biosystems) to provide the dipeptide structure in two standard cycles.

Example 8

Capturing 3 Orthogonal 2D-Projections of a Bead

A triangular hole was carved in a 1 cm plate of POM. The hole was symmetrical with sides angled at 54.3° and a length of the side of the lower triangle of 5 mm. The plate was mounted horisontally and a microscope was mounted at an angle of 35.7° underneath so it was perpendicular to the surface of a quartz flowcell mounted in the triangular hole of the POM holder. The corner of the quartz cell could thus be projected onto the CCD of the microscope from all three orthogonal sides, simple by carefull rotation of the quartz cell. The beads recorded were fixed on the quartz cell wall simply by adhesion to the walls of the corner and was submerged in the appropriate solvent. Three orthogonal pictures were recorded under identical conditions and the coordinates relative to one of the particles were generated.

Example 9

Determining the Centre of a Particle in a 2-D Projection

The three 2-D pixel-based projections obtained from CCD cameras are treated by the following algorithm. For each alternate pixel in each alternate line of the image it was tested whether a pixel was bright or dark by testing the blue rgb value. Testing was continued from the one before the bright pixel in single pixel steps until at least two dark pixels were detected. Then the center of the range of bright pixels were determined. From this point the height and the center of the bright spot was determined. The center and the region occupied by the bead was recorded. The search for spots was continued, but ommitting bright pixels within areas already occupied. The centers of bright spots with an area above a small treshold were used as coordinates for the particles.

Example 10

Confocal Determination of Spatial Positions of Particles in a Bead

In a stopped flow system individual beads are positioned in a confocal scanning system as in a commercial scanning microscope. The positioning system is based on small IR lasers detecting changes in refractive index or absorption. If the particles are fluorescent, the bead is illuminated with monochromatic light corresponding to excitation wavelength of the fluorescent dye. If it is simple coloured particles the bead is illuminated with white light.

Figure 3:
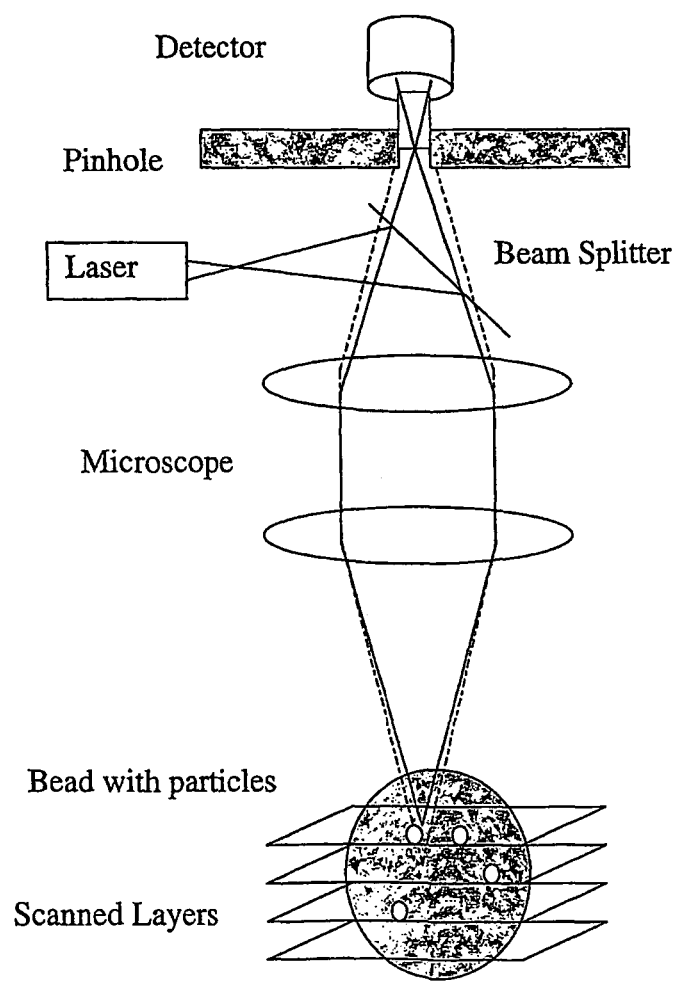
FIG. 3. Recording of coordinates of particles in a bead by focal or confocal microscopy.

The bead Is scanned in consecutive 2-D layers as depicted in FIG. 3. The resolution (pixel dimension) in the layers as well as the distance between layers is selected to be smaller than the average particle diameter. Based on the consecutive scans a 3-D matrix of particle positions are formed. The dataset is reduced calculating inter-particle distances or vectors, and the remaining information is discarded.

Example 11

Figure 4:
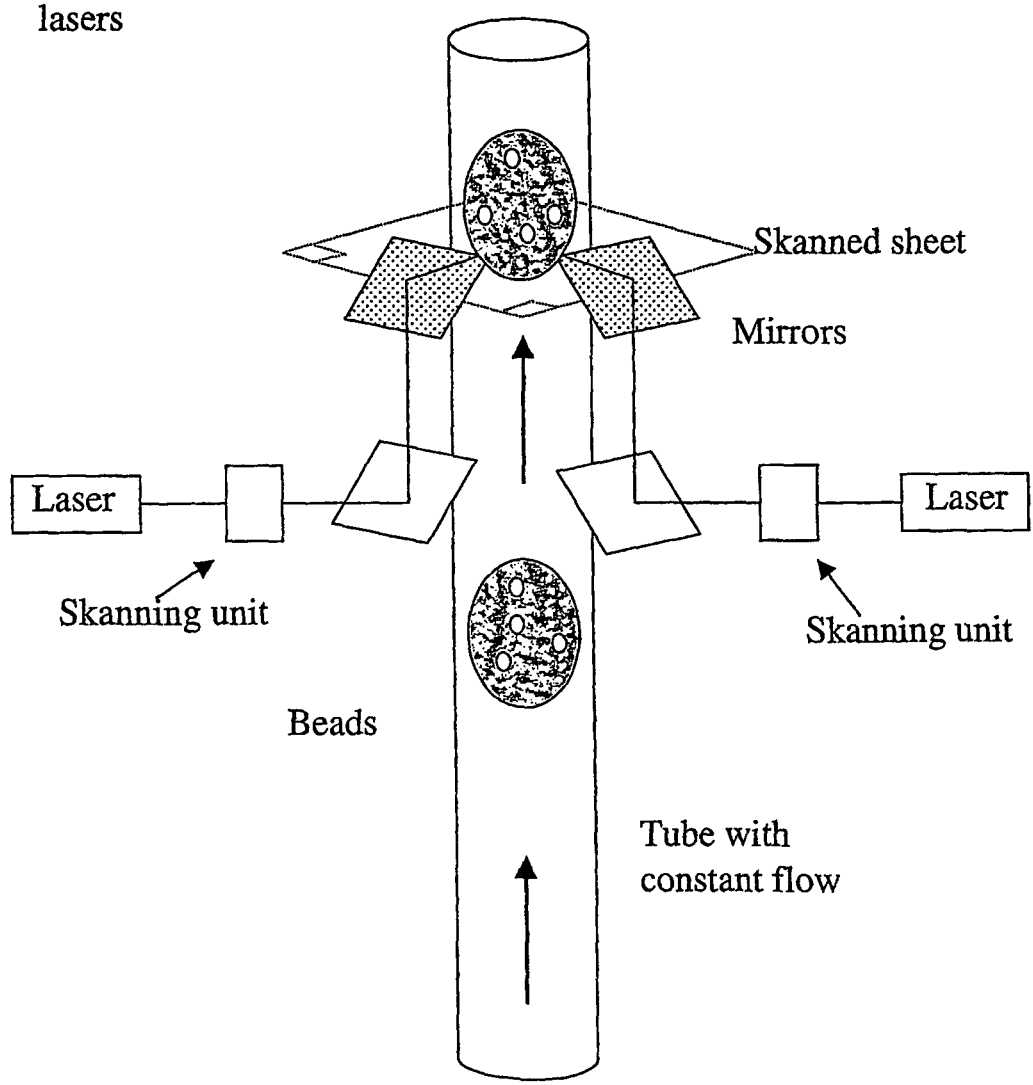
FIG. 4. Recording of coordinates of particles in a moving bead by two alternating scanning lasers.
Figure 5A:
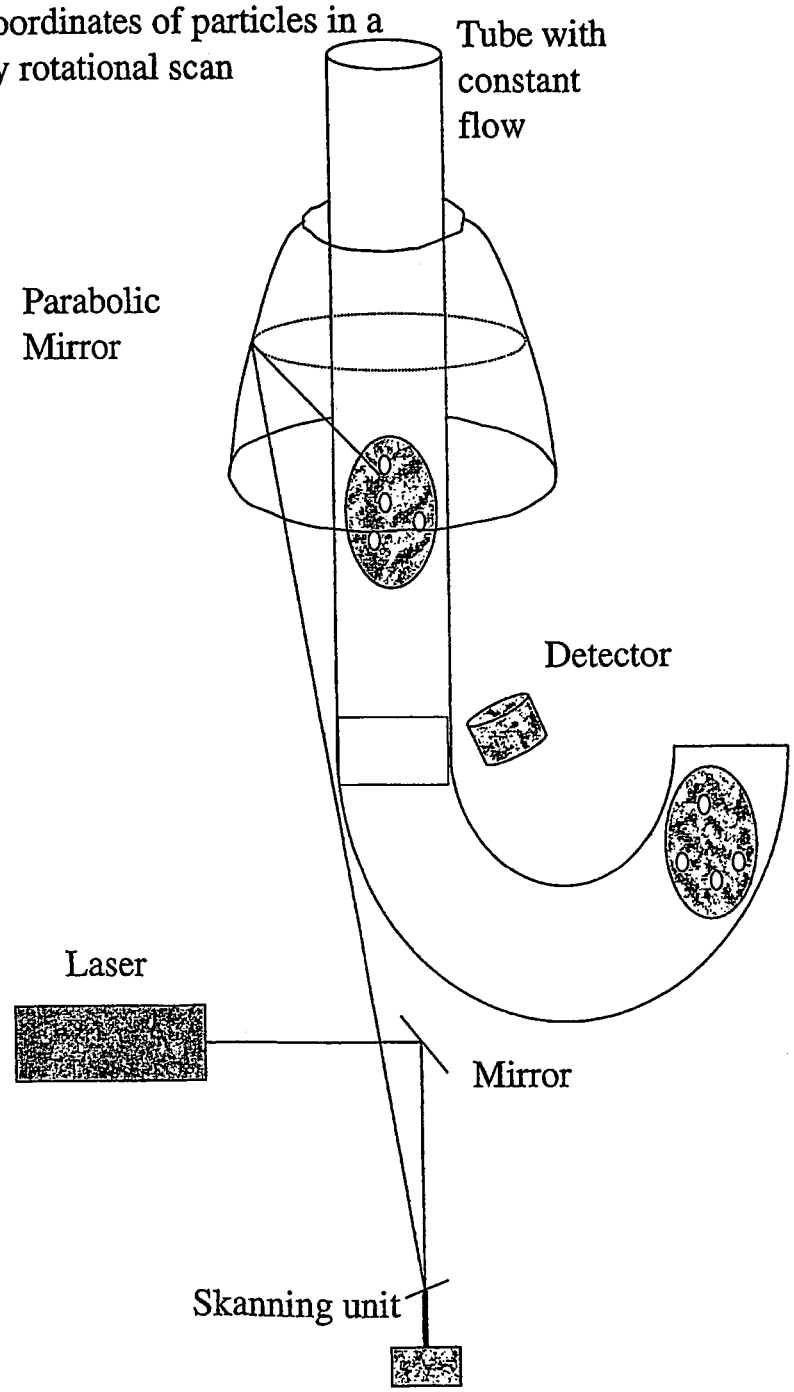
FIGS. 5A and B. Recording of coordinates of particles using a single laser and a rotating mirror with reflection from 3 angles.
Figure 5B:
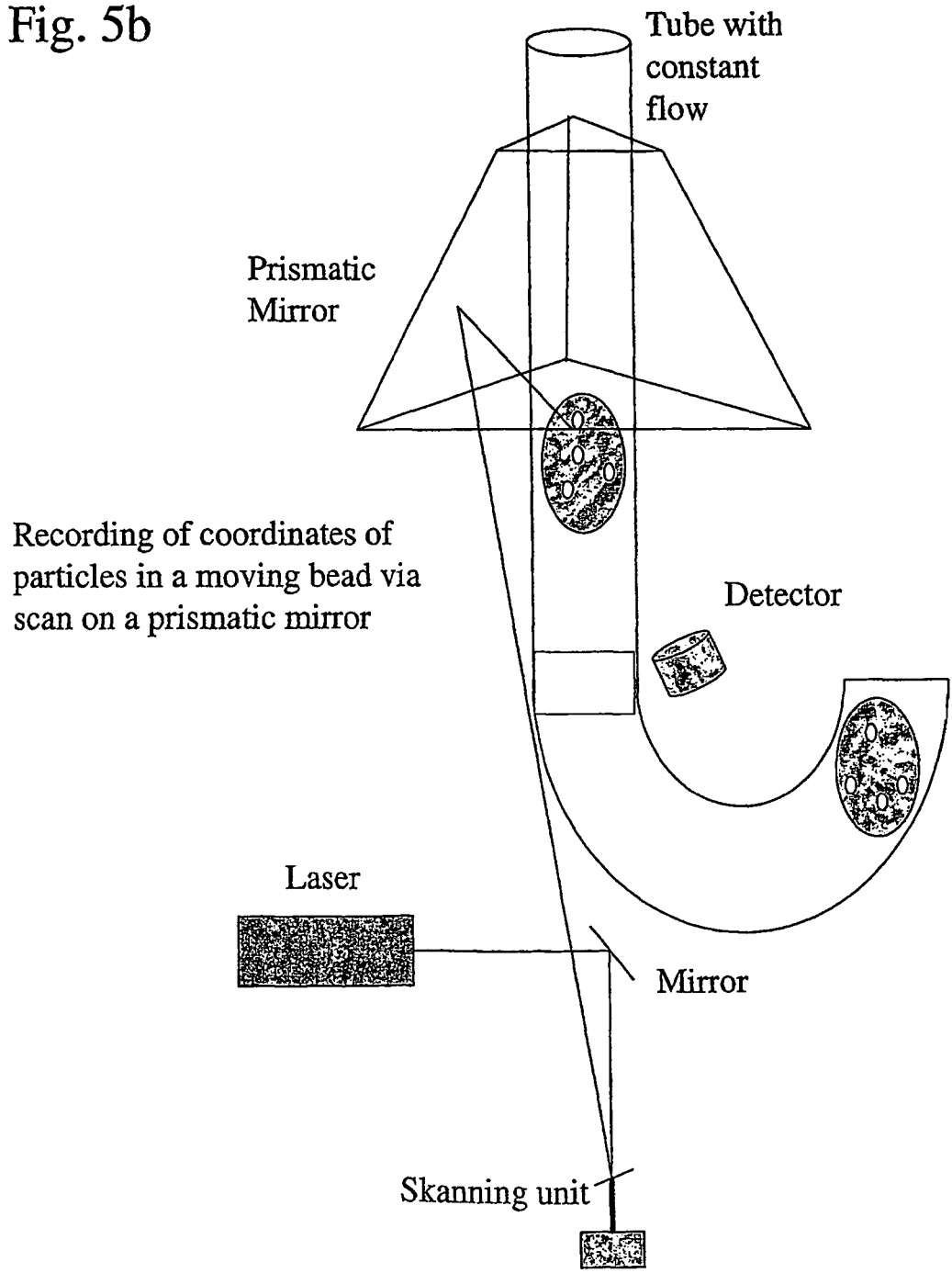
Figure 6B:
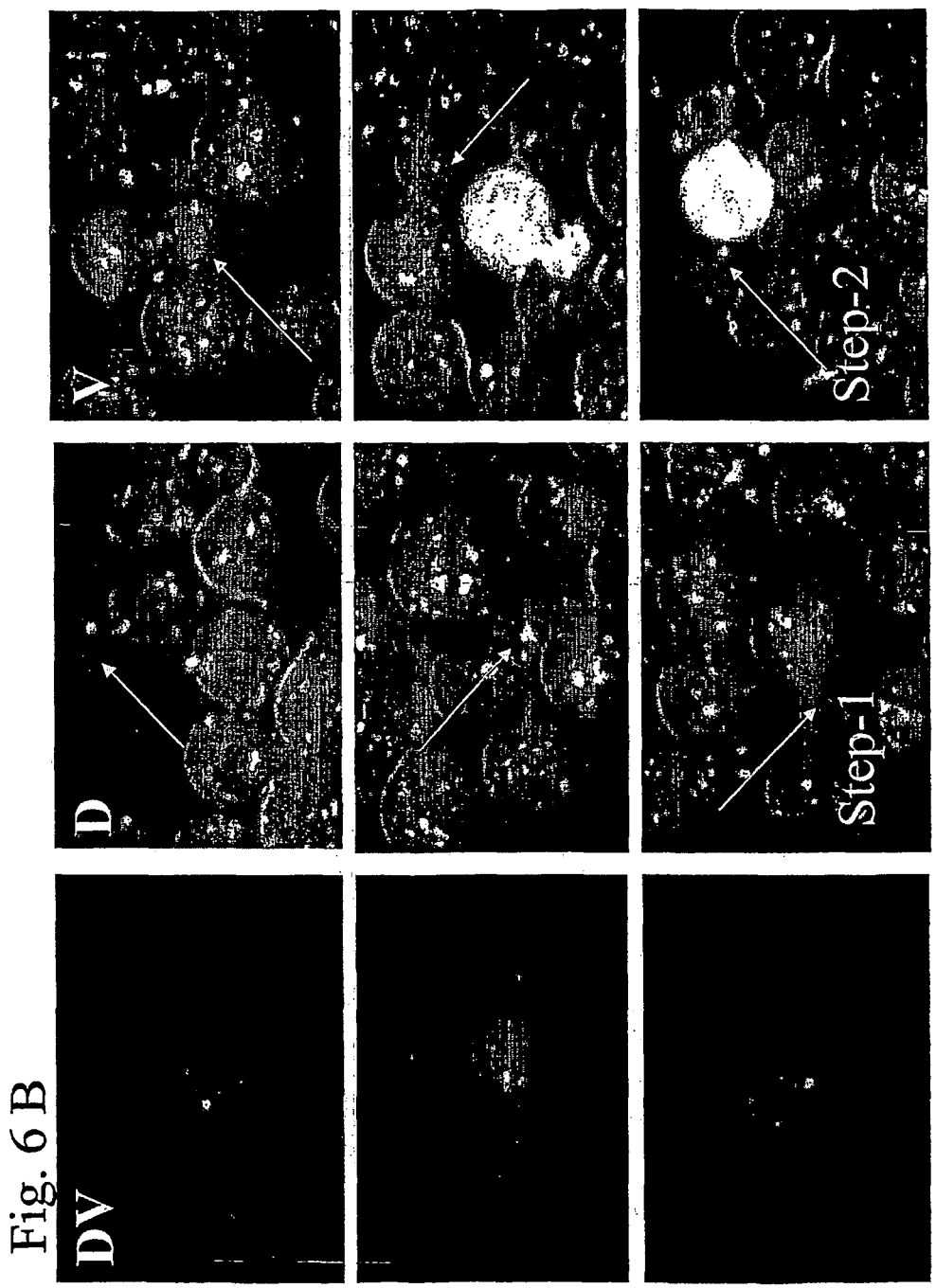
FIG. 6A-I. Selected examples of pictures of 20 selected beads shown with the pool of identification out of 20 possible for each reaction step.
Figure 6:
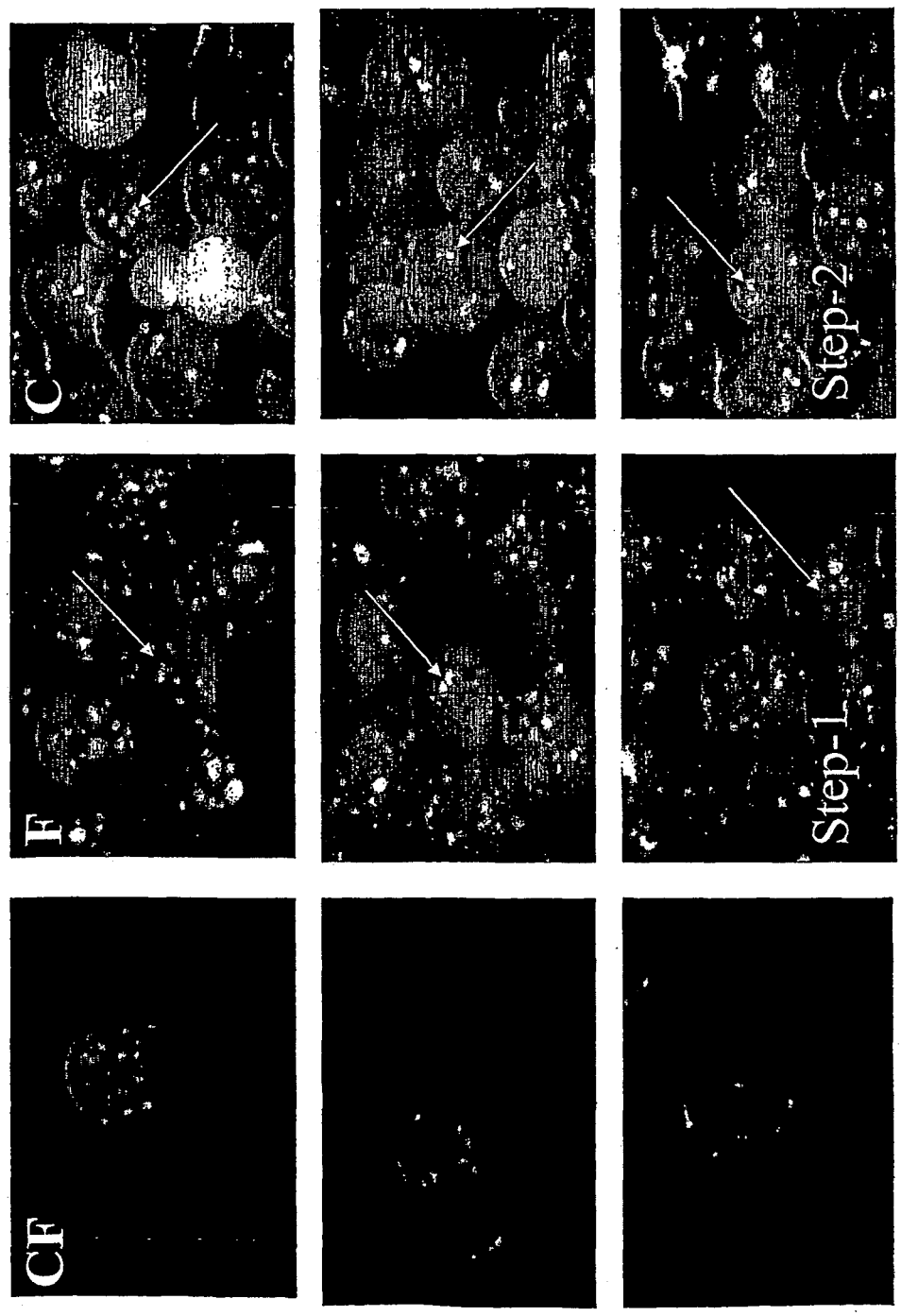
Figure 6D:
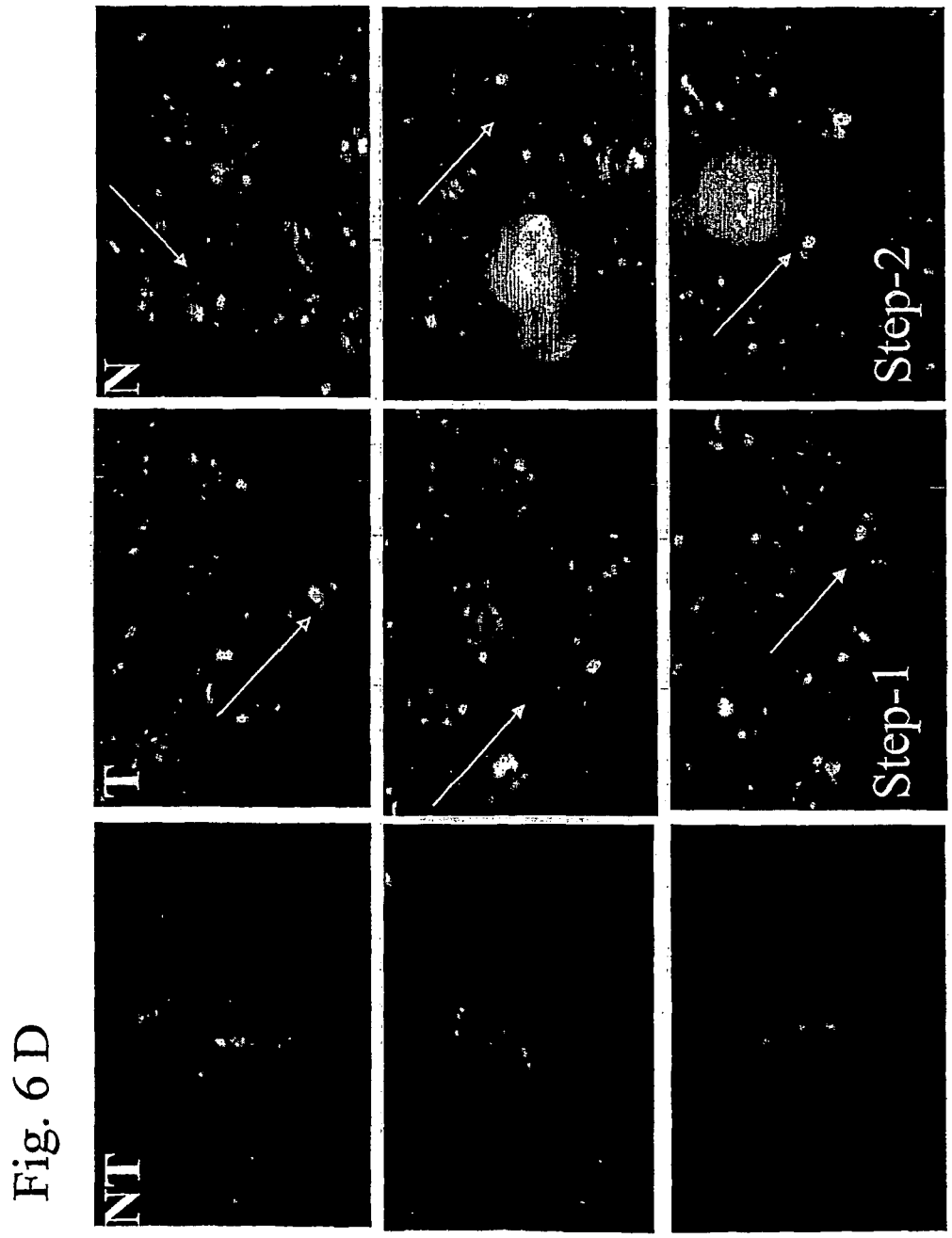
Figure 6E:
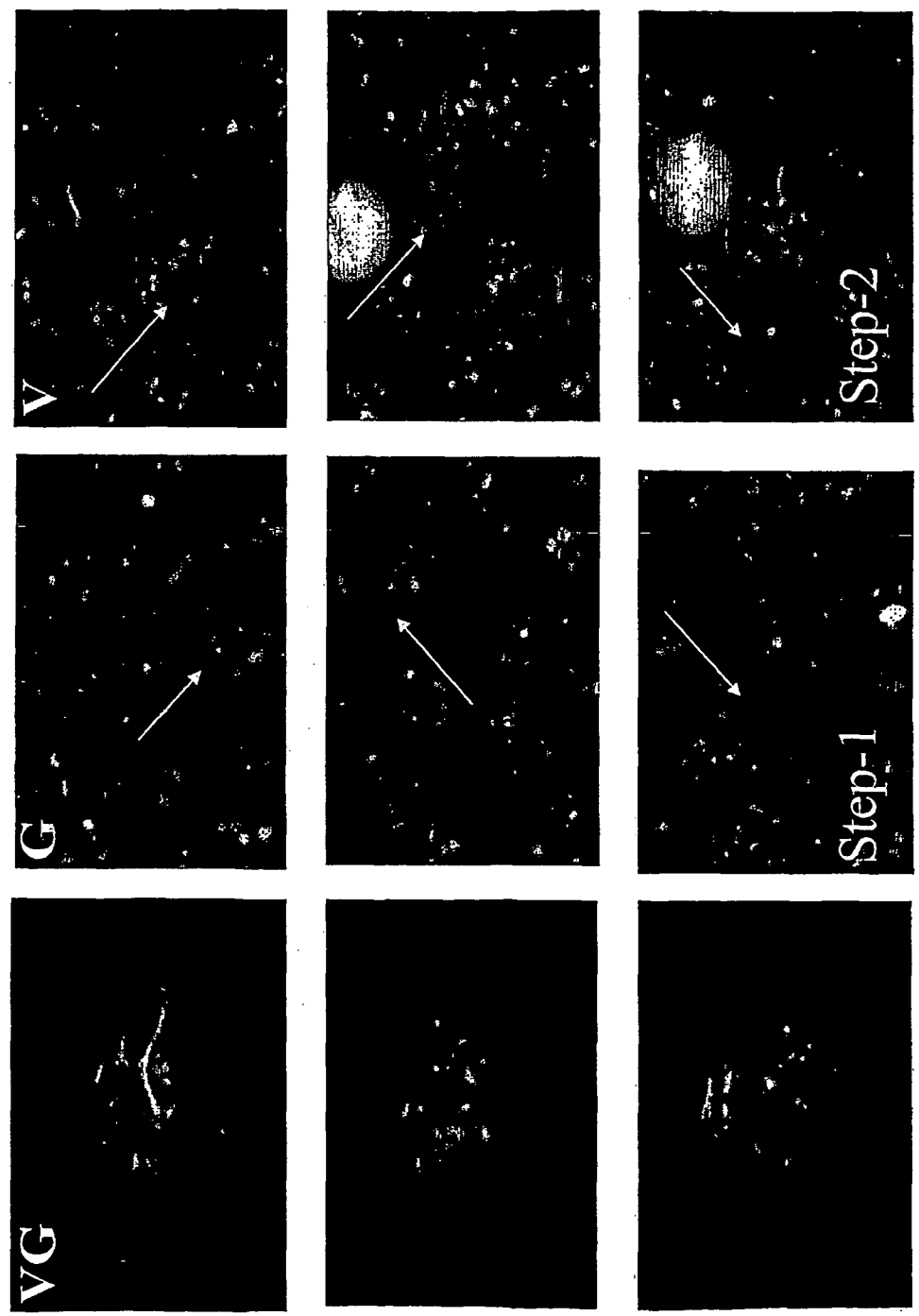
Figure 6:
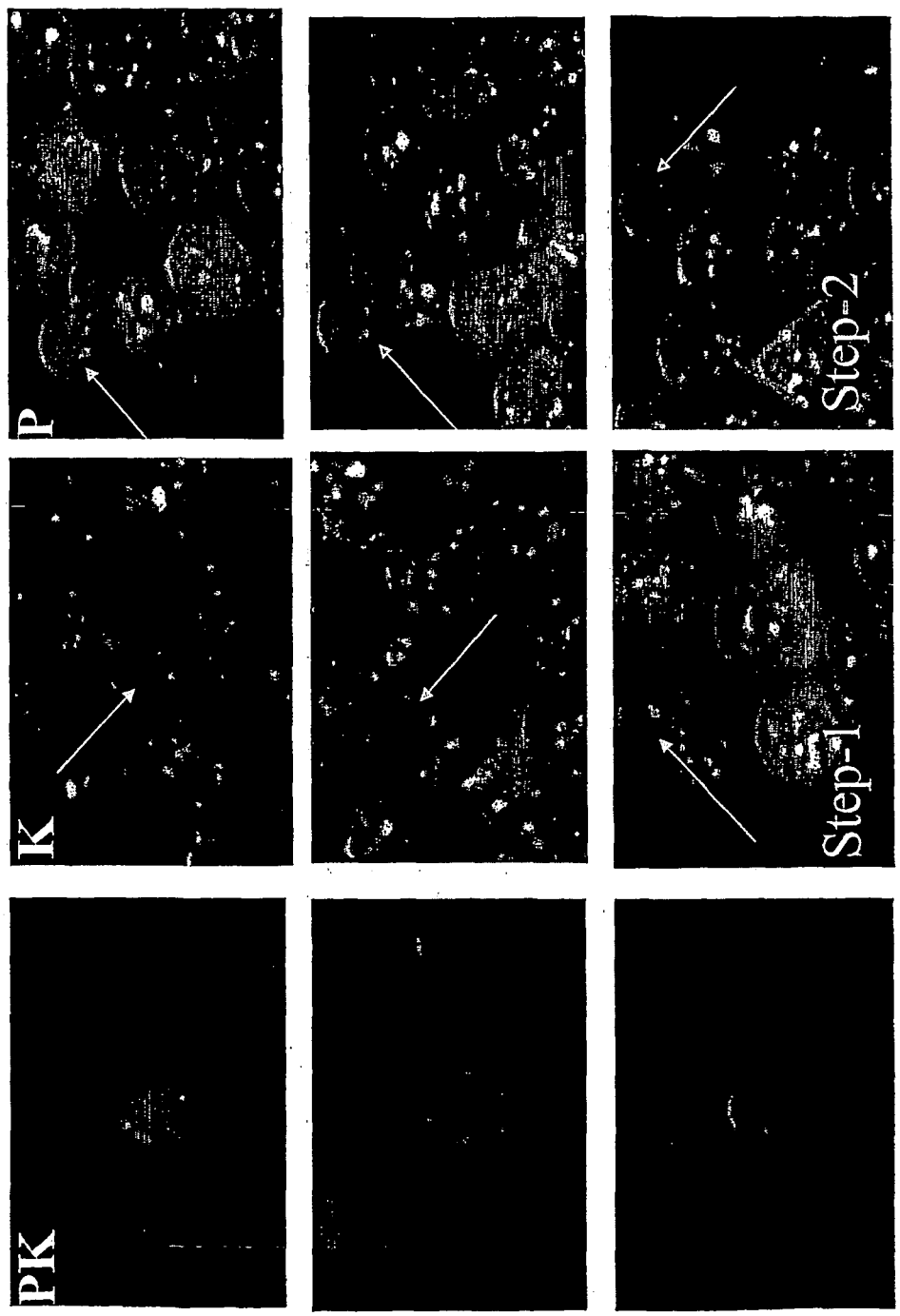
Figure 6:
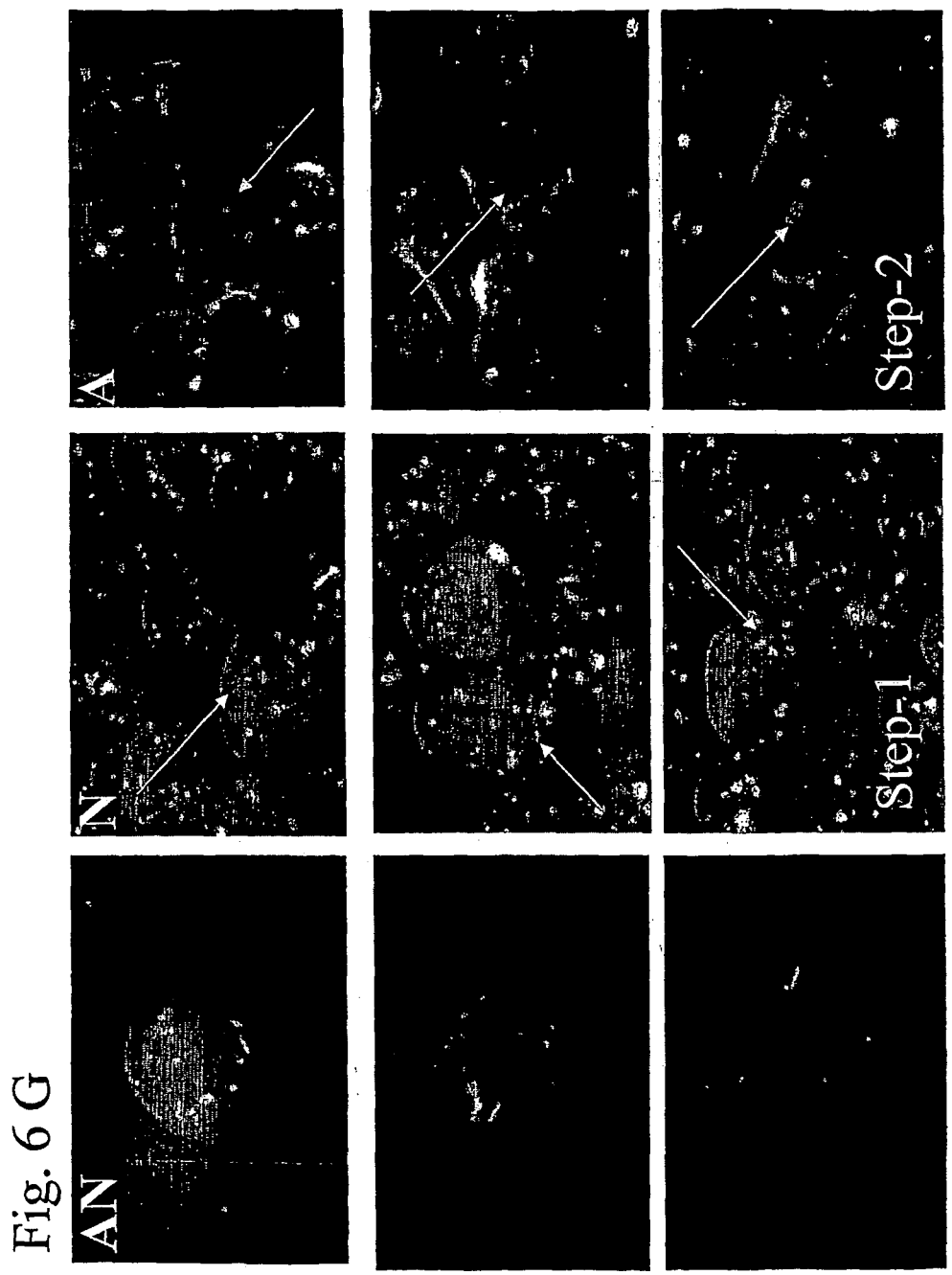
Figure 6:
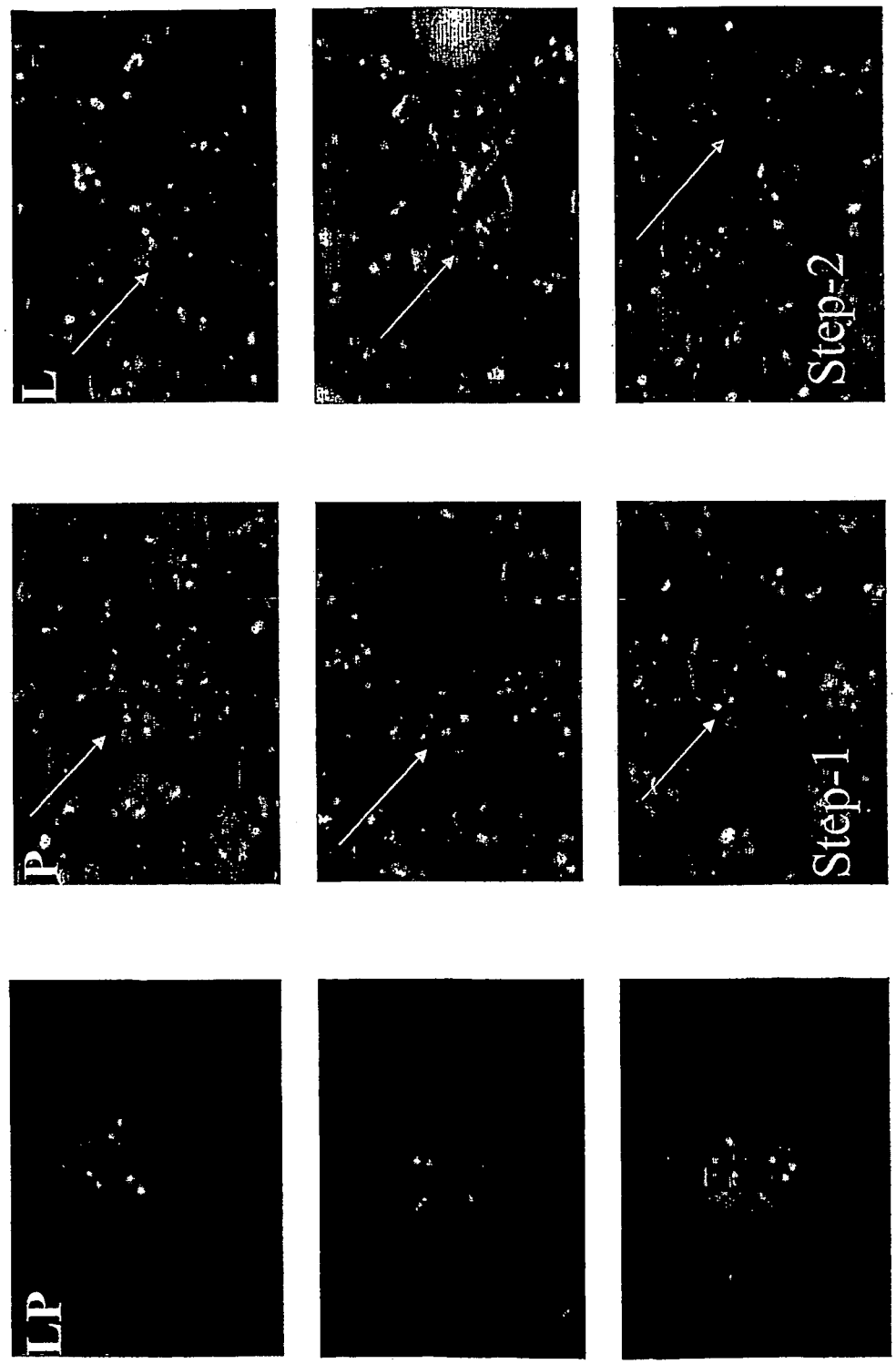

Recording of Coordinates of Particles in a Moving Bead by Two Alternating Scanning Lasers In a pulsation free constant flow system individual beads are passed through a scanning system with two orthogonal laser scanning systems as depicted in FIG. 4. The two 1-D laser scanners are both orthogonal to the flow direction, and allow a full 3-D scanning of the passing beads, which are moving with constant velocity. In fluorescence mode the lasers will emit light at an excitation wavelength for the fluorescent dye in the particles in the beads.

A fast response emission light detector records the time-resolved emission signal, which in conjunction with the flow speed and the scan parameters are used to construct a full 3-D matrix of particle positions. The dataset is reduced calculating interparticle distances or vectors, and the remaining information is discarded.

Example 12

Recording of Coordinates of Particles in a Moving Bead by Rotational Scan

In a pulsation free constant flow system individual beads is passed a scanning system applying a rotational scan focussed on the bead via a parabolic mirror as depicted in FIG. 4.

The two 1-D laser scanners are both orthogonal to the flow direction, and allow a full 3-D scanning of the passing beads, which are moving with constant velocity. In fluorescence mode the laser emits light at an excitation wavelength for the fluorescent dye in the particles in the beads. The circle scan onto the parabolic mirror is passing alternating 60 degree segments of full and blocked transmission to give three curved scan lines for each rotation.

A fast response emission light detector records the time-resolved emission signal, which in conjunction with the flow speed and the scan parameters are used to construct a 3-D matrix of particle positions. The dataset is reduced calculating interparticle distances or vectors, and the remaining information is discarded.

Example 13

Determination of Distance Matrix from Particle Coordinates

Figure 1:
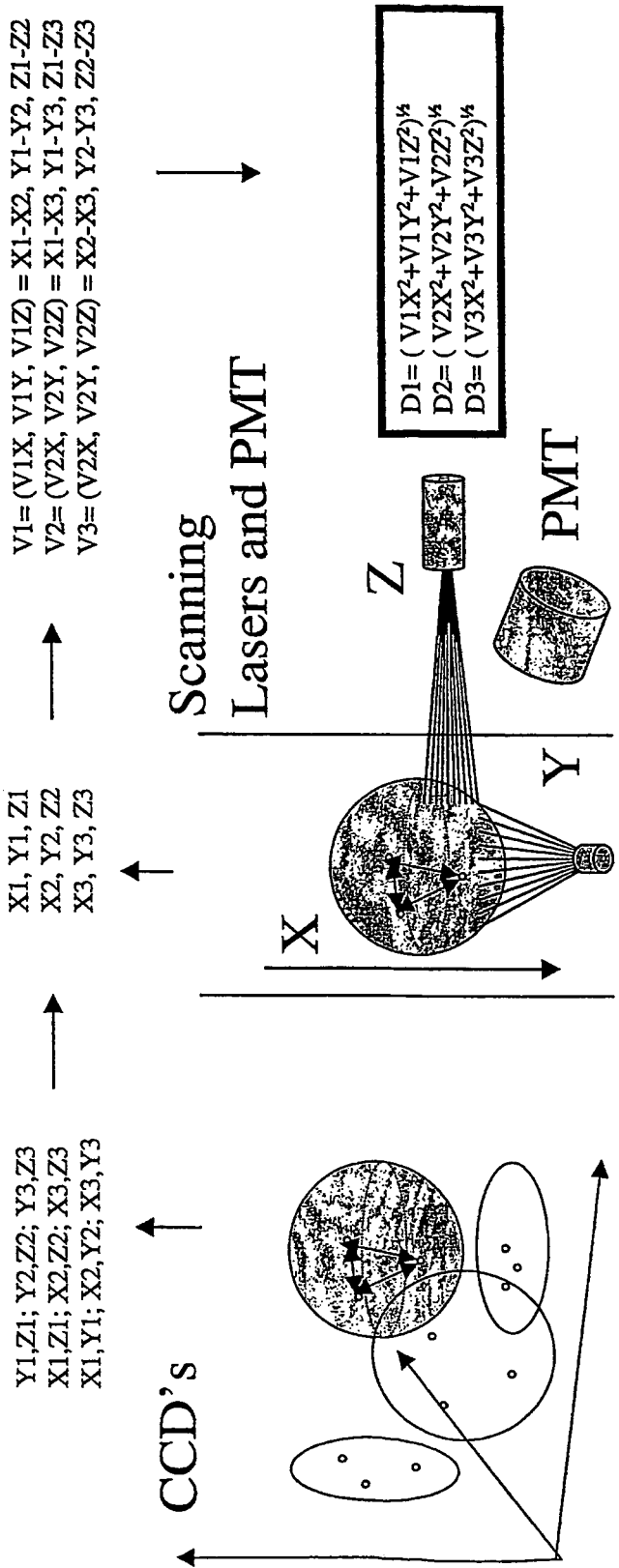
FIG. 1: The principle of recording of coordinates for encoding particles in a bead and conversion to a orientation independent distance matrix that uniquely identifies the single bead. Three unique distances within 500 micron beads comprising 1 micron particles there is 65.449.846 positions giving in theory ~$3 \times 10^{23}$ combinations from which at least $3 \times 10^{15}$ will be unique. Orthogonal recording on three LCD detectors yields 9 co-ordinates. These can be paired based either on fluorescence intensity or on a fourth non orthogonal detector. Conversion to inter-particle distances gives an orientation independent parameter set. The 3 distances (3 particles) are sorted and indexed according to the longest distance. Beads are sorted according to number (3, 4 or 5) of particles prior to use. If beads with 4 particles are used, 6 distances are stored etc. Alternatively, two scanning lasers can directly yield the three coordinate sets on the moving bead.
Figure 2:
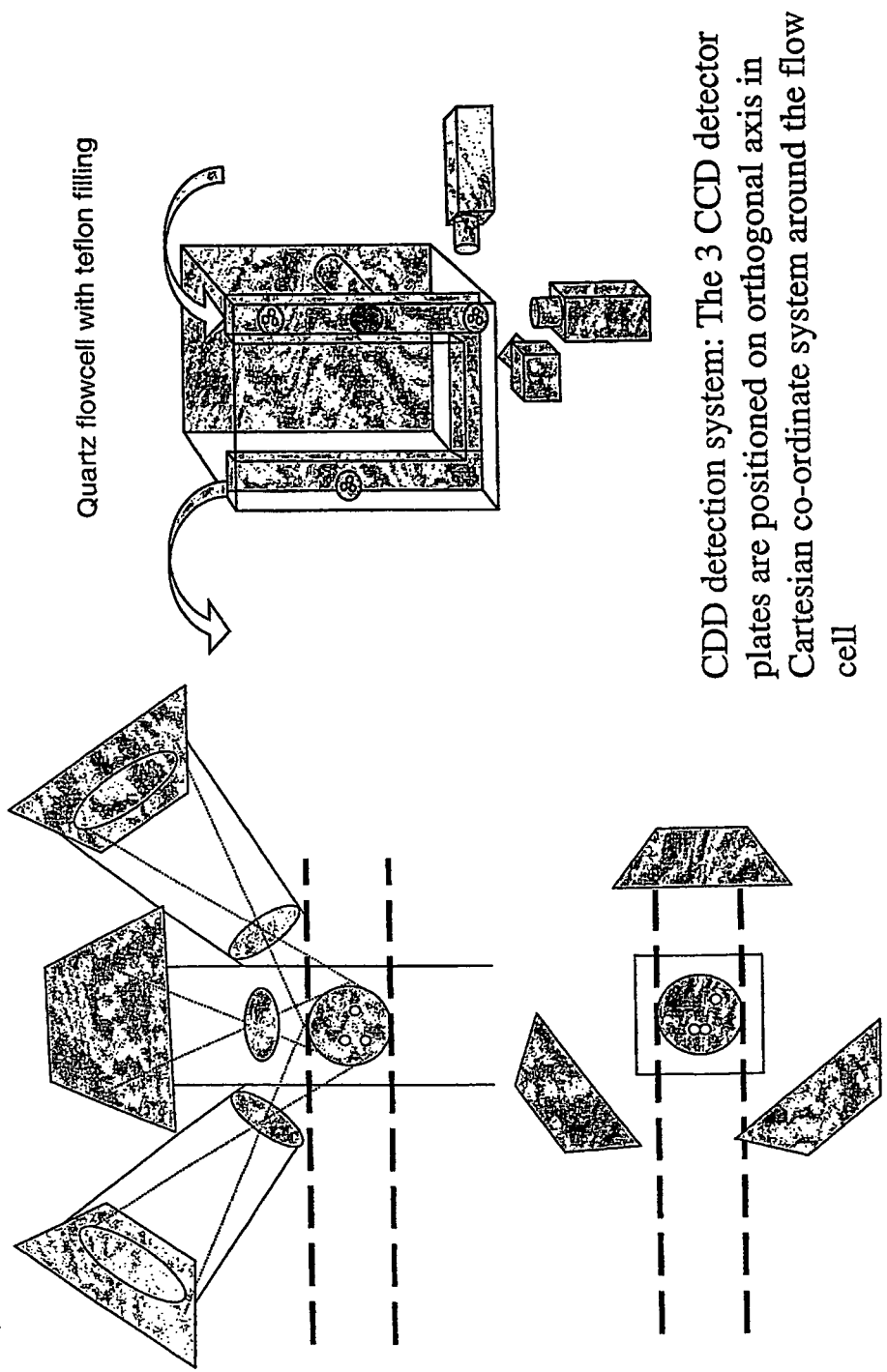
FIG. 2. Recording of particle coordinates with 3 ccd's for xy-plane placed along 3 orthogonal axis by excitation of the bead with a single laser pulse.

The coordinates of the particles were determined according to example 8 above. Coordinates were measured in pixel units e.g for picture set b1a-b1c coordinates (0, 0, 0); (22, 110, 84); (−94, 168, 153) were measured. From these coordinates the unique set of distance parameters (140, 245, 146) (length of inter particle vectors) were calculated according to the formula presented in FIG. 1. The average error on determination of coordinates was approximately 2% corresponding to the resolution of the method.

Example 14

Robustness of the Method for Identification

In order to obtain a quantitative measure of how well individual beads can be distinguished by inserting small fluorescent beads to encode them, a Monte Carlo simulation was performed.

To this end, envisage a spherical bead as being composed of small cubic volume elements (voxels) of unit vertex length.

The actual voxel size corresponds to the accuracy of determining the position of the fluorescent marker within the bead. Then the voxel centers form a grid of potential encoding points within the spherical bead, out of which in the simplest cases m=3 or m=4 are randomly selected. Generically, these points of encoding can be regarded as corners of a triangle with n=3 vertices or of a tetrahedron (n=6 vertices). The vertex lengths correspond to the distances between the encoding points. When ordered by magnitude, the set of vertex lengths is invariant under global rotation and translation of the large bead. (Moreover, it is in fact invariant under any action of a symmetry point group in three-dimensional space including inversion at the origin and mirroring at a plane thus discarding potential discrimination by chirality in the case of tetrahedra.)

If the set of vertex lengths is ordered in descending magnitude, i.e. $v_1 \geq v_2 \geq \ldots \geq v_n \geq 0$ with n=3 (6), then the encoding vector $v=(v_1, v_2, \ldots, v_n)$ can be identified with a point in the upper half of the three (or six-) dimensional positive real space $J^3_+ (J^6_+)$, respectively.

Let $r \geq 0$ denote the finite resolution of a CCD camera. Then two beads j and k cannot be discerned if their encoding vectors $v_j$ and $v_k$ correspond to points less than r apart from one another, i.e. if the separation of encoding $\cap v = \tau v_j - v_k \tau$ falls below the camera resolution $\cap v$ P r.

Figure 8:
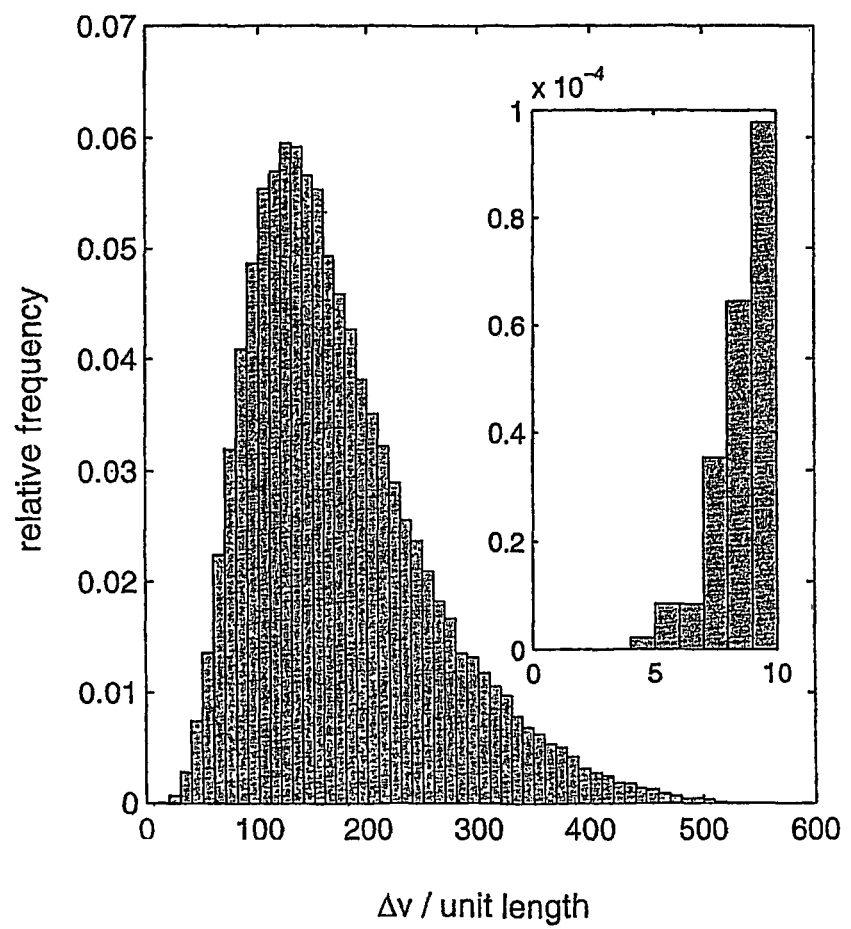
FIG. 8. Monte Carlo simulation of 10,000 beads of 500 units diameter. Using 4 fluorescent particles, the relative frequencies for different encoding separations ∩v (see text) are plotted. The main figure is given on the basis of 100,000 out of the total of $$\binom{10^4}{2} \approx 50 \text{ million}$$

The corresponding Monte Carlo simulation gives the following results for a bead of 500 units diameter: If the bead is marked with 3 fluorescent points, then 5 in 10,000 beads give rise to an encoding separation $\cap v$ P 6 units. If 4 encoding points are used as shown in FIG. 8, then only 2 in 10,000 beads show separations $\cap v$ P 12 units, and in none out of 50 million pairs simulated the separation is $\cap v$ P 3 units. For a bead diameter of 5000 units the resolution greatly improves: Encoding by 3 points leads to 5 beads in 100,000 whose separations of encoding are $\cap v$ P 60 units. With 4 points one only has 1 in 100,000 beads with $\cap v$ P 120 units separation.

In conclusion, by inserting four encoding particles into a standard bead of 500 μm diameter, within which the centers of the fluorescent particles can be determined with a typical accuracy of 1 μm, provides ample space for encoding many millions of individual beads. The probability that an active hit will not be uniquely identified is very small according to the present simulations.

Example 15

Microbead Synthesis

In order to optimize the synthesis of the microbeads, 4 experiments were made. In these experiments the stirring speed and the amount of surfactant were changed, see Table 2.

TABLE 2

| | Conditions for optimization of microbeads | | | | | | |
|---|---|---|---|---|---|---|---|
| Sample | Sorbitain monolaurate (g/%) | Acr-JEF$_{600}$ (g) | Dimethyl acrylamide (ml) | H$_2$O (g) | Vazo 44 (mg) | TMEDA (ml) | Stirring rate (rpm) |
| JHT466 | 1.65/25 | 6.6 | 0.34 | 22 | 283 | 1 ml | 4000 |
| JHT471 | 1.65/25 | 6.6 | 0.34 | 22 | 283 | — | 2000 |
| JHT472 | 0.825/12.5 | 6.7 | 0.34 | 22 | 283 | 1 ml | 2000 |
| JHT473 | 0.825/12.5 | 6.6 | 0.34 | 22 | 283 | 1 ml | 4000 |

All polymerizations were made in 270 ml Isopar M, using a polymerization temperature of 30° C. (beginning) to 50° C. (end) and a reaction time of 4 h.

For a typical synthesis, 240 ml Isopar M was transferred to a baffled steel reactor and heated to the polymerization temperature. The Isopar M was purged with argon for 30 minutes. In a round-bottomed flask 6.6 g AcrJeffamine-600 (Acr-JEF$_{600}$), 0.825 g sorbitane monolaurate, 22 g distilled water and 0.34 ml dimethyl acrylamide were mixed and purged with argon for 30 minutes. After 30 minutes 0.283 g of Vazo 44 was added and the polymerization solution was purged with argon for another 5 minutes before it was transferred to the reactor. The polymerization solution was suspended in the Isopar M using a stirring speed of 2000 rpm. After 1 minute 1 ml of N,N,N',N'-tetra methyl ethylene diamine (TMEDA) was added to the polymerizing suspension The polymerization temperature was initially 30° C. but it was increased to 50° C. in 1 h. The suspension was stirred for another 3 h.

The microbeads were purified by centrifugation using ethanol and dimethyl formamide (DMF) for washing. In a typical purification the suspension from the reactor was transferred to two centrifuge tubes and centrifuged at 4000 rpm for 20 minutes. The supernatant was removed and the beads were suspended in ethanol. The suspension was centrifuged at 4000 rpm for 20 minutes and the supernatant removed. This procedure was repeated until the supernatant was clear. Afterwards, the microbeads were washed 3 times with DMF using the procedure just described.

For the use in the encoded beads the micro-beads were labeled using a flurissen dye. In a typical reaction 1.0 g of microbeads swelled in DMF, 34 mg ATOTA 1 (flurissen dye) and 20 ml of DMF were mixed in a 50 ml round-bottomed flask. The flask was fitted with a condenser and a drying tube. The mixture was, reacted for 2 days. The purification of the beads is described in the part describing the purification and fractionation of the microbeads after labelling. FIG. 16 shows pictures of the purified microbeads before fractionation.

As observed from the pictures in FIG. 16, the microbeads JHT466 and 473 are very small, and cannot be used for encoded beads. The bead size distribution in sample JHT472 is broad and the average size to small. The best result was obtained using the conditions given for JHT471, however, some separation of the beads are still needed.

Example 16

Spatially Encoded Beads

In order to optimise the preparation of encoded beads, a range of experiments were made. The aim was to improve the distribution and number of microbeads in the encoded beads and to improve the strength of the encoded beads. The conditions for reactions made in this optimization are given in Table 3.

In a typical encoded beads preparation, a baffled steel reactor was charged with 270 ml of Isopar M and heated to 70° C. The Isopar was purged with argon for 30 minutes. 16.9 g AcrJeffamine-2000 (AcrJEF$_{2k}$), 0.839 g acrylamide, 0.231 g sorbitain monolaurate, 200 μl microbeads in DMF and 50 g distilled water were mixed in a 250 ml round-bottomed flask. The mixture was purged with argon for 30 minutes before 0.695 g of ammonium persulfate was added. Afterwards, it was purged with argon for another 5 minutes before it was transferred to the reactor. The polymerizing mixture was suspended in the Isopar M using a stirring speed of 500 rpm. After 1 minute 3.4 ml of TMEDA was added. The polymerizing suspension was stirred for 5 h at 70° C. The polymerization temperature of 70° C. was constant over night to ensure high conversion. Afterwards, the Isopar M was removed by filtration and the product was washed with 3*300 ml dichloromethane, 3*300 ml tetrahydrofurane, 3*300 ml methanol and 5*300 ml distilled water. The results from the optimization are given in Table 3. All the polymerizations were made in 270 ml Isopar M, except for JHT475 and JHT483 which were made in 270 ml n-Heptane. Vazo 44 or Ammonium persulfate were used as radical initiators. A fluorescence image of one encoded bead from sample JHT476 is shown in FIG. 17. An orthogonal pair of fluorescence images obtained with an encoded bead reader according to the present invention is shown in FIG. 18.

TABLE 3

Reaction conditions for encoded beads synthesis.

| Sample | AcrJEF$_x$ (g) | Sorbitain monolaurate (g) | Acrylamide (g) | Particles (μl) | Radical Initiator (g) | TMEDA (ml) | Temp (° C.) | Stirring (rpm) | H$_2$O (g) |
|---|---|---|---|---|---|---|---|---|---|
| JHT409 | 16.9 x = 2k | 0.231 | 0.840 | 50[a] | 0.424[b] | 3.4 | 40 | 400 | 50 |
| JHT474 | 16.9 x = 2k | 0.231 | 0.840 | 100[a] | 0.424[b] | 3.4 | 40 | 300 | 50 |
| JHT475 | 16.9 x = 2k | 0.231 | 0.840 | 80[a] | 0.424[b] | 3.4 | 40 | 300 | 50 |
| JHT476 | 16.5 x = 900 | 0.083 | 0.834 | 100[d] | 0.762[b] | 1.44 | 40 | 300 | 63 |
| JHT477 | 16.7 x = 900 | 0.083 | 0.837 | 75[d] | 0.762[b] | 1.44 | 50 | 500 | 44 |
| JHT478 | 16.5 x = 900 | 0.083 | 0.838 | 75[d] | 0.762[b] | 1.44 | 50 | 500 | 44 |
| JHT479 | 16.5 x = 600 | 0.083 | 0.838 | 75[d] | 0.762[b] | 1.44 | 50 | 500 | 63 |
| JHT480 | 16.5 x = 900 | 0.083 | 0.860 | 200[d] | 0.536[e] | 1.44 | 70 | 500 | 64 |
| JHT481 | 16.6 x = 900 | 0.085 | 0.834 | — | 0.377[e] | 1.44 | 70 | 450 | 63 |
| JHT482 | 16.9 x = 2k | 0.231 | 0.844 | 200[d] | 0.695[f] | 3.4 | 70 | 500 | 50 |
| JHT483 | 16.9 x = 2k | 0.231 | 0.839 | 50[d] | 0.695[f] | 3.4 | 70 | 500 | 50 |
| JHT484 | 16.9 x = 2k | 0.301 | 0.839 | 50[d] | 0.695[f] | 3.4 | 70 | 400 | 50 |

[a]JHT466
[b]Vazo 44, mixing temperature: 0° C.
[c]N-Heptane was used as continuous phase
[d]JHT71 (the small beads was not removed by centrifugation)
[e]Ammonium persulfate, mixing temperature: RT
[f]JHT71 (the small beads was removed by centrifugation)

Example 17

Numerical Simulations of Encoded Bead Identification

The process of reading and identifying encoded beads code was numerically simulated using the MatLab by the following method:
1. Forming a virtual set of spatially encoded beads in a computer on the basis of the following set of spatially encoded bead properties: total number of encoded beads 5000, encoded bead diameter distribution 0.7-1.0 micrometers, immobilised particle diameter distribution 5-14 micrometers, number of particles per encoded bead distribution 4-8, average number of immobilised particles per encoded bead 5, uncertainty involved in the determination of the spatially immobilised particle positions 1 micrometer,
2. Simulating random rotation of all spatially encoded beads,
3. Computing one pair of orthogonal projections of each of the spatially immobilised particles of each spatially encoded bead,
4. Combining the two orthogonal sets of 2D-positions whereby the set of possible 3D-positions is obtained for each spatially encoded bead,
5. Computing the set of distance matrices corresponding to the set of 3D-positions thus determined,
6. Identifying single spatially encoded beads by comparing the full set of distance matrices of single spatially encoded beads against the full set of distance matrices of all spatially encoded beads. The best fit of single distance matrices hereby obtained identifies single spatially encoded beads.
7. Registering the number of not-identified spatially encoded beads,
8. Repeating the sequence 1 to 7 three times with the following values of the average number of immobilised particles per encoded bead: 5, 6, and 7.
9. Repeating the steps 1 to 8 four times with the following values of the uncertainty involved in the determination of the spatially immobilised particle positions: 1, 2, 4, and 8 micrometers.

The result is presented in the two charts in FIG. 19 in terms of the number of encoded beads with correspondence problem and the number of not-identified spatially encoded beads. It can be seen from the figure that the number of encoded beads with correspondence problem and the number of not identified encoded beads increase with the uncertainty involved in the determination of the spatially immobilised particle positions. It further appears from the figure that the number of encoded beads with correspondence problem increases with increasing average number of immobilised particles per encoded bead, whereas the number of not identified encoded beads does not vary significantly with the average number of immobilised particles per encoded bead.

Example 18

Use of Triangles Defined by the Microbeads for Identification of Encoded Beads

A batch of encoded beads was prepared according to the method described in Example 17 with the set of parameters used for the batch termed JHT476. The beads were sorted according to size by sifting, and 60 beads from the 500-700 micrometers diameter fraction were dispersed in water and fed to an encoded bead reader device comprising a quart flow cell with a rectangular cross-section, manual syringes for passing a bead dispersion through the flow cell, a 473 nm laser for illuminating a central section of the flow cell, two orthogonally aligned cameras equipped with image intensifiers, optical objectives, and band pass fluorescence filters, an image framegrabber for transferring the images from the cameras to a computer, a harddrive for storing the images, an electronic pulse generator for controlling the cameras, the image intensifiers, and the framegrabber.

Each bead was gently passed through the flow cell whereby it was ensured that the bead rolled on the lower horizontal inner wall of the flow cell. The resulting image sequence consist of a series of orthogonal pairs of images of the bead imaged from various angles. For each pair of orthogonal images one distance matrix, D, was derived:

$$D = \begin{bmatrix} d_{11} & d_{12} & \cdots & d_{1N} \\ d_{21} & d_{22} & \cdots & d_{2N} \\ \vdots & \vdots & \ddots & \vdots \\ d_{N1} & d_{N2} & \cdots & d_{NN} \end{bmatrix}$$

where N is the number of microbeads observed in the bead, and $d_{jk}$ is the distance between microbead j and microbead k, where j=1, 2, . . . , N and k=1, 2, . . . , N. Thus $d_{jk}$=0 when j=k, and $d_{jk}$=$d_{kj}$.

Two pairs of orthogonal images from one such image sequence of an encoded bead are shown in FIG. 20. In the lower pair of images in the figure the bead is rotated about 15° compared to the upper pair of images. The images to the left were obtained with a camera looking down on the flow cell from above (y,z-projections). The images to the right were obtained with a camera looking at the flow cell from the side (x,z-projections). Also shown in the figure is the result of the automatic determination of the microbead positions marked with "+". Only microbeads that are observed at the same z-position in the y,z- and the x,z-projection are considered for the distance matrix determination. The six different distances between the four microbeads considered are given in FIG. 20 for each pair of orthogonal images to the right of each of the two image pairs. Ideally the distances should be identical, however, deviations in the range 0.2-1.4 pixels are observed corresponding to a distance determination reproducibility in the range 0.5-3.5 µm.

From the distance matrix of one pair of images all possible triangles defined by the considered microbeads are generated in the computer. Each of the triangles are then stored as a vector, $L_i$=[$I_{i1}$,$I_{i2}$,$I_{i3}$], where $I_{i1}$,$I_{i2}$ and $I_{i3}$ are the respective distances between the three microbeads defining triangle i, where i=1, 2, . . . , M, and M is the number of possible triangles for the given number of microbeads. The full set of triangles of each encoded bead are then stored for use in the later identification procedure. This is done for all encoded beads, and from the resulting sets of triangles a look-up table is generated. With the use of this look-up table any one of the encoded beads can be identified at a later stage on the basis of its unique set of triangles as defined by its microbead geometry.

The invention claimed is:
1. A composition comprising a plurality of different, spatially encoded beads, comprising
a polymer matrix and from 3 to not more than 10 spatially immobilized, individually detectable particles held in the polymer matrix, wherein each bead has a diameter of from 0.5 millimeter to less than 2.0 millimeter, wherein the diameter of the particles is less than 30 micrometer, the particles being disposed in a spatial configuration relative to one another that constitutes the code serving to identify each bead.

2. The composition according to claim 1 in which the polymer matrix has different optical or spectroscopic properties from those of the particles.

3. The composition according to claim 1 in which the particles are monodisperse.

4. The composition according to claim 1 in which the particles are heterodisperse.

5. The composition according to claim 1 in which the particles are spherical.

6. The composition according to claim 1, wherein the polymer matrix is selected from the group consisting of polyethers, polyvinyls, polyacrylates, polyacylamides, polyacrylamides, polystyrenes, polycarbonates, polyesters, polyamides, and combinations thereof.

7. The composition according to claim 1, wherein the polymer matrix is selected from the group consisting of SPOCC, PEGA, HYDRA, POEPOP, PEG polyacrylate copolymers/polyether-polyamine copolymers, crosslinked polyethylene diamines, and combinations thereof.

8. The composition according to claim 1, wherein the composition comprises at least $10^2$ individually identifiable beads.

9. The composition according to claim 1, wherein the composition comprises at least $10^9$ individually identifiable beads.

10. The composition according to claim 1, wherein the spatial positions of particles in each bead are defined by sets of coordinates (x,y,z) of particle centers of said particles, relative to a reference point of detection.

11. The composition of claim 1, wherein said beads are prepared by a process, which comprises:
    suspending the particles in a polymerizable liquid,
    polymerizing the liquid to obtain the polymer matrix, and
    forming beads with embedded particles from said matrix.

12. The composition according to claim 1 comprising 3 to 4 particles.

13. The composition according to claim 1 comprising from 4 to 8 particles.

14. The composition according to claim 1 comprising from 4 to 10 particles.

15. The composition according to claim 14, said bead being essentially spherical.

16. The composition according to claim 15, wherein all of said particles are essentially monodisperse.

17. The composition according to claim 14 wherein said particles are less than 10 micrometer in diameter.

18. The composition according to claim 17, wherein said particles are less than 5 micrometer in diameter.

19. The composition according to claim 17, wherein said particles are less than 1 micrometer in diameter.

20. The composition according to claim 17, wherein said particles are less than 0.1 micrometer in diameter.

21. The composition according to claim 14, wherein said particles comprise a spectroscopically detectable marker.

22. The composition according to claim 14, wherein said particles comprise a fluorescently detectable marker.

23. The composition according to claim 22, wherein the fluorescently detectable marker is selected from the group consisting of fluorescein, oregon green, rhodamine, aminobenzoic acid, a sulfonated aminocoumarin probe, a sulfonated rhodamine probe, BODIPY dyes, cascade blue dye, coumarine, naphthalenes, dansyl, indoles, pyrenes, pyridyloxazole, cascade yellow dye, fluorescamine, aromatic ortho dialdehydes, OPA, NDA, ATTO-Tag, 7-nitrobenz-2-oxa-1,3-diazole, and derivatives thereof.

24. The composition according to claim 22, wherein said fluorescently detectable marker is selected from the group consisting of fluorescent organic polycyclic compounds, conjugated vinylic compounds, heterocyclic transition metal complexes, rare earth metal compounds, inorganic oxides and glasses.

25. The composition according to claim 22, wherein the polymer matrix is optically transparent in the optical excitation of said fluorescent marker and/or the emission wavelength ranges of said fluorescent marker.

26. The composition according to claim 1, wherein each bead comprises at least one site for functionalisation to which a ligand or a bioactive species can be attached.

27. The composition according to claim 26, wherein the site for functionalisation comprises a reactive group or a scaffold comprising two or more of such reactive groups.

28. The composition according to claim 26 further comprising a plurality of ligands or bioactive species attached to the polymer matrix, wherein different ligands or different bioactive species are attached to different beads, wherein more than about 95% of all of said different beads are individually identifiable.

29. A method for the detection of relative positions in space of centers (x,y,z) of immobilized particles of the composition according to claim 1, said method comprising the step of recording of at least two 2D-projections of the particles, said method optionally comprising the further step of determining, on the basis of the relative positions in space of centers (x,y,z) of immobilized particles, the distance matrix for individual beads, or a set of geometrical figures derivable from the relative positions in space of centers (x,y,z) of the immobilized particles.

30. The method according to claim 29, wherein a fluorescently detectable marker is attached to the particles of the composition and is detectable by a fluorescent spectroscopic method.

31. The method according to claim 29, wherein a marker is attached to the particles of the composition and said marker is detected by fast spectroscopic techniques other than fluorescence spectroscopy.

32. The method according to claim 31, wherein said fast spectroscopic technique is selected from the group consisting of Infrared spectroscopy, raman spectroscopy, visible light spectroscopy, UV spectroscopy, electron spin resonance, and nuclear magnetic resonance.

33. The method according to claim 29, wherein a marker is attached to the particles of the composition and said marker is detected by fast detection techniques, other than spectroscopy, selected from the group consisting of light scattering, reflection, diffraction and light rotation.

34. The method according to claim 29, wherein a marker is attached to the particles of the composition and the marker is detected by probing the marker with a range of frequencies differing by less than 10% based on the numerical highest frequency value.

35. The method according to claim 29, wherein a marker is attached to the particles of the composition and the marker is detected by probing the marker with one or more predetermined frequencies.

36. The method according to claim 29 wherein 3 2D-projections are recorded along 3 orthogonal axes x, y and z to generate 3 sets of 2D-coordinates (y,z), (x,z) and (x,y), respectively, from which the 3D-coordinates (x,y,z) of particle centers can be derived.

37. The method according to claim 29, wherein a plurality or stack of 2D projections are generated by confocal or focal microscopy to recreate the 3D image matrix of the bead from which the relative particle position (x,y,z) in space can be determined.

38. The method of claim 29 employing at least one focused scanning laser for detection of relative positions in space of centers (x,y,z) of immobilized particles and laminar fluidics for bead manipulation.

39. The method of claim 38 in which the coordinates x and y of a particle position are determined by fast scanning two orthogonally aligned lasers over two cross sections of the moving bead while the z coordinate is determined by the time of flight of the bead at known flow rates.

40. The method of claim 29 in which the coordinates x and y of a particle position are determined by using a single laser and particle position a rotating mirror are determined by using a single laser and a rotating mirror that via 2 or 3 geometrically arranged static mirrors reflects the laser beam along 2 or 3 orthogonal axes.

41. A method for distance matrix determination of at least one bead in the composition of claim 1, each bead comprising a plurality of spatially immobilised particles comprising an optically detectable label, said method comprising the steps of
  i) providing at least one composition according to claim 1,
  ii) providing at least one device for recording and storing at least one image of the at least one bead, said device comprising
    a) at least one source of illumination,
    b) at least one flow system comprising a flow cell comprising an imaging section,
    c) at least one pulse generator,
    d) at least one image intensifier,
    e) at least one CCD camera,
  iii) activating at least one source of illumination,
  iv) introducing the at least one encoded bead comprising a plurality of particles into the flow cell comprising an imaging section,
  v) recording at least one image of the at least one bead by sending substantially simultaneously a pulse generated by a pulse generator to both a) the at least one image intensifier, and b) the at least one CCD camera capable of recording said at least one image, and
  vi) determining for individual beads a distance matrix based on the at least one image obtained for each bead in step v),
  wherein the distance matrix for an individual bead is determined by a method comprising the steps of
  determining for each particle of the encoded bead the 2D coordinates in the XZ-plane and in the YZ-plane, thereby generating a first set of data and a second set of data,
  combining the first set of data and the second set of data and thereby obtaining 3D coordinates for each particle, and
  calculating the distance matrix as the full set of distances between particles for which preferably only one set of 3D coordinates is obtained.

42. The method of claim 41, wherein steps iv), v), and vi) are repeated for individual steps entering the flow cell.

43. The method of claim 41 comprising the further step of detecting a bead entering the flow cell by using a photo-sensor.

44. The method of claim 41, wherein the pulse generator is activated by the activation of the photo-sensor, and wherein the photo sensor is activated by an encoded bead entering the flow cell.

45. The method of claim 41 comprising the further step of storing the at least one image on a data storage medium.

46. The method of claim 41, wherein two CCD cameras and two image intensifiers are employed for recording the at least one image of the at least one bead.

47. The method of claim 41, wherein the source of illumination comprises a continuous wave laser capable of illuminating the imaging section of the flow cell.

48. The method of claim 41, wherein the photo-sensor for detecting the entry of an encoded bead into the imaging section of the flow cell comprises an optical objective for focusing said imaging section of said flow cell onto the photo-sensitive area of said photo-sensor, wherein said optical objective of said photo-sensor comprises a fluorescence filter capable of blocking the light of said laser, and wherein said fluorescence filter transmits the fluorescence emission from the particles.

49. The method of claim 41, wherein the at least one CCD camera for recording the at least one image of the at least one encoded bead comprises at least one gated image intensifier for amplifying the fluorescence emission from the encoded bead, and wherein each of said image intensifiers comprises at least one optical objective for focussing said imaging section of said flow cell onto the photo-sensitive area of each image intensifier, and wherein each optical objective comprises a fluorescence filter for blocking the light of said laser, and wherein the fluorescence filter transmits the fluorescence emission from the particles.

50. The method of claim 49, wherein the size distribution of the beads is in the range of from 0.1 millimeter to less than 2 millimeter.

51. The method of claim 50, wherein the majority of the beads are in the range of from 0.5 millimeter to 1 millimeter, and independently thereof, wherein the diameter of the particles is in the range of from 5 to 15 micrometer.

52. The method of claim 41, wherein a plurality of encoded beads are provided and wherein multiple distance matrices are determined based on individual distances recorded for individual beads.

53. The method of claim 52, wherein a set of multiple distance matrices is determined for a subpopulation of the beads based on more than one set of individual distances recorded for the subpopulation of beads.

54. The method of claim 52, wherein each distance matrix is recorded individually.

55. The method of claim 41, wherein at least one image of each bead is recorded per second.

56. The method of claim 41, wherein a total of more than 4000 beads are recorded per hour.

57. The method of claim 41, wherein the optical power of the laser is in the range of from 1 mWatt to less than about 200 mWatt.

58. The method of claim 41, wherein the wave length of the laser is in the range of from about 450 nm to less than 700 nm.

59. The method of claim 41, wherein the exposure time of the image intensifiers is less than about 1 millisecond.

60. The method of claim 41, wherein the exposure time of the CCD cameras is less than about 1 millisecond.

61. The method of claim 41, wherein the response time of the photo-sensor is less than about 1 millisecond.

62. The method of claim 41, wherein the flow rate of the beads through the flow cell of the flow system is more than 0.01 meter per second.

63. The method of claim 41, wherein the dimensions of the imaging section is preferably less than 1 milliliter.

64. The method of claim 41, wherein the flow cell comprises a material which does not absorb the illumination light from the source of illumination and/or the emission light emitted from the particles.

65. The method of claim 41, wherein the optically detectable label is selected from the group consisting of light reflecting particles, light absorbing particles, dyes, fluorescent particles, and autofluorescent particles.

66. The method of claim 41 comprising the further steps of
i) comparing the Z-coordinates of different particles within each bead, and
ii) selecting particles wherein the difference between Z-coordinates is less than a predetermined threshold value, delta-Z,
iii) pairwise grouping the selected particles according to delta-Z values,
iv) maintaining the X-coordinate and the Z-coordinate for each of the pairwise grouped particles, and
v) switching the Y-coordinate between pairwise grouped particles, thereby obtaining an alternative set of 3D coordinates from which an alternative distance matrix can be calculated.

67. A method for identifying individual beaded polymer matrices in the composition, said method comprising the steps of
i) determining the distance matrix for individual beads according to the method of claim 41,
ii) deriving from each of the distance matrices generated in step i) all of the possible geometrical figures selected from triangles and quadrangles, which can be generated by connecting particle coordinates with straight lines, and
iii) recording and storing the set of geometrical figures obtained in step ii) for each bead of the composition to be identified,
iv) selecting a subset of beads,
v) identifying one or more of the selected beads on the basis of a comparison of the set of possible geometrical figures selected from triangles and quadrangles of said bead(s) with all sets of possible geometrical figures selected from triangles and quadrangles recorded for the composition in step iii).

68. The method of claim 67, wherein the geometrical figures are triangles.

69. The method of claim 67, wherein each bead comprises 3 or 4 spatially immobilised particles.

70. The method of claim 67, wherein the geometrical figures are quadrangles.

71. The method of claim 67 comprising the further step of performing a digital 3D registration of at least some of the identified beads, said 3D registration comprising generating a digital 3D reconstruction of the at least some identified beads based on the orthogonal pairs of images, and wherein the identification of individual beads is aided by an analysis of which of the generated 3D reconstructions represents the best fit to the original 3D registration.

72. A method for identifying an individually identifiable, spatially encoded, bead in the composition according to claim 1, comprising the steps of
i) determining the unique, spatial position of the particles in the bead to be identified,
ii) deriving from the positions, a matrix of the distances between the particles,
iii) deriving from the matrix, a set of all possible triangles defined by the particles,
iv) identifying said bead based on comparison of the set of possible triangles with all sets of possible triangles capable of being stored for the composition.

73. A method for recording individual reaction steps involved in a step-wise synthesis of a chemical compound in a library comprising the composition according to claim 1, said method comprising the steps of
a) spatially immobilizing a plurality of particles in polymer beads,
b) isolating at least a subset of the spatially encoded beads provided in step a) and
c) recording and storing a distance matrix or a geometrical figure derivable from the distance matrix for each bead or granule,
d) stepwise synthesising chemical compounds on functional groups of the encoded beads, wherein the identity of each bead is recorded and stored for each reaction step,
e) obtaining for each bead a record of individual reaction steps.

74. A method for identifying a chemical compound being synthesised on the polymer matrix said method comprising the steps of
a) performing the recording method of claim 73,
b) selecting beaded polymer matrices or granules of interest by using an assay or a diagnostic screen selective for the chemical compound having been synthesised on the beaded polymer matrix,
c) recording the distance matrix for each of the beaded polymer matrices selected in step b),
d) comparing the distance matrix recorded in step c) with all of the distance matrices recorded and stored in step c) of claim 73, thereby obtaining information about the identity of the selected bead,
e) identifying for each selected bead the sequence of individual steps having lead to the synthesis of the chemical compound, and
f) identifying, based the sequence of individual steps, the chemical structure of the compound.

75. The method of claim 74, wherein the assay is a binding assay performed by measuring the binding of a protein to a ligand bound to the polymer matrix.

76. The method of claim 74, wherein the assay is performed by measuring an enzyme activity on a substrate bound to the polymer matrix.

77. The method of claim 74, wherein the assay is performed by measuring enzyme inhibition of a molecule bound to the polymer matrix.

78. The method of claim 74, wherein the assay is performed by measuring receptor interaction with a compound bound to the polymer matrix.

79. The method of claim 74, wherein said plurality of particles comprise a fluorescently detectable marker.

80. The method of claim 79, wherein said fluorescently detectable marker is a uv or visible light-excitable microspheres.

* * * * *